United States Patent [19]

Hu et al.

[11] Patent Number: 4,736,317
[45] Date of Patent: Apr. 5, 1988

[54] MICROPROGRAM-COUPLED MULTIPLE-MICROPROCESSOR MODULE WITH 32-BIT BYTE WIDTH FORMED OF 8-BIT BYTE WIDTH MICROPROCESSORS

[75] Inventors: Ming K. Hu, Syracuse, N.Y.; Yau G. Jia, Nanjing, Jiangsu, China

[73] Assignee: Syracuse University, Syracuse, N.Y.

[21] Appl. No.: 756,048

[22] Filed: Jul. 17, 1985

[51] Int. Cl.[4] ............................ G06F 15/16; G06F 9/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,988,717 | 10/1976 | Kisylia | 364/200 |
| 4,034,347 | 12/1977 | Probert, Jr. | 364/200 |
| 4,071,890 | 1/1978 | Pandeya | 364/200 |
| 4,104,720 | 8/1978 | Gruner | 364/200 |
| 4,124,890 | 11/1978 | Vasenkov et al. | 364/200 |
| 4,161,784 | 1/1979 | Cushing et al. | 364/200 X |
| 4,167,781 | 9/1979 | Beccia et al. | 364/200 |
| 4,210,960 | 7/1980 | Borgerson et al. | 364/200 |
| 4,215,400 | 7/1980 | Denko | 364/200 |
| 4,360,869 | 11/1982 | Stanley et al. | 364/200 |
| 4,361,869 | 11/1982 | Johnson et al. | 364/200 |
| 4,366,535 | 12/1982 | Cedolin et al. | 364/200 |
| 4,370,709 | 1/1983 | Fosdick | 364/200 |

Primary Examiner—Eddie P. Chan
Attorney, Agent, or Firm—Bruns and Wall

[57] ABSTRACT

A microprogram-coupled multiple-microprocessor module receives a system command system status and associated data. The system command and the system status can be directly used as an address or mapped into a microprogram memory address to initiate micro-subroutines. The module can serve as a basic processor and its microprogrammability gives it a high degree of flexibility and modularity. A five-microprocessor module is employed in one example. Basic microprogramming techniques used in the module include a multiple-way microprogram branch technique. The organization of the module is systematic and structured and the microprogramming for the module is a comparatively simple procedure. The module achieves an improved rate of instruction execution at a relatively small cost in the number of clock cycles required.

10 Claims, 14 Drawing Sheets

THE MODULE

DPU

APU

STACK POINTER (SCHEME 1)

STACK POINTER (SCHEME 2)

MSL

ORGINIZATION OF THE MICROPROGRAM

MICROPROGRAM-COUPLED MULTIPLE-MICROPROCESSOR MODULE WITH 32-BIT BYTE WIDTH FORMED OF 8-BIT BYTE WIDTH MICROPROCESSORS

BACKGROUND OF THE INVENTION

This invention relates to data processing and is more particularly directed to a multiple microprocessor module in which a plurality of microprocesors act in parallel and at the same time.

The invention is more particularly directed to a multiple-microprocessor module in which the several microprocessors are coupled by microprogramming.

Previous suggestions for interconnection of multiple microprocessors proposed a number of microprocessors (with or without local memory) connected to the same bus which also contains a shared memory, or microprocessors connected via a multiport memory. In other words, a microprocessor-memory pair was considered as the basic functional unit, sometimes called a processing element. The way that microprocessor-memory pairs are formed, including their interconnections, is called a multimicroprocessor configuration.

It is an object of this invention to provide a multiple-microprocessor module that has improved data handling speed and flexibility characteristics.

It is another object of the invention to provide a multiple microprocessor module which is easily constructed of reliable, low cost, and readily available integrated circuits.

It is a further object of this invention to provide a multiple-microprocessor module in which the microprocessors are flexibly coupled by microsubroutines.

SUMMARY OF THE INVENTION

In accordance with an aspect of this invention, a microprogram-coupled multiple-microprocessor module is formed of four basic sections: a data processing unit (DPU); an address processing unit (APU); a stack pointer processing unit (SPPU); and a microprogram control and signalling unit (MCU). The DPU has several microprocessors (e.g., four eight-bit microprocessors for a thirty-two bit module) each with an internal data bus, a like number of main data busses and control circuitry coupling the microprocessors to the main data busses. The APU has at least one additional microprocessor that is used to keep track of memory addresses that correspond to the data processed in the microprocessors of the DPU. In the APU, data transfer circuitry couples the microprocessor to a stack pointer bus and to at least one of the internal data busses of the microprocessors of the DPU, and a logic circuit is coupled to a data bus of the DPU and to the microprocessor of the APU to carry out OP code mapping of the APU.

The SPPU is preferably constructed external to the microprocessor of the APU, because it would be too time consuming for the APU microprocessor to keep track of the stack pointers for all the microprocessors. It should be observed in this regard that the SPPU may have to execute a push or pull of four bytes (i.e., 32 bits) in a four-microprocessor-DPU module. The SPPU includes address register circuits and data transfer circuitry to couple the address register circuit to the stack pointer bus of the APU and to the internal data bus of at least one of the microprocessors of the DPU.

The MCU includes one or more microprogram memory devices storing microinstructions for the microprocessors of the DPU; microinstruction sequencing logic circuitry providing addressing data to the microprogramming memory to determine the next successive address of the microprogram sequence, and flag and signal generating circuitry coupled to the DPU microprocessors and also providing status flags and signals to the multiple microprocessors of the DPU and to the microprocessor of the APU.

The MCU includes circuitry for synchronizing the operation of the microprocessors of the DPU and APU so that memory fetch and memory write operations are all synchronized, notwithstanding that any given operation carried out by one microprocessor might require more clock cycles than the operation carried out by another such microprocessor at the same time.

It has been found that the multiple microprocessor module of this invention processes four times the data at a cost of an increase of only 84.5% in required clock cycles. This means that for a given algorithm and a given quantum of unprocessed data, the multiple-microprocessor module operates more than twice as fast as a comparable single microprocessor. Also, because the control circuitry is microprogrammed, the circuit design is extremely flexible and can be readily adapted for a given function.

In the specification and drawings there is shown and described a preferred embodiment of the microprogram-coupled multiple-microprocessor module of this invention, and there are suggested various alternatives and modifications thereof; but it is to be understood that these are not intended to be exhaustive and that many other changes and modifications can be made within the scope of the invention. The embodiment and suggested alternatives are included for purposes of illustration in order that other skilled in the art may understand the invention more fully and appreciate the principles thereof, and that they will be able to modify it in a variety of forms, each as may best be suited to the conditions of a particular application or environment.

BRIEF DESCRIPTION OF THE DRAWINGS

The following description should be considered in connection with the accompanying drawings, in which.

An Appendix listing the microcode subroutines of the 6502-32 follows the text of the ensuing description.

DESCRIPTION OF THE PREFERRED EMBODIMENT

Figure 1:
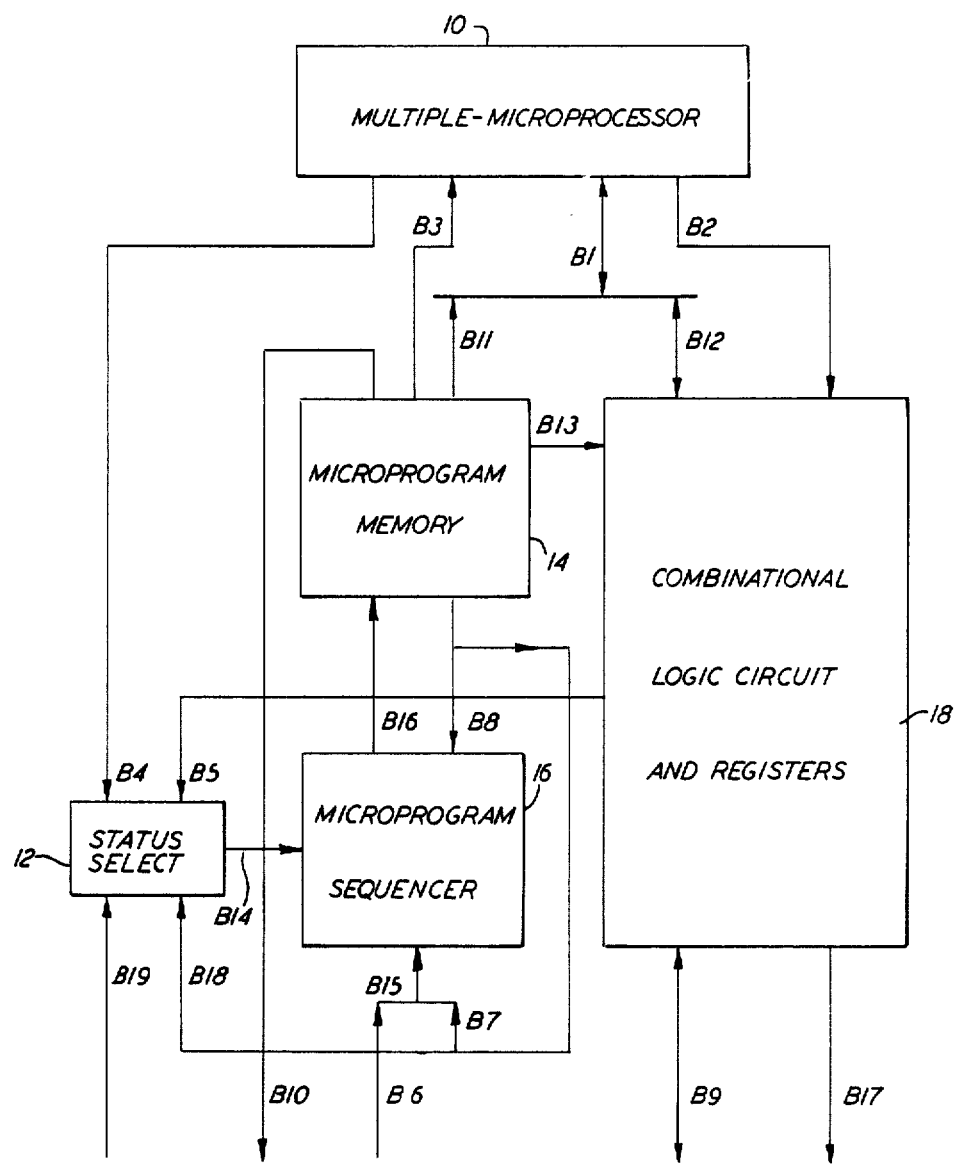
FIG. 1 is an overall schematic view of the multiple microprocessor module according to one preferred embodiment of this invention.

The general scheme of organization for the multiple-microprocessor module of this invention is shown in FIG. 1. Data bus lines numbered B1 through B19 couple various portions of the module. The module can be considered to be formed of three parts: a multiple microprocessor unit 10, a microprogrammed control circuit unit including a status select unit 12, a microprogram memory 14, and a microprogram sequencer 16; and an associated combination logic circuit 18. Generally, four busses are used: a bidirectional data bus B1; an address bus B2; an input control signal bus B3; and an output control signal bus B4. The data bus B1 and the address bus B2 communicate with outside systems through the combination logic circuit and registers 18. The data bus B1 can receive information from the microprogram memory 14 through bus B13. This information could be either the data or the instructions for the multiple-microprocessor 10. The microprogram memory 14 provides the signals to the input control signal bus B3, and thus the multiple-microprocessor could be controlled by the microprograms in the microprogram memory 14. Moreover, the combination logic circuit and registers 18 are also controlled by the microprograms over the bus B13. Status and output control signals of this module are issued by the microprogram memory 14 over bus B10.

The microprogram sequencer 16 provides the address of the microprogram memory location of the next word which is being fetched. The address is determined by the following factors: the systems command over bus B6; the address control portion of the previously fetched microinstruction over busses B7 and B8; the output of the status select circuit 12 over bus B14. The output control signals of the multiple-microprocessor 10 over bus B4, the status of the data bus B5 of the multiple-microprocessor, and the status of outside system over bus B19 all are collected as the inputs of the status select circuit 12. The select signals over bus B18 from the microprogram memory 14 will determine which input is to be selected as the output. It should be pointed out that circuit designers have considerable freedom to determine the scheme for the microprogram sequence control. The microprogram sequencer 16 operations will to a great extent depend on the status of the multiple-microprocessor unit 10. The performance of the multiple-microprocessor module is enhanced significantly by the capability to perform multi-way branching. One example of this is a 16-way microprogram branch scheme described in some detail hereafter.

The microprogram forms the interface (the intermediate layer), between the outside system and the multiple-microprocessor unit 10. The microprogram interprets the system command and causes the multiple-microprocessor unit 10 to execute the command. The type and number of microprocessors used in this module are transparent to the outside system. This feature gives the module a rather high degree of modularity.

The microprogram can be regarded as an extension of system software, in the sense that it becomes an efficient means for organizing a set of subroutines and controlling their execution. In a few words, this structure including the microprogram interface has a high degree of modularity, flexibility, efficiency, and simplicity; and thus this structure can be used in a wide variety of designs and applications.

A preferred embodiment of the module, herein referred to as 6502-32, will be described shortly hereafter. The module is a 32-bit central processing unit, or CPU. It is designed such that the whole instruction set of the 6502 type microprocessor could be executed on it employing a word size of 32 bits rather than 8 bits. The 6502-32 module has a 32-bit data processing unit, a 16-bit address processing unit, a stack pointer processing unit, and a microprogrammed control unit which is employed for control of all the processing units. Four type 6502 microprocessors are used in the data processing unit, and one additional 6502 microprocessor is used in the addressing processing unit. Thus, the whole module could be regarded as a five-microprocessor module.

The principal consideration for the module in this embodiment is that it is simple while at the same time employing all the primary features of the new structure. In general the module is not limited to executing the 6502 microprocessor machine level instructions. Many functions, including higher level system commands could be performed by a suitably designed module.

In order to implement a 32-bit CPU there are several possible choices. One possibility is to use an 8-bit microprocessor, say type 6502, as the CPU, accompanied by the subroutines for multiple precision computation. The computation would be slow in this implementation, because time would be spent not only on a serial computation byte by byte, but also on making back and forth moves of the intermediate results between the CPU and memory. In general, it would be too slow to be of much advantage.

Another possibility is to use bit-sliced components, such as the AMD 2900 family of IC chips, made and sold by Advanced Micro Devices, Inc., as building blocks. Fairly fast computation and more flexible design could be obtained in this implementation. Nevertheless, in contrast with the structure presented herein, the bit-sliced system will result in a long and a complicated design procedure and employ many times more integrated circuit chips.

The structure described here is a compromise with the pure-software approach and the implementation of bit-sliced components.

A general trend in computers today is to increase the complexity of architecture commensurate with the increasing potential of implementation technologies. At the same time, the Reduced Instruction Set Computer (RISC) Project has been proposed. The purpose of the RISC project is to explore alternatives to the general trend toward architectural complexity. Although the research about RISC is not closed, the outline of the RISC has been presented such as to execute one instruction per cycle, to make all instructions the same size, to support multiple registers, and so on. It is easily understood that the RISC seems to be an ideal component for the microprogram-coupled multiple-microprocessor module, but it imposes limitations that make it impractical for the time being.

Any one of the popular microprocessors, e.g., 8-bit microprocessor 6502's, could be used as building blocks of the example module. In the preferred embodiment there is a 32-bit CPU (called a data processing unit or DPU) using the 8-bit microprocessor 6502's as building blocks. For simplicity, it is specified that the 32-bit CPU has the same instruction set as 6502, except that the processed data words are 32-bit superbytes rather than 8-bit bytes. It should be pointed out that the CPU module which employs the microprocessor 6502's as building block does not have to execute exactly the same instruction set as the 6502.

The nomenclature for the 32-bit CPU module of this embodiment is "6502-32". The terms and the mnemonic notations used in the 6502 microprocessor are all well known, so these terms and notations will be quoted in the context without detailed explantation. However, there are some features in the 6502-32 module which are not common with the the 6502 microprocessors, and these are as follows:

(1) 16-bit addresses are specified in the 6502-32 module; thus, the index registers X, Y and the stack pointer register S should remain 8-bits wide. On the other hand, the accumulator A in the 6502-32 module has to be 32-bits wide to coincide with the data bus.

The primary use of index registers X and Y is as offsets and counters. In order to operate as both an offset and counter, index register may be incremented or decremented by one (INX, INY, DEX, DEY) or compared to values in memory (CPX, CPY). Because of the ability of the index registers to be loaded, changed and stored, they are also useful as general purpose registers. They can be used as interim storage for moves between memory locations or for moves between memory and the accumulator. Therefor, it is specified in the 6502-32 module that the index registers X, Y should be 32-bit registers, and the stack pointer register S should be an 8-bit register. When the registers X, Y are used either as offsets or as counters, the high-order 24 bits must be all zeros. The data which are fetched from memory to compare with X or Y during the execution of the instructions CPX or CPY should be of 8-bits width.

It should be noticed that when the instruction TXS or TSX is executed, data are transferred between the lower 8 bits of X and the stack pointer register S.

Figure 2:
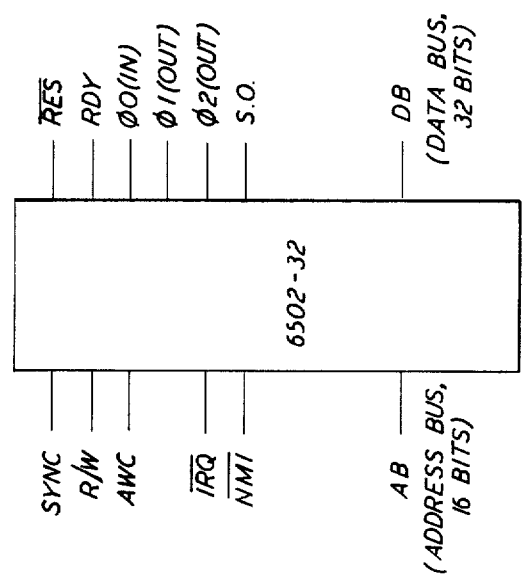
FIG. 2 is an input/output/signalling schematic of the overall module of the preferred embodiment.

(2) It is taken into account that the instructions involve either 8-bit or 32-bit data. Thus, data words should be either 8-bits or 32-bits wide for each memory access depending on the control signal access width control, AWC, which is generated by the 6502-32 module (FIG. 2). The memory access will be 32 bits when AWC=1, and 8 bits otherwise.

As depicted in FIG. 2, the 6502-32 module can be considered as a 32-bit microprocessor module, from the point of view of its input and outputs. The signals employed are those of a usual type 6502 8-bit processor, such as synchronization SYNC, read/write enable R/W, clock signals $\phi0$, $\phi1$, and $\phi2$, and other signals common to the 6502 processor. The address bus AB is of 16 bits width, and the data bus DB is of 32 bits width, however, to match the memory access width employed.

Figure 4:
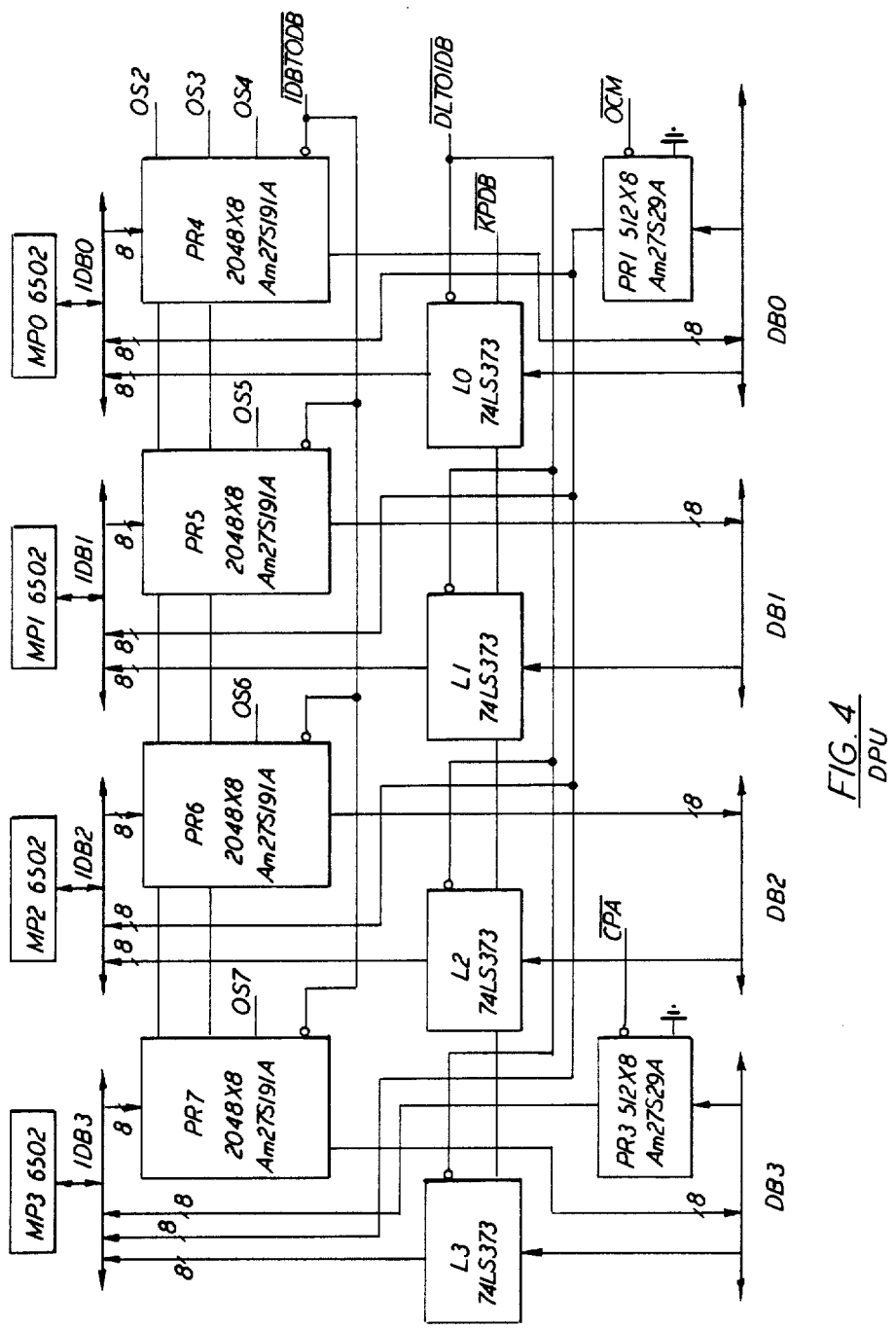
FIG. 4 is a schematic diagram of a data processing unit of the preferred embodiment.

(3) It has been mentioned that in this embodiment four 6502's are used for the arithmetical and logical operations on data. Thus, there are four processor status registers P in the 6502-32 module. Any of the these registers P can be chosen as the register P of the 6502-32 module; but if the processor status register of some 6502 microprocessor, e.g., MP0 in FIG. 4, is assigned as the register P of the 6502-32 module, then the status of the register P will set up according to the data in microprocessor MP0 and according to the instruction executed in the microprocessor MP0. Thus, a flag adjust (status adjust) has to be made after each execution of most instructions, i.e., the flags should be set up according to the entire 32-bit data word. In order to reduce the time required for the time-consuming operations of the flag adjust, a combination of the four P registers is used to indicate the flags of the 6502-32 module. Correspondingly, the P register of the 6502-32 module should be assumed to be 32 bits wide, and each push or pull operation of the P register will involve 4 eight-bit bytes. The following symbols represent the flags of the 6502-32 module;
 N: Negative result
 V: Overflow
 B: Break command
 D: Decimal mode
 I: Interrupt disable
 Z: Zero result
 C: Carry An in the microprocessors MP0, MP1, MP2, and MP3, respectively there are the flags N0, V0, B0, D0, I0, Z0 and C0 for MP0, N1, V1, ... for MP1, ..., and etc. It i established in the 6502-32 module that $N = N3,$ (1)

$N = V3,$ (2)

$I = I3,$ (3)

$D = D3,$ (4)

$B = B3,$ (note 1) (5)

$Z = Z3 \wedge Z2 \wedge Z1 \wedge Z0$ (6)

$C = C0$ (note 2) (7)

1. In fact $I3 = I2 = I1 = I0$, $D3 = D2 = D1 = D0$, and $B3 = B2 = B1 = B0$
2. $C3 = C2 = C1 = 0$ is always maintained.

Finally, it should be pointed out that the microprocessor MP4 has a P register, and this microprocessor MP4 is used as an Address Processing Unit. It does not matter what the flag status is of the P register in microprocessor MP4 except that

C4=0
B4=B
I4=I should always be maintained.

Figure 3:
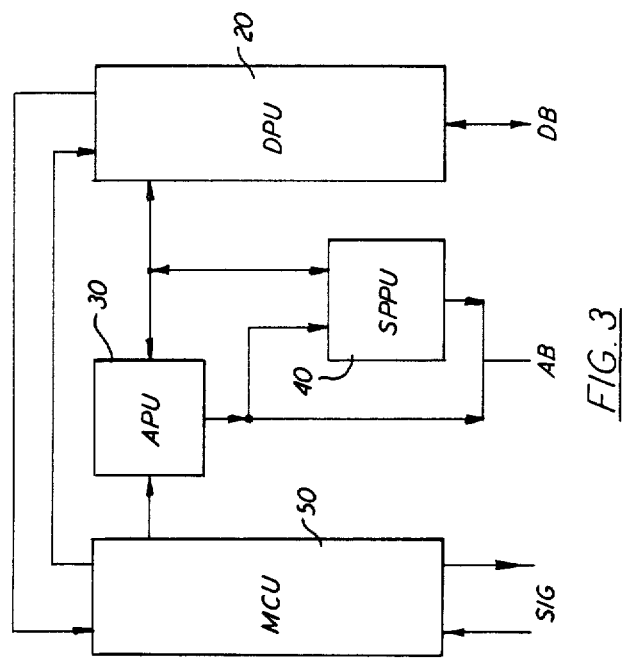
FIG. 3 is a block diagram of the various groups making up the module of the preferred embodiment.

As shown in FIG. 3, the 6502-32, the module includes the Data Processing Unit (DPU) 20, the Address Processing Unit (APU) 30, the Stack Pointer Processing Unit (SSPU) 40 and the Microprogrammed Control Unit (MCU) 50.

Each of the units of FIG. 3 is separately described as follows:

The Data Processing Unit (DPU)

The schematic of the Data Processing Unit 20 is given in FIG. 4. Four 6502 microprocessors, MP0, MP1, MP2 and MP3, form the heart of the Data Processing Unit 20, each accomplishing the arithmetic and logic operations for one 8-bit byte of data. The data busses of the microprocessors MP0, MP1, MP2, and MP3 (each 8 bits) are internal data busses IDB0, IDB1, IDB2, and IDB3, respectively. The transfer between the input/output data bus DB of the overall 6502-32 module and the internal data busses can be made through any of three paths.

First, four latch circuits L0, L1, L2, and L3, here type 74LS373 octal transparent latches with 3-state outputs, can transfer the data from main data busses DB0, DB1, DB2, and DB3 to the internal busses IDB0, IDB1, IDB2 and IDB3 respectively when an output enable signal $\overline{DLTOIDB}$ is low. If a controlled clock signal $\overline{KPDB}$ is equal to clock $\phi 2$, the data at the bus DB will transfer to the internal data busses during clock $\phi 2$, namely, the latches remain transparent to the data inputs as long as $\phi 2$ is high, and will store the data present one setup time before the high-to-low transition of $\phi 2$. When the control signal $\overline{KPDB}$ becomes low, the latches will hold the stored data.

Second, a PROM chip PR1, here a PROM type Am27S29A with 512*8 bits, forms the second path. The highest address bit of PROM PR1 is always zero; and the PROM PR1 receives an op code at the bus DB0, carries out certain OP code mapping, then fans-out to all the internal busses IDB0, IDB1, IDB2, and IDB3 with the same code. This PROM PR1 is enabled by an output enable signal $\overline{OCM}$.

The mapping of PROM PR1 is shown in Table 1. Each row or column of Table 1 is numbered by hexadecimal digits. The row number corresponds to the higher 4 bits of inputs of the PROM PR1, while the column number corresponds to the lower 4 bits of inputs of the PROM PR1. Given 8-bit inputs of the PROM PR1, the corresponding row number and column number will be determined. The entry of the intersection determined by the row and the column is the outputs of the PROM PR1. For example, if the inputs are "3D", then the outputs are "2D". In Table 1, "XX" represents "don't care", i.e., the corresponding op code is unused. The purpose of op code mapping will be explained later.

Third, four respective PROMs, PR4, PR5, PR6, and PR7, of type AM27S191A with 2048*8 bits, form the third path. This path accomplishes some supplementary arithmetical and logical operations for the data at internal data busses. The lower 8 address bits among the 11 address bits of PROMs PR4 through PR7 are assumed as the processed data. The data are output at the bus DB after processing, the processing to be accomplished being determined by the higher three address bits, as is shown in Table 3, where DE1: decremented by 1;
IN1: incremented by 1;
SEL: set the least significant bit to 1;
SEM: set the most significant bit to 1; and
NOP: unchanged.

Finally, another PROM PR3, which is a type Am27S29A, builds a path from bus DB3 to bus IDB3. The PROM PR3 is programmed such that the output data equals the input data plus 1. This path is only used in the execution of an instruction CMP.

The PC and Address Processing Unit (APU)

Figure 5:
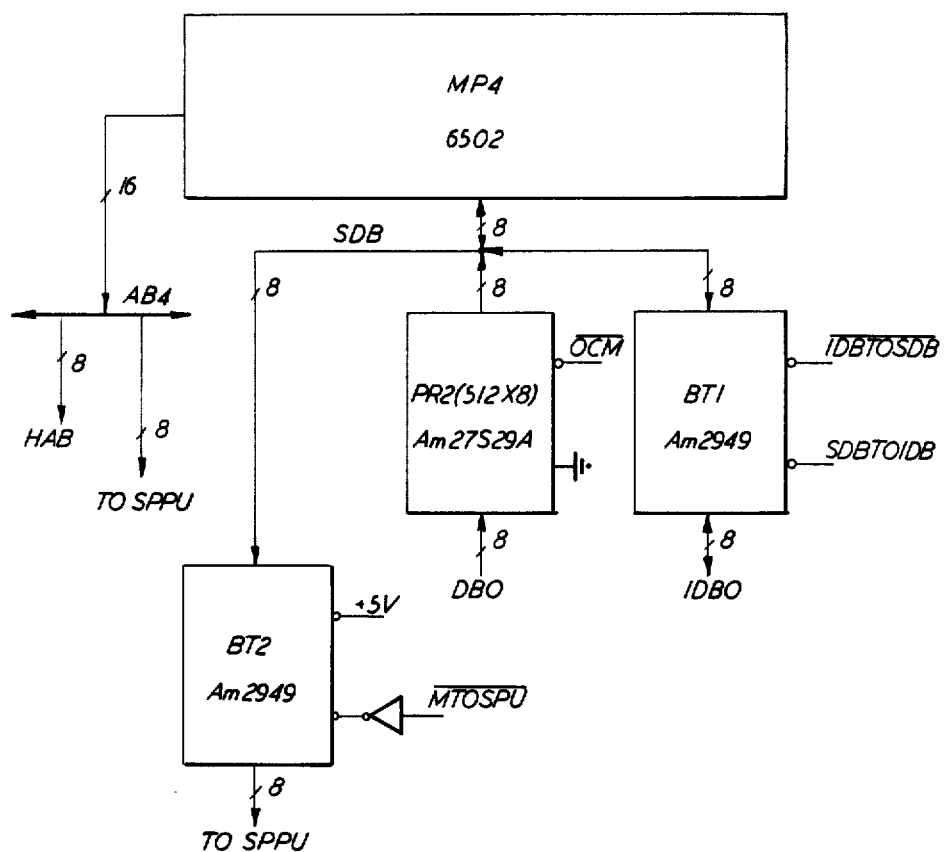
FIG. 5 is a schematic diagram of an address processing unit of the preferred embodiment.

A fifth 6502 microprocessor MP4 is employed in the Address Processing Unit (APU) 30, as shown in FIG. 5. The program counter or PC, the index registers X and Y, the address bus AB4 and associated address calculating circuits built into the microprocessor MP4 are used to accomplish address processing.

It should be mentioned that it is quite inconvenient to use the stack pointer register S of the microprocessor MP4 because some push or pull operations may involve four bytes rather than only one byte. Therefore the Stack Pointer Processing Unit (SPPU) 40 should always be employed. The SPPU 40 is built external to the APU 30, and its operations will be explained in the next section. The address bus AB4 of the microprocessor MP4 is split into the higher 8 bits HAB and the lower 8 bits. The higher bits HAB become the higher half of the address bus AB of the 6502-32 modules. The lower 8 bits are sent to SPPU 40 for further processing, and thereafter placed on an lower-eight-bit address bus LAB.

Some transfer paths between the data bus of the microprocessor MP4, i.e. the stack pointer data bus SDB, and other units must be created to load and store the index registers X, Y and accomplish data transfers between registers X and S, etc.

A bus transfer transceiver BT1, shown in FIG. 5 as an octal 3-state bidirectional bus transceiver Am2949 can accomplish the transfers between the busses SDB and IDBO. These data transfers are controlled by the signal $\overline{\text{IDBTOSDB}}$ and $\overline{\text{SDBTOIDB}}$. If $\overline{\text{IDBTOSDB}}$ is low and $\overline{\text{SDBTOIDB}}$ is high, then the transfer from IDBO to SDB proceeds. If $\overline{\text{SDBTOIDB}}$ is low and $\overline{\text{IDBTOSDB}}$ is high, then the opposite transfer proceeds. If both the signals are high, then no transfer occurs and both low is meaningless.

Another transceiver BT2 creates the transfer path between the bus SDB and the SPPU 40, and only unidirectional transfer is allowed here.

A PROM PR2 functions in a way similar to the PROM PR1 and the both are enabled by the same signal OCM. The mapping of PR2 is shown in Table 2.

The Stack Pointer Processing Unit (SPPU)

A stack may be implemented in two ways:

1. A fixed number of registers may be provided within the microprocessor itself. This is a "hardware stack". These are rather inflexible.

2. Most general-purpose microprocessors employ another approach, i.e., a software stack, in order not to restrict the stack to a very small number of registers.

The software stack is used in the 6502 microprocessors, where the stack is always stored on Page 1 (Hex 0100–01FF).

In order to keep track of top of the stack within the memory, the 8-bit address register S is used in 6502 microprocessors and is called the stack pointer SP. The operation of the stack in the 6502 microprocessor is such that the stack pointer SP is always pointing at the next memory location into which data can be stored. For example, the stack pointer is assumed to be 01FF in the beginning. When the microprocessor writes one byte contents into the memory location indicated by the stack pointer, namely pushes one byte into the stack, the microprocessor puts the pointer SP onto the address lines. During the time that a write cycle is going on, the stack pointer SP is automatically decremented by 1 to 01FE. Every time one byte contents are pulled out from the stack, the stack pointer SP is automatically incremented by 1.

In the 6502-32 module, some operations of pushes or pulls might involve 4-byte data. Thus, it is inefficient to make use of the register S of the 6502 processor, and instead the module includes the Stack Pointer Processing Unit (SPPU) 40.

Figure 6:
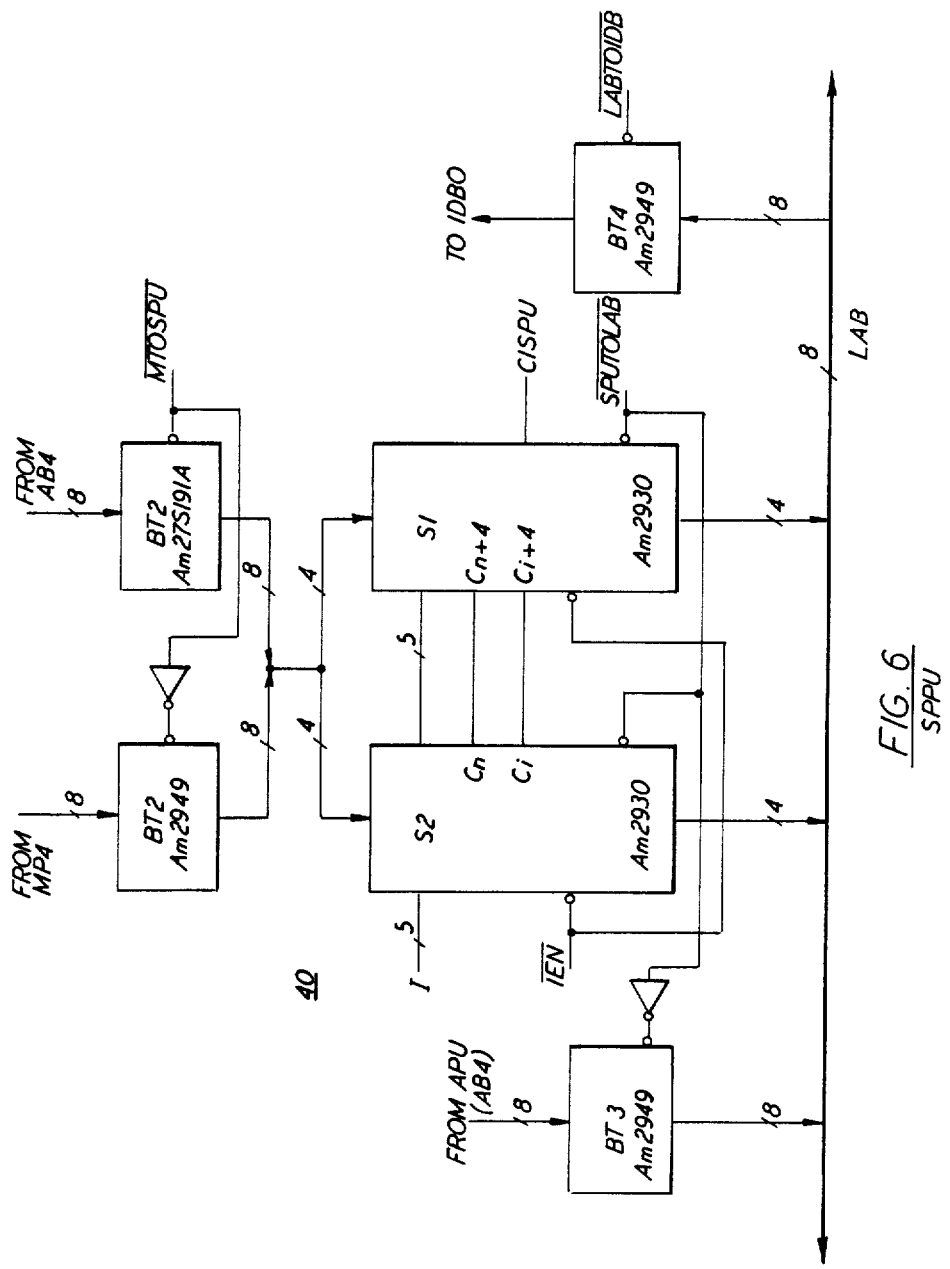
FIG. 6 is a schematic diagram of a stack pointer processing unit of the preferred embodiment.
Figure 7:
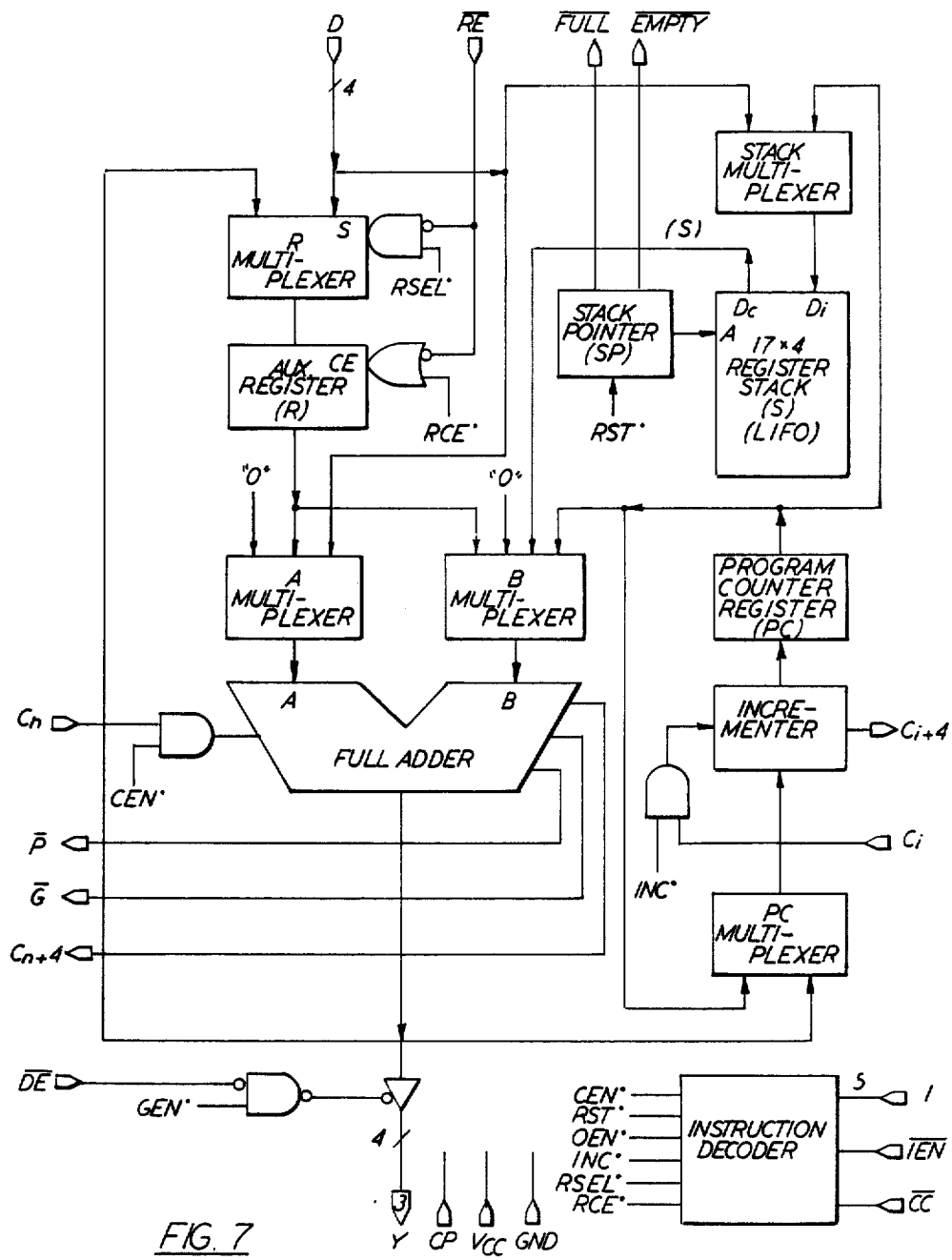
FIG. 7 is a block diagram of one of the element types employed in the stack pointer processing unit.

The SPPU 40 of this embodiment is shown in FIG. 6. Two programs control unit chips S1 and S2 (here type Am2930) form the major part of SPPU 40. The Am2930 is a four-bit wide program control unit intended to perform an addressing function. Two Am2930's, each of which processes a 4-bit nibble, may be interconnected to generate an 8-bit address. The Am2930 contains a program counter, a subroutine stack, an auxiliary register and a full adder for computing addresses (see FIG. 7).

The program counter registers of the program control units S1 and S2 are used as the stack pointer register S of the 6502-32 module. A bus transceiver BT3 (FIG. 6) forms the path from the APU 30 to the bus LAB. This path is controlled by the signal $\overline{\text{SPUTOLAB}}$: if $\overline{\text{SPUTO LAB}}$ is low, then the LAB contents are determined by the outputs of the units S1 and S2, otherwise the LAB will equal the lower 8 bits of bus AB4 (FIG. 5). A bus transceiver BT4 constructs the path from the bus LAB to the bus IDBO, and is useful for execution of instruction TSX. This path is controlled by the signal $\overline{\text{LAB TOIDB}}$.

The Am2930 program control unit is a very powerful chip. There are four sources of data for its adder (FIG. 7) which generates the address output. These are the program counters, the subroutine stack, the auxiliary register and the direct input. Under the control of the instruction inputs I (I4–I0), the multiplexers at the address inputs allow various combinations of these terms to be generated at the three-state address outputs. The AM2930 unit can perform 32 instructions altogether. Here in SPPU 40 only two of these 32 instructions are used, i.e., $$LAB=S \text{ or } LAB=S+DI,$$

where DI is the direct input of units S1 and S2.

The corresponding instruction codes are $$I4, I3, I2, I1, I0 = 10001 \text{ or } 10100.$$

respectively.

The signal CISPU controls the incrementers of the units S1, S2.

The operation $$S \leftarrow LAB+1.$$

is performed when CISPU=1, otherwise $$S \leftarrow LAB.$$

When high, the instruction enable input (IEN) forces the SPPU into the hold mode. This situation will occur when the operation of memory read is not completed by lowering the signal RDY.

Figure 8:
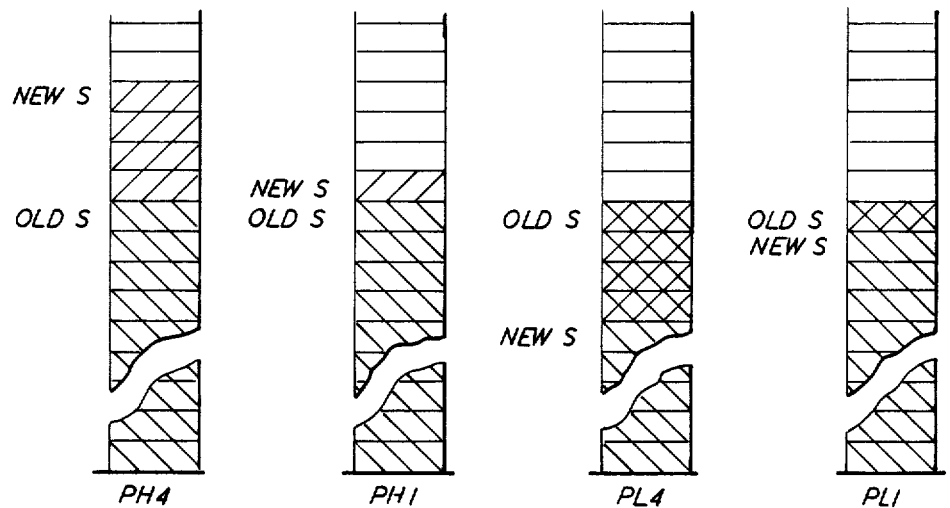
FIGS. 8 and 9 are stack pointer schemes of the stack pointer processing unit.
Figure 9:
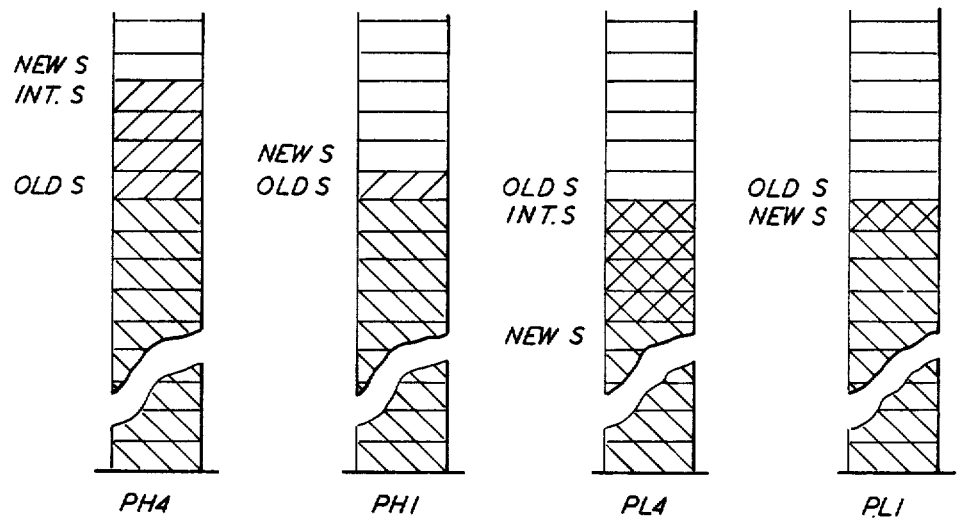

It should be noted that in the 6502 microprocessor the stack pointer S is always pointing at the next memory location into which data can be stored. However, here in the 6502-32 module the S register is pointing at the memory location into which data has been stored most recently. The reason for this arrangement can be explained with reference to FIG. 8 and FIG. 9. FIG. 8 represents the case that S is pointing at the memory location stored most recently (scheme 1), while FIG. 9 represents the case that S is pointing at the next memory location to be stored (scheme 2). FIGS. 8 and 9 give the changes of S during the operations of various pushes or pulls, such as push of 4 bytes (PH4), push of 1 byte (PH1), pull of 4 bytes (PL4), or pull of 1 byte (PL1).

The operations to be performed by SPPU 40 both cases are listed in Table 4 and Table 5, respectively. The meanings of "Old S" and "New S" are self-evident in both cases; the value of intermediate S (Int. S) in FIG. 9 corresponds to the value of LAB in Table 5.

In contrast with Table 5, it is easier to implement the operation listed in Table 4 because there only exists an incrementer rather than a decrementer in the program control unit AM2930.

In summary, there are 9 commands for the SPPU 40 to perform and they are listed below:

LSP . . . load S register
SSP . . . store S register
PH4 . . . push 4 byte contents onto stack
PH1 . . . push 1 byte contents onto stack
PL4 . . . pull 4 byte contents out of stack
PL1 . . . pull 1 byte contents out of stack
PL* . . . pull 1 byte immediately following a PL4 command
AD4 . . . S adjust after PL4
NOP . . . no operation The corresponding operations are given in Table 6. It should be pointed out that the operation PL4 is the only operation which cannot be completed in one cycle. Thus, the operation of S adjust AD4 should follow the operation PL4.

The Microprogrammed Control and Signaling Unit (MCU)

The DPU 20, APU 30, and SPPU 40 of the 6502-32 module are controlled by the microprogrammed control and signaling unit (MCU) 50, and all the control signals and flags are generated by the MCU 50 as well (see FIG. 3).

The MCU 50 is formed of three major subsections:
the microinstruction sequencing logic (MSL);
the microprogram memory (MPM);
the miscellaneous circuits related to the flags and signals (CFS).

(1) The Microinstruction Sequencing Logic (MSL)

Figure 10:
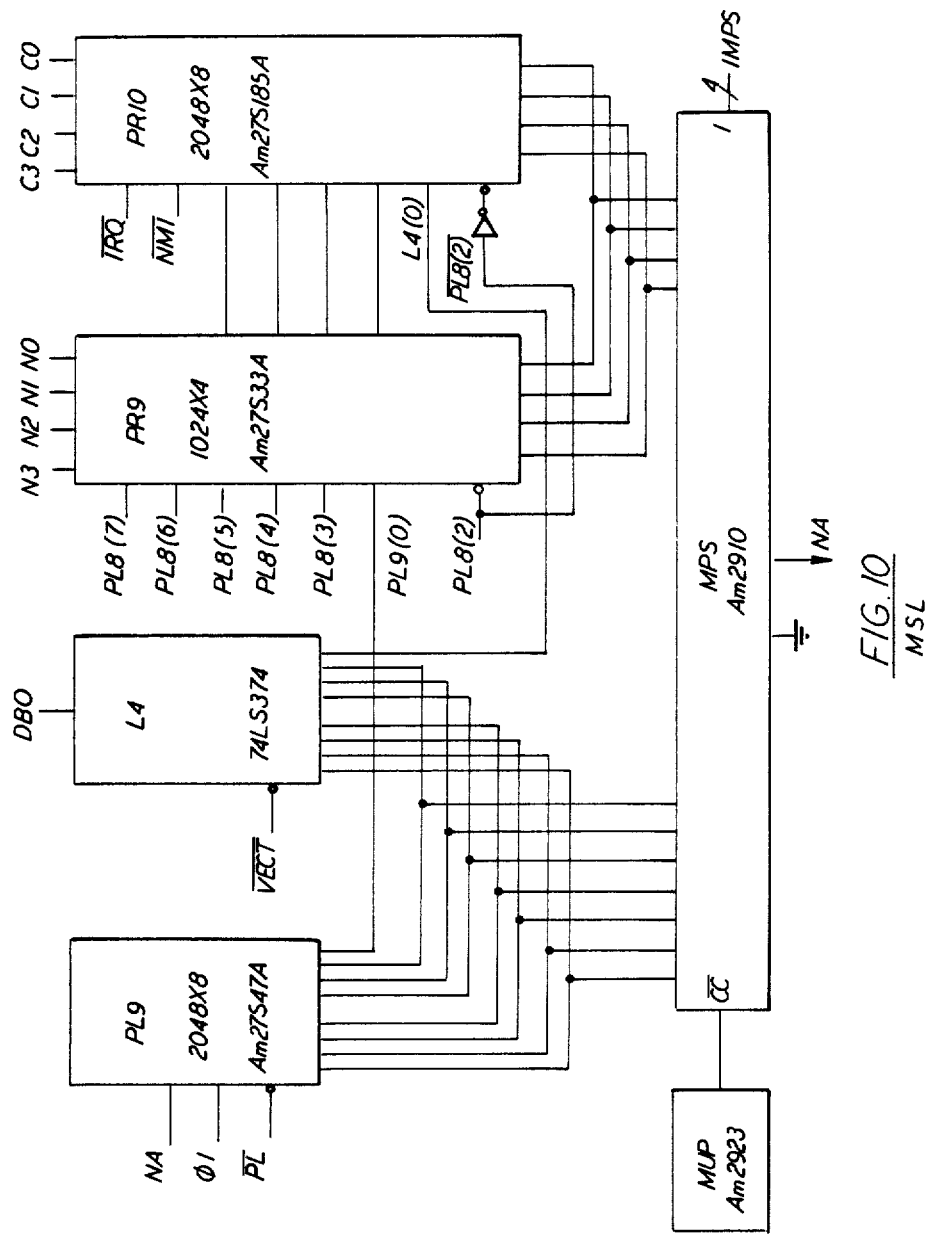
FIG. 10 is a schematic diagram of a microinstruction sequencing logic circuit of a microprogrammed control and signalling unit of the preferred embodiment.

The microinstruction sequencing logic MSL should be discussed first. The purpose of this logic is to change the state of the control unit by determining the address of the active microinstruction for the next cycle. Thus, a microprogram sequencer MPS, several microprogram memory address sources, and a number of status conditions form the microinstruction sequencing logic MSL, shown in FIG. 10.

Figure 11:
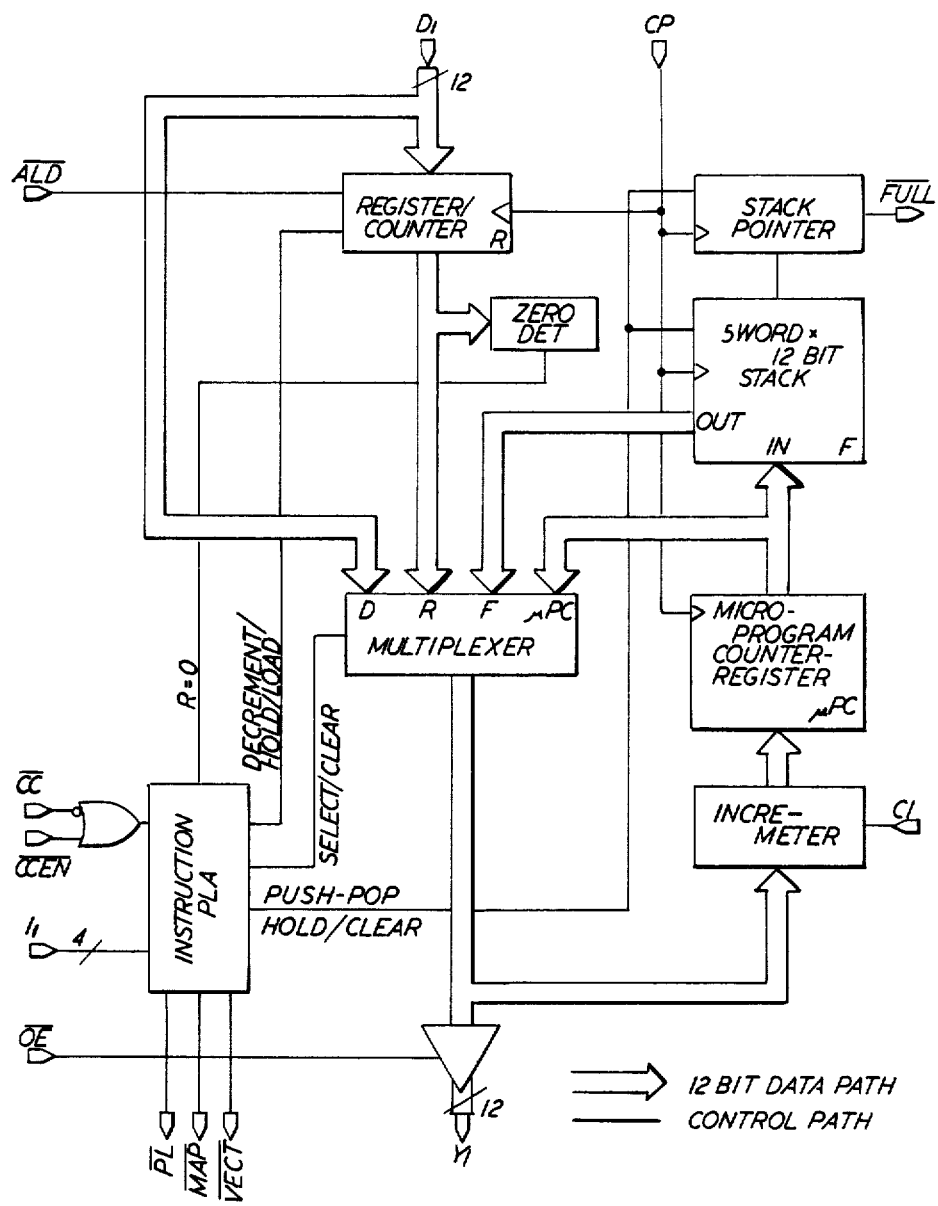
FIG. 11 is a block diagram of one of the elements of the unit of FIG. 10.
Figure 13:
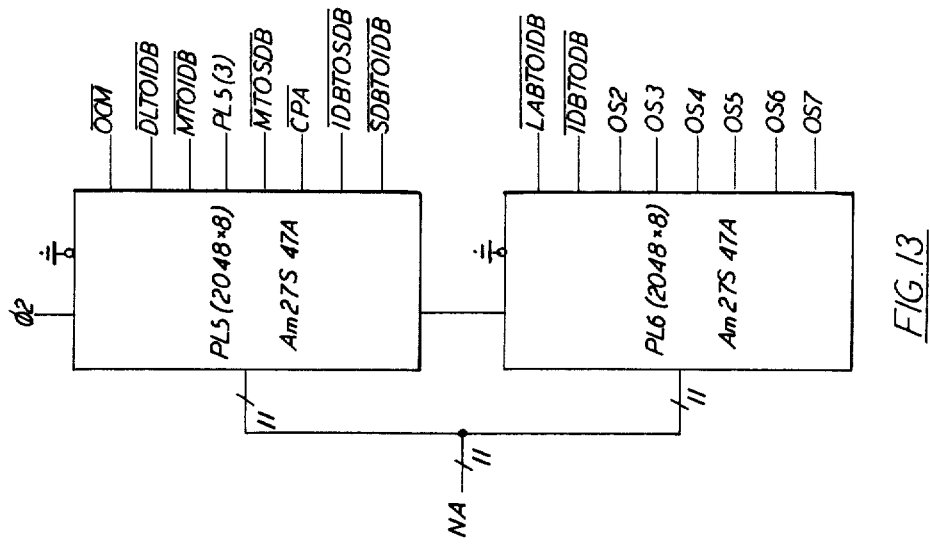
FIG. 13 is a schematic diagram of data bus path control circuitry of the microprogram memory.
Figure 12:
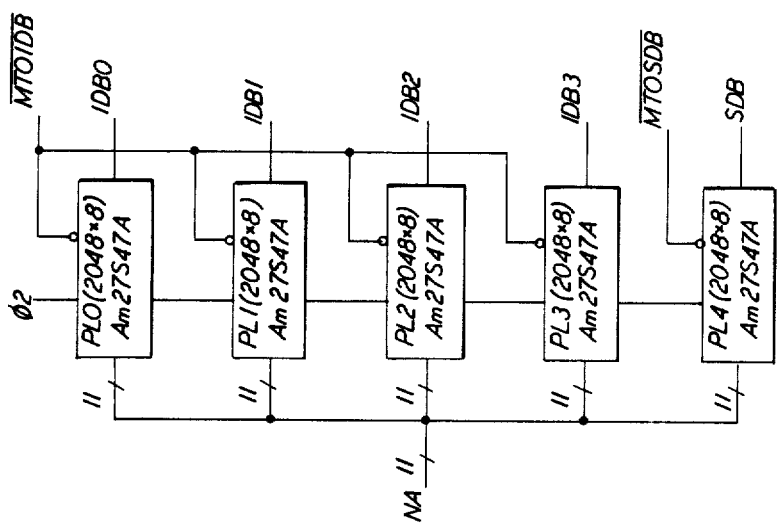
FIG. 12 is a schematic diagram of data bus sources of of a microprogram memory of the microprogrammed control and sequencing logic unit.
Figures 14, 15:
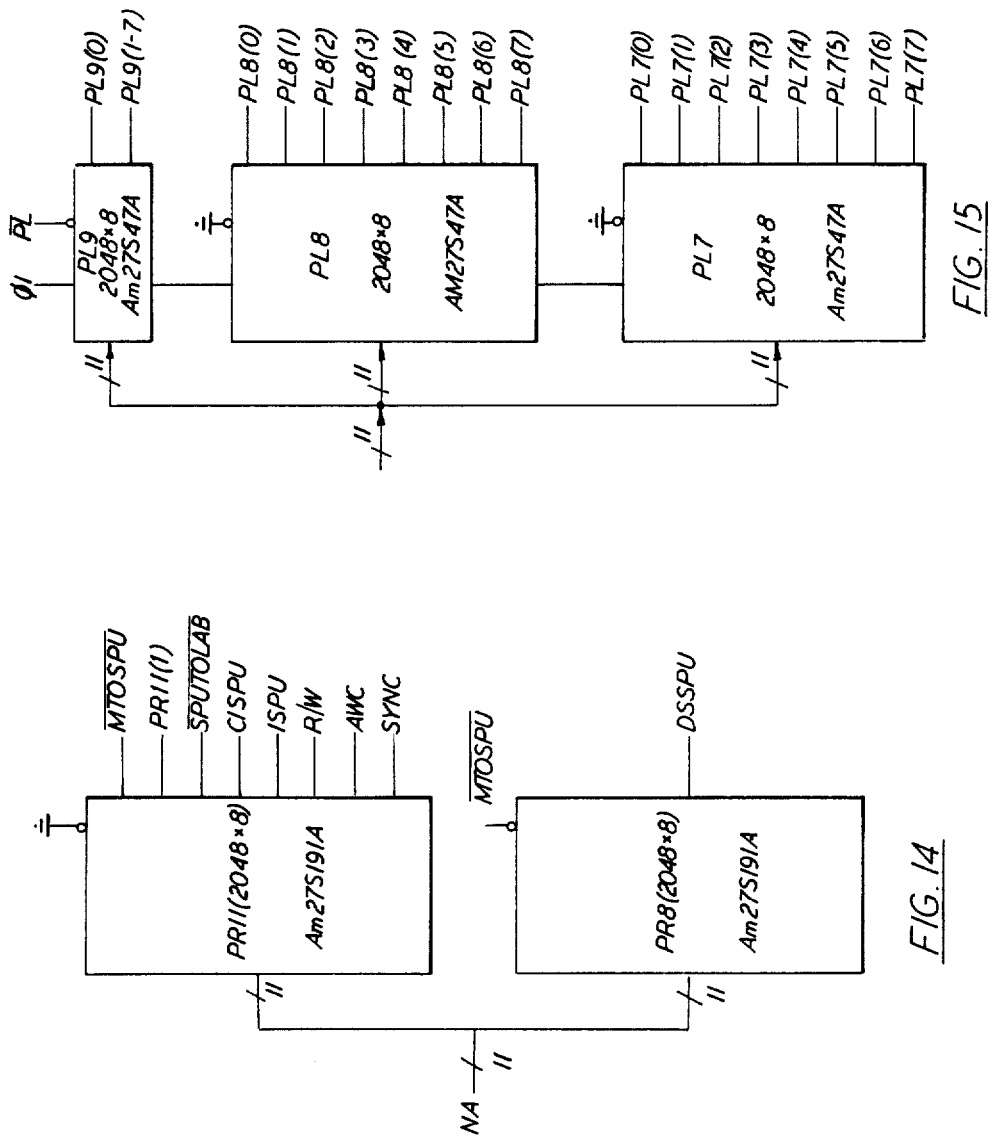
FIG. 14 is a schematic diagram of control signal generating circuitry for controlling operations of the stack pointer processing unit.
FIG. 15 is a schematic diagram of the microprogram addressing circuit of the microprogram memory for generating next addresses for active microinstructions.

The function of the microprogram sequencer MPS, here an Am2910 chip, is to receive one of these several address sources and status, and, from these, to send the address of the next microinstruction over a next-address channel NA to the microprogram memory (FIGS. 12-14). The microprogram sequencer Am2910 processes data 12-bits wide (FIG. 11). During each microinstruction, the sequencer MPS provides a 12-bit address from one of four sources: a microprogram address register PC, which usually contains an address one greater than the previous address; an external (direct) input D; a register/counter R retaining data loaded during a previous microinstruction; or a five-deep last-in, first-out stack F. The selection is determined by input IMPS, i.e., I in FIG. 11, and by the condition code input CC.

For the MCU 50 of the 6502-32 module there are only 2048 locations in the microprogram memory, thus the highest bit of address for the microprogram sequencing logic MSL is grounded.

The direct inputs of the sequencer MPS are provided with the outputs of 4 chips, PROM PL9, a logic circuit L4, PROM PR9, and PROM PR10. The PROM PL9, itself a part of the microprogram memory, is a 2048*8 bit PROM Am27S47A with output register. Its outputs are enabled by the signal PL from the sequencer MPS. The logic circuit L4 is an 8-bit register 74LS374. The OP code at the bus DBO is registered in the logic circuit L4. The outputs of the latter are enabled by a signal $\overline{VECT}$ from the sequencer MPS. The PROM PR9 is a 1024*4 bit PROM Am27S33A, its 10-bit address consists of the 0th output of PROM PL9, PL9(0), the 3rd through 7th output bits of a PROM PL8 (in the microprogram memory), PL8(3) through PL8(7), and the flag registers N0, N1, N2, and N3. The PROM PR10 is an 2048*4 bit PROM Am27S185A, whose 11-bit address consists of the zeroth output bit of logic circuit L4, L4(0), the output bits PL9(0), PL8(3), PL8(4), PL8(5), the input signals NMI, IRQ, and the flag registers C0, C1, C2, and C3. The outputs of the PROMs PR9 and PR10 are enabled by the signals PL8(2) and $\overline{PL8(2)}$ respectively.

The PROMs PR9 and PR10 are programmed to implement the microprogram branch on the flags N0, N1, N2, N3 or C0, C1, C2, C3 up to 16 ways, as shown in Table 7. For example, if PL=0 and PL8(2), PL8(3), PL8(4)=101, then $$D = PL9(7), PL9(6), \ldots, PL9(1), C3, C2, C1, C0.$$

The value of D is determined by the PROM PL9 and flags C0, C1, C2 and C3, i.e., D can be one of 16 different values which correspond to the status of the flags, C0, C1, C2 and C3. When the sequencer MPS (Am2910) executes the instruction "conditional jump to PL" and CC=0, the microprogram can jump to one of 16 addresses depending on the conditions of C0, C1, C2, and C3. The function of this 16-way branch is to speed up the execution of instructions in the 6502-32 module.

The input $\overline{CC}$ of the sequencer MPS is provided from the output of a multiplexer MUP. The multiplexer MUP is an eight-input multiplexer Am2923 that switches one of eight inputs onto the output under the control of a 3-bit select code. In the MCU 50, the 3-bit select code comes from the control storage, the eight inputs come from flag and signal registers.

The microprogram memory consists of a number of PROM's with or without output registers. The PROMs without output registers are identified by a reference symbol PR, the PROMs with output registers by a reference symbol PL. According to its use the microprogram memory is divided into five fields:

DBS . . . as data bus sources
DBC . . . for path control of data bus
SPU . . . for operations of SPPU MPA . . . the next address of the active microinstruction
SIG . . . for signalling These PROM's are shown in FIG. 12 through FIG. 15. These figures are self-evident.

FIG. 12 shows the data bus sources DBS with five PROMs PL0 to PL4 with inputs receiving the next address data NA and outputs coupled to the respective data busses IDB0 to IDB3 and SDB.

FIG. 13 shows the data bus path control DBC with PROMs PL5 and PL6 generating the various control signals $\overline{\text{OLM}}$, $\overline{\text{DLTOIDB}}$, $\overline{\text{MTOIDB}}$, PL5(3), $\overline{\text{MTOSDB}}$, $\overline{\text{CPA}}$, $\overline{\text{IDBTOSDB}}$, $\overline{\text{SDBTOIDB}}$, $\overline{\text{LAB}}$ $\overline{\text{TOIDB}}$ and $\overline{\text{IDBTODB}}$, and operation selection codes OS2 to OS7.

FIG. 14 shows the SPPU operation memory SPU, formed of PROMs PR8 and PR11, generating the signals $\overline{\text{MTOSPU}}$, PR11(1), $\overline{\text{SPUTOLAB}}$, CISPU, ISPU, R/W, AWC, SYNC, and DSSPU.

FIG. 15 shows the memory circuitry for generating next-address selection of the active microinstruction, and includes PROMs PL7, PL8, and PL9 generating address bits PL7(0) to PL9(7).

Miscellaneous circuits related to the flags and signals (CFS)

Figure 16:
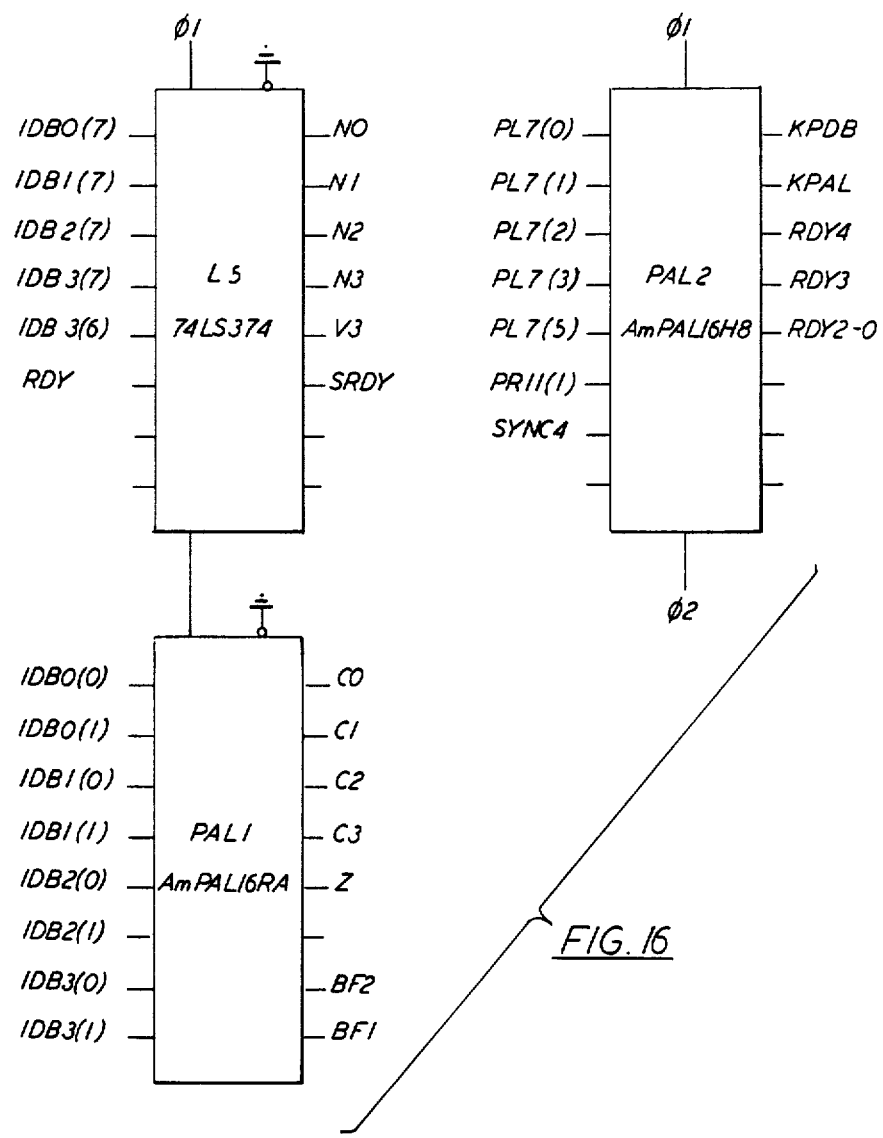
FIG. 16 is a schematic diagram of miscellaneous signalling circuitry of the microprogram memory for generating flag registers and signals.

The miscellaneous circuits include the flag register circuits and signalling circuits; these being shown in FIG. 16.

It has been mentioned in the section MSL that the microinstruction sequences are highly related to the status of flags of the 6502-32 module, and the status of the flags are represented by the combination of the four P registers which are contained in microprocessors MP0, MP1, MP2, and MP3 of the DPU 20. In order to make the status of flags visible for the MCU 50, the instruction PHP has to be executed by the microprocessors MP0, MP1, MP2, and MP3. The execution of the instruction PHP will put the P registers onto the data bus IDB at certain cycle. Thus, the status of the flags can be examined at that time or it can be stored for examination afterwards.

In these circuit designs, the five 6502 microprocessors work simultaneously. The instructions executed in this five microprocessors might be different at any given moment, and the numbers of clock cycles needed might be different too. But when the operation involves memory access these five microprocessors have to co-operate with each other, i.e., the microprocessor MP4 has to provide the accessed memory address, and the microprocessors MP0, MP1, MP2, and MP3 have to fetch the data from the memory or deposit the data into the memory simultaneously. To do so, the microprogram control unit MCU synchronizes these five microprocessors. A most convenient means of synchronization is to lower some of the ready line signals RDYi during the read cycle. Lowering the signal RDYi could suspend the operation of the ith microprocessor, thus delaying it one or more cycles. The symbols NRDY4, NRDY3, and NRDY2 . . . NRDY0 represent lowering the signals RDY4, RDY3, and RDY2 . . . RDY0, respectively.

Most signals are directly issued by the control storage. Thus only a few miscellaneous circuits are needed. There are only the three logic chips L5, PAL1, and PAL2 in this unit (FIG. 16).

The basic idea of this design is to divide the processed data into several bytes, e.g., four bytes, and process these bytes of the data concurrently; thus a higher working speed can be obtained. Obviously, some adjusts are unavoidable because for certain bytes the result of operation might relate to not only the byte itself but the other bytes of the data. For example, when the instruction ADC is executed the result of addition operation of the higher type should be related to the lower bytes of the data. Therefore adjusts are needed. Generally, the adjusts include:

OP code mapping;
PC adjust;
result adjust; and
flag adjust.

It should be pointed out that not all the adjustments are necessary for the execution of every instruction. Only a part of the adjustments is needed for the execution of most instructions. Each of the adjust techniques will be separately described in the following.

(1) OP Code Mapping

The operation of any computer begins with the operation of fetching an instructon. In the microprocessors the first byte of an instruction is called OP code. There are five 6502 microprocessors in the 6502-32 module. It is not always the case to fetch an OP code from main memory and directly send it to all of the five microprocessors for execution. In order to execute the fetched instruction, the operation accomplished by the five microprocessors are not necessarily the same, as can be explained through examples.

EXAMPLE 1

It is assumed that the fetched OP code is "30" (BMI). This instruction takes the conditional branch if N is 1. The relative mode of addressing is for this instruction. When N=1 the value in the memory location following the OP code should be added to the program counter to form the new value of the program counter. It is known from the equation (1) that the flag N of the 6502-32 module is N3. On the other hand, the program counter of the 6502-32 module is in the APU 30 (The PC and Address Processing Unit), i.e., in microprocessor MP4. Whether taking the branch in microprocessor MP4 or not depends on the flag N3 in microprocessor MP3. It is established that C4=0, and flag N4 is not used in the 6502-32 module. Therefore, the OP code mapping 08 (PHP) for MP0, MP1, MP2, and MP3
90 (BCC) for MP4 should be made.

The purpose of the execution of the instruction PHP in MP3 is to put the flags onto the bus IDB for test. It does not matter in this case which instruction is executed in microprocessors MP0, MP1, and MP2 so long as any of the registers in these microprocessors is not changed. For simplicity the PROM PR1 in FIG. 4 is the only chip employed to accomplish OP code mapping for all four microprocessors MP0, MP1, MP2, and MP3, i.e., the same OP code mapping applies to all four microprocessors. Thus, the microprocessors MP0, MP1, and MP2 execute the same instruction PHP as the microprocessor MP3.

In fact the microprocessor MP4 will always take the branch because the carry flag C4 of MP4 is always 0. It is microprogrammed that the offset which is to be added to the program counter will depend on the flag N3:

If N3=1, the offset equals the value in the memory location immediately following the OP code;
If N3=0, the offset equals 0.

The PROM PR2 in FIG. 5 is used for OP code mapping of the microprocessor MP4. The mappings of PROMs PR1 and PR2 are given in Table 1 and Table 2, respectively.

EXAMPLE 2

It is supposed that the fetched OP code is "3D" (AND-Absolute, X). It is required to perform a bit-by-bit logical AND operation on the accumulator A and the data which is fetched from memory with absolute indexed addressing. It is known that the sequences for absolute indexed addressing are variable depending upon the addressing with or without page crossing. Thus it is impossible to keep the same sequence for all the four microprocessors MP0, MP1, MP2, and MP3 because, generally, the values of registers X or Y in these four microprocessors are not the same. In order to simplify the control it is desirable to maintain the same addressing sequence for them. Therefore OP code mapping has to be made. It can be found from Table 1 that the OP code "3D"0 is mapped to "2D", performing the logical AND operation on the accumulator A and the data which is fetched from memory with absolute addressing. In fact, it does not matter for the microprocessors MP0, MP1, MP2, and MP3 which addressing is taken, so long as the APU 30 proceeds with the address calculation and is under the control of MCU 50, as the memory provides them with the desirable data to perform the AND operation anyway.

It can be seem from the above examples that OP code mapping is necessary for the execution of the branch instructions, some instructions with indexed addressing, and a few other instructions.

(2) PC Adjust

The PC adjust is needed in the execution of the instruction with immediate addressing. In the 6502 microprocessor the instructions which use immediate addressing are two-byte instructions. The first byte contains the OP code specifying the operation and address mode. The second byte contains the operated data. But the operated data should be 32-bits wide in the 6502-32 module. Thus, in 6502-32 the instructions with immediate addressing are five-byte instructions, one byte is for OP code, other four bytes are for operated data. In the APU 30 of the 6502-32 module, the program counter (PC) in the microprocessor MP4 will be incremented automatically by 2 rather than 5 after each execution of the instructions with immediate addressing. That is why the PC adjust operation is needed.

The purpose of the PC adjust is to force the program counter in the microprocessor MP4 to be incremented by 5. This can be done by making a branch instruction execute in the microprocessor MP4. If the procedures of OP code mapping and PC adjust are joined together, then the module will operate still more efficiently. This can be explained by the following example.

EXAMPLE 3

Suppose that the fetched OP code is "09" (ORA-Immediate). The instruction performs the logical OR operation on the accumulator A and on the immediate data. From Tables 1 and 2 it could be seen that the mapped code "09" is sent to the microprocessors MP0, MP1, MP2, and MP3, "90" is sent to the microprocessor MP4.

"90" is the OP code of the instruction "branch on carry flag". Here, C4=0. Thus, the microprocessor MP4 is certain to take the branch. In the following cycle, if the MCU 50 provides microprocessor MP4 of the APU 30 with the one byte data "3" then the PC adjust can be accomplished. The data "3" is stored in the location "048" of the microprogram memory (see Appendix).

It is apparent that the number of cycles taken for the execution of the instruction "90" in microprocessor MP4 is greater than the number of cycles taken for the execution of the instruction "09" in microprocessors MP0, MP1, MP2, and MP3. After the completion of the execution of instruction "09" in microprocessors MPO, MP1, MP2, and MP3, the MCU 50 has to keep the microprocessors MP0, MP1, MP2, and MP3 waiting until the execution of instruction "90" in the microprocessor MP4 is completed. There are two methods to keep the microprocessors waiting:

1. lowering the ready line RDY i (i=0,1,2,3) of the microprocessors by the MCU50 if the microprocessor in question is in a read cycle;

2. inserting one or more executions of the instruction "EA" (NOP) in the microprocessors.

The method 2 can make the microprocessor wait only for even cycles, but no such limitation exists for method 1.

Both the methods 1 and 2 are adopted in this example (see the location 049 and 04A in Appendix).

(3) The Result Adjust

The result adjust can be explained by examples.

EXAMPLE 4

Suppose that the instruction ADC, say "65"—adding memory to accumulator with zero page addressing, is to be executed. That is, the 32-bit data word M is fetched from the memory location specified by the byte immediately following the OP code "65", and is added to accumulator A, $$A+M+C \rightarrow A, C.$$

In fact, the accumulator A of the 6502-32 module consists of four accumulators A0, A1, A2, and A3 which are contained in the microprocessors MP0, MP1, MP2, and MP3, respectively. Each is 8-bits in width. The 32-bit data M are divided into 4 bytes, M0, M1, M2, and M3. These are loaded into the four microprocessors MP0 to MP3 separately. The operations of addition are accomplished in the four microprocessors simultaneously:

$$A0+M0+C0\rightarrow A0, C0;$$

$$A1+M1+C1\rightarrow A1, C1;$$

$$A2+M2+C2\rightarrow A2, C2;$$

$$A3+M3+C3\rightarrow A3, C3.$$

It is known that C=C0, and C1=C2=C3=0 before the execution of this instruction. Thus, the operation of addition "A+M+C" is equivalent to the combination of the operations "A3+M3+C3", "A2+M2+C3", "A1+M1+C1", and "A0+M0+C0". But in order to obtain the correct sum of addition in A and the correct carry flag, the resultant carry flag C0 of MP0 after the above operation of addition should be added to A1 of MP1 once more, the resultant C1 should be added to A2 of MP2 once more, and so forth. It should be noticed that the above adjust procedure could be performed more times. This operation is called result adjust.

Lastly, the final resultant carry flag C3 has to be applied to the microprocessor MP0 as the carry flag C of the 6502-32 module after the execution of the instruction, and the carry flags C1, C2, and C3 then are cleared. This operation is called flag adjust, which will be discussed in the following section. In some cases the result adjust and the flag adjust are combined to reduce the number of executing cycles.

We now continue to discuss the result adjust for the instruction ADC. The first step of the result adjust is to inspect the carry flags C0, C1, C2, and C3 through the execution of the instruction PHP in the microprocessors MP0, MP1, MP2, and MP3. It should be pointed out that the execution of the instruction PHP in the microprocessors MP0, MP1, MP2, and MP3 does not result in pushing the P register into the stack so long as the signal "write" is not issued by the 6502-32 module and the S register of the 6502-32 module is not changed. The only action of this execution of PHP is to put the flags onto the bus IDB for examination. After the execution of "PHP" the result adjust microprogram can have 16 branches depending on the carry flags C0, C1, C2, and C3 (as shown in location 34B of the Appendix). For instance, it is supposed that $$C0=1; C1=1; C2=0; C3=0.$$

Then the following adjust sequence should be performed:
clear carry flag (CLC) in MP0;
add 1 to A1 (ADC) in MP1;
add 1 to A2 (ADC) in MP2;
no operation (NOP) in MP3.

This is disclosed at location 313 of the Appendix.

The result adjust sequences for various combinations of the carry flags C0, C1, C2, and C3 are given in Table 8.

This adjust is called the first adjust. Depending on the result of the first adjust, further adjusts might be needed. In order to reduce the microprogram sequence for such an adjust, the scheme of this embodiment adds 1 into microprocessor MP2 in advance during the first adjust when $$C3, C2, C1, C0=0001 \text{ or } 1001$$

This adjust measure "adding 1 in advance" could reduce the length of the result adjust sequence for the execution of the instruction ADC.

Now let us look at another example.

EXAMPLE 5

An instruction "06", shifting left one bit with zero page addressing, is to be executed.

At first, the 32-bit data word to be shifted is fetched from memory, then it is divided into four bytes, each of which is set to the corresponding microprocessor 6502 to be shifted, and after shifting the result is deposited into memory again.

When each of the four 6502 microprocessors executes the instruction "06", the least significant bits of the bytes are always filled by zeroes. This result should be adjusted according to the old values of the most significant bits of the next lower bytes. Here the "old value" means the value before shifting. Under the control of the signal OS2 through OS7 (in FIG. 4) this adjust could be accomplished by PROMs PR4, PR5, PR6, and PR7 of FIG. 4.

The most significant bits of these four bytes are represented by N0, N1, N2, and N3, respectively. The same names as the negation flags are used here because the bit representing negation flag is the most significant bit of the P register as well. When the contents on the bus IDB are examined by the MCU 50, the most significant bit of the byte i is always called Ni, no matter whether the examined contents are really flags or not.

Thus, it is not difficult to understand the microprogram for the result adjust shown in 038–03F and 0B8–0BF of the Appendix.

(4) The Flag Adjust

EXAMPLE 6

The best example to explain the flag adjust is the execution of the instruction CMP. This instruction subtracts the memory contents M from the contents A of the accumulator, giving a difference result A−M. The use of the CMP affects the following flags: a flag Z is set on an equal comparison, reset otherwise; the flag N is set or reset by the result bit 31; the carry flag is set when the value in memory is less than or equal to the accumulator, reset when it is greater than the accumulator. The accumulator itself is not affected.

The execution of the instruction CMP in the 6502-32 module begins by sending the fetched 32-bit data M into the four 6502 microprocessors MP0, MP1, MP2, and MP3 which perform the comparisons A0−M0, A1−M1, A2−M2, and A3−M3 simultaneously. The status of the flags Ci, Ni, Zi will be set up after the comparison in each microprocessor MPi. Now the question is how to set up the status of the flags C, N, Z of the 6502-32 module according to the microprocessor flags Ci, Ni, and Zi, where i=0 through 3.

The adjust for zero flag Z is not needed.
It is known that the M< =A if and only if
"M3≦A3" or
"M3=A3 and M2<A2" or
"M3=A3 and M2=A2 and M1<A1" or
"M3=A3 and M2=A2 and M1=A2 and M0= <A0",
i.e., the carry flag C should be set up according to the Boolean function BF1, $$BF1 = \overline{C3Z3} + C3Z3\overline{C2Z2} + C3Z3C2Z2\overline{C1Z1} + C3Z3C2Z2C1Z1C0$$

A programmable array logic, of the type AmPAL16-R8A, is favorably used to implement this logic function (PAL1 in FIG. 16).

We will now discuss the flag N. The flag N coincides with the result bit 31 of the subtraction A−M. In order to determine this bit we define the Boolean function BF2, $$BF2 = \overline{C2} + C2Z2\overline{C1} + C2Z2C1\overline{Z1}C0$$

the BF2=1 if and only if
"A2<M2" or
"A2=M2 and A1<M1" or
"A2=M2 and A1=M1 and A0<M0".
that means that if BF2=0 then the result bit 31 of A−M coincides with the bit 7 of (A3−M3) in MP3, in this case the flag N adjust is not needed, otherwise the result bit 31 of A−M should coincide with the bit 7 of A3−(M3+1) in microprocessor MP3. The Boolean function BF2 is implemented by the same PAL chip as the above. The operation of adding 1 to memory contents M3 is accomplished by the PROM PR3 of FIG. 4.

The microprogram segments for the flag N adjust and the flag C adjust during the execution of the instruction CMP being at the locations 62C and 62D in the Appendix, respectively.

In summary, the basic techniques used in this design include:

the techniques to synchronize the several microprocessors;

the techniques to inspect the status of the microprocessors;

the techniques to transfer data between the microprocessors;

the techniques to accomplish microprogram multiple-way branches; and so forth.

Using these basic techniques various adjusts can be implemented.

Figure 17:
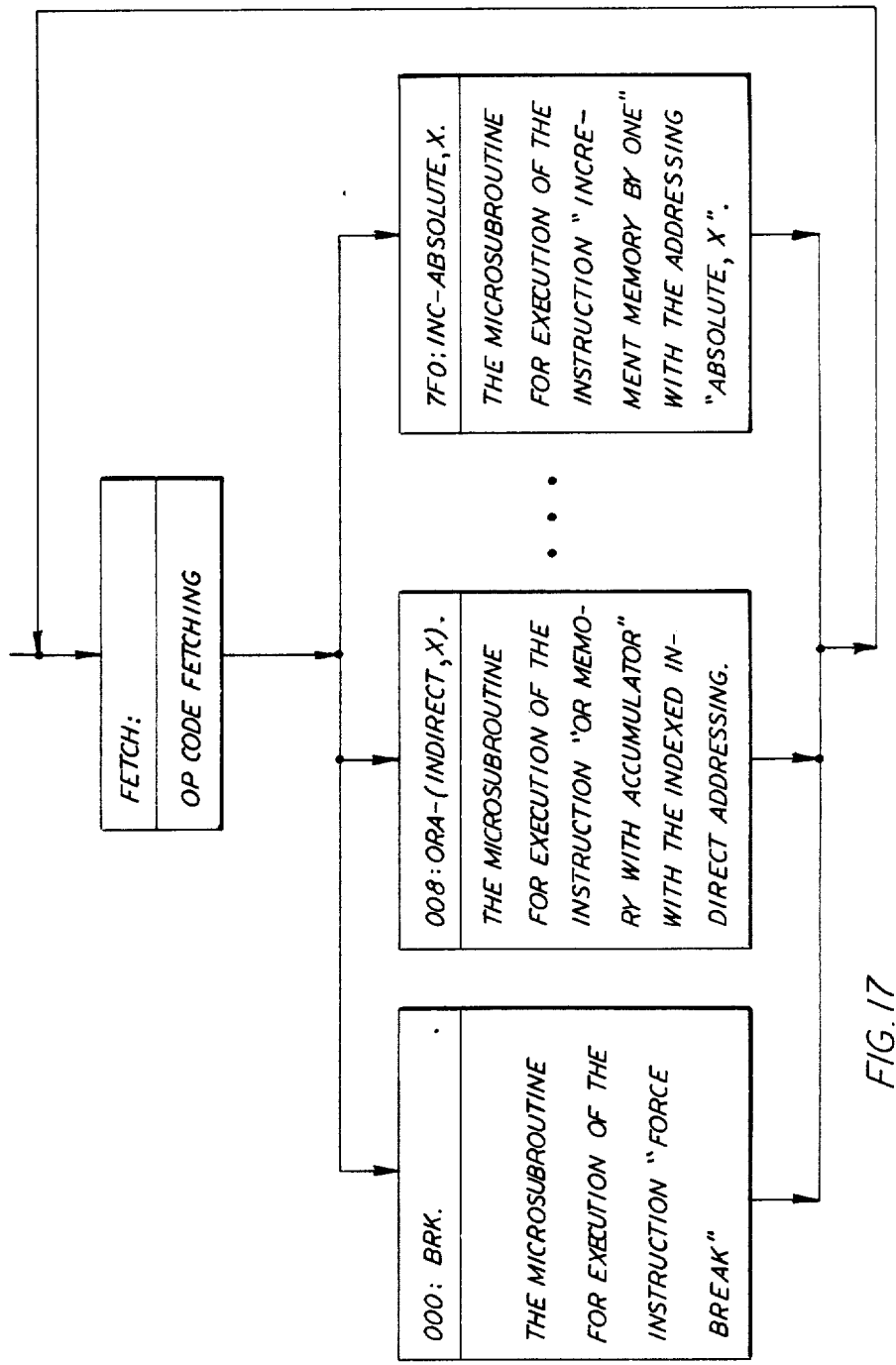
FIG. 17 is a schematic chart showing the general organization of the microsubroutines of the microprogram employed with the preferred embodiment.

General organization of the microsubroutines employed in this embodiment is shown in FIG. 17. It can be seen that a fetch operation retrieves an op code, which identifies the microsubroutine next to be executed. Here, three representative subroutines are illustrated: 000:BRK, 008:ORA, and 7F0:INC. Following each execution, the next op code is retrieved.

The integrated circuit chips used in the 6502-32 module are listed in Table 9. There are forty-two chips needed altogether. In comparison with SSI/MSI implementation or bit-slice implementation, fewer chips are employed in this design. In addition, the design procedure according to this invention is greatly simplified.

The clock cycle requirements for the 6502-32 module are listed in Table 10. It can be seen from this table that in comparsion with the unitary 6502 microprocessor more clock cycles are needed for the execution of 55.6 percent of the 6502-32 module's instructions. The percentage of the instructions vs. the number of additional clock cycles over the 6502 microprocessor are listed as follows:

| Percentage of Inst. | No. clock cycles more than 6502 |
|---|---|
| 11.3 | 1 to 2 |
| 17.2 | 3 to 5 |
| 24.4 | 6 to 10 |
| 2.7 | over 10 |

The average number of clock cycles per instruction execution is increased by 84.5%. That means that in contrast with single micropocessor less than twofold increase of time is needed to process four times as much data.

The module presented in this description could be considered a hybrid of bit-slice implementation and single microprocessor approach, to some extent. This approach takes advantage of the well-designed microprocessors, making the best use of the data paths and control circuits in the microprocessors. Thus, the design and the design procedure could be fairly simple. On the other hand, as the multiple microprocessors work simultaneously, this design has a fairly high working speed. The control unit is microprogrammed, making the design structured and expansible. The microprograms for every instruction are given in the Appendix. It can be seen that an augmented instruction set can be easily implemented with unchanged hardware organization in this design.

From the description given above, the following conclusions about the design and applications of the module of this invention can be made.

Let us take a glance at the example 6502-32 module again. In this example the number of memory address bits is the same as in the 6502 processor, and the address calculation is almost the same as in the 6502 processor; thus in this particular case only one 6502 microprocessor is needed in the Address Processing Unit. In general, either one or more than one microprocessor might be employed to construct the address processing unit. For example, if the designer would like to change the number of memory address bits of 6502-32 to 32, then a four-microprocessor address processing unit could replace the Address Processing Unit and the Stack Pointer Processing Unit of the 6502-32 module. The registers X, Y in these four microprocessors are assigned as the program counter and the S register of the module, respectively. In this case the Address Processing Unit becomes highly similar to the Data Processing Unit, and will have similar data paths, thus the design procedures will be similar.

It can be concluded that the microprogram-coupled multiple-microprocessor module could be used to expand the computational power of the general purpose microprocessors, e.g., the word size, the addressable memory location and the executed instruction set.

The module of this invention employs new structure to implement a processor. This implementation is more efficient than previous endeavors because of its multiple-microprocessor construction, and is more flexible because it is microprogrammable. The module has higher degree of modularity. For example, one kind of microprocessor could be employed in one module, and another kind of microprocessor might be used in another module, and both the modules could be used in the same system so long as timing restrictions are not violated. It is not difficult to do the microprogramming. The microprocessors employed in the module are very powerful chips, with quite complex control circuits built in. Designers of the module could make the most use of the various functions of the microprocessors and keep the microprogrammed control circuitry simple.

From the above description, it can be seen that this multiple-microprocessor module structure, could be used in many applications.

Some computation-intensive tasks, such as circuit simulation or device modeling, demand high-speed, high-precision floating-point processing. Those persons familiar with this art are becoming increasingly aware of the advantages of working with floating-point processors. In order to obtain high speed, the processing can be partitioned over a number of concurrently operating units. Often a process may be divided into two ways: synchro-parallelism and pipelining.

In synchro-parallelism the processing is symmetrically partitioned into identical subprocessing, each preceeded by one processor. In pipelining, the processing is distributed to pipeline stages. One processor could be employed by a pipeline stage. The processor could be either a general purpose microprocessor or a special purpose processor. High speed multipliers and adders are two examples of special purpose processors. For instance, the multiplication of two 64-bit data words could be implemented by four 32-bit multipliers and several adders. These multipliers and adders could be coupled by microprogram in either the synchro-parallelism or pipelining mode, depending on the requirement as to speed.

It can be seen that a wide data path can be obtained with the module because the application of multiple-microprocessor. Furthermore, the module can be easily microprogrammed according to the task assignment. Thus, the module is applicable to floating-point processors, so it could be used as subprocessor or a pipeline stage.

By way of analogy, the module is applicable to many systems with uniprocessor or multiple processor architecture. The module can be applied to systems with long data words, special instruction sets, and high-speed requirements.

It can be seen from the discussion of the 6502-32 module that it takes much time to accomplish several adjusts. If the registers or flags of the microprocessors used in the module are easier to access, then less time will be consumed for the adjusts, thus it will make the module more attractive. On the other hand, if a particular microprocessor executes one instruction per cycle and has a rich-register architecture, it would be highly suitable for use in the module.

Portions of the module or the entire module could be fabricated on a single microprogrammable chip.

Figure 18:
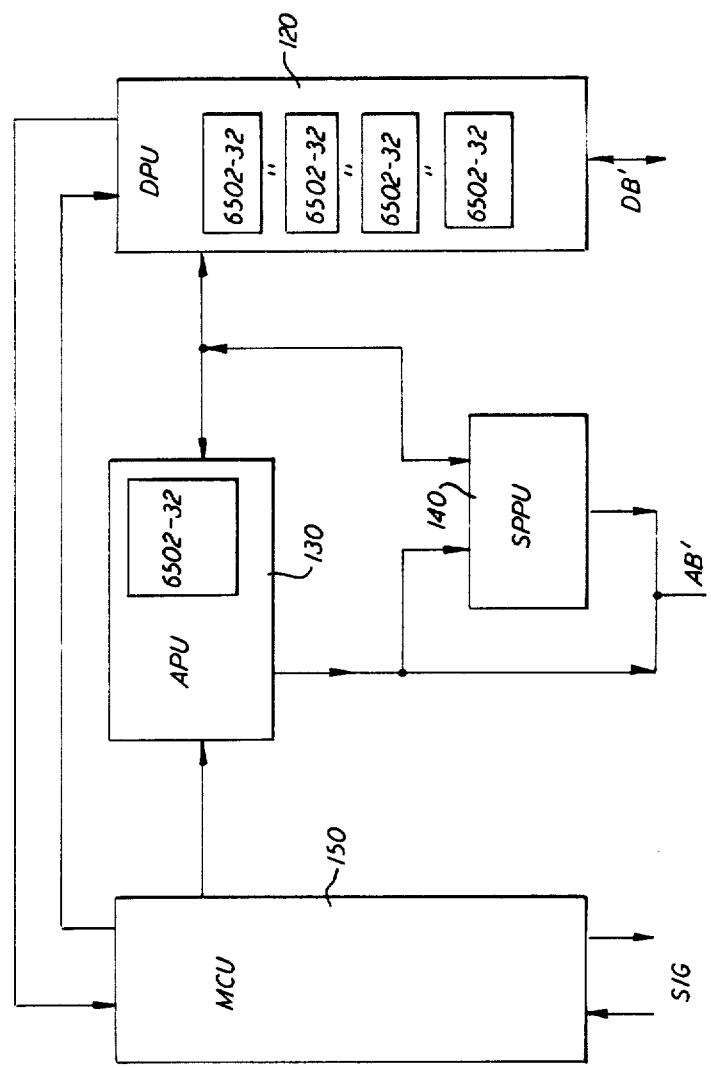
FIG. 18 is a block diagram of a second-order multiple-microprocessor module based on the multiple microprocessor module of the preferred embodiment.

It is also possible to employ the multiple-microprocessor module as a building block of a second level system module, an illustrative example of which is depicted in FIG. 18. Here, the module, like that of FIG. 3, has a DPU 120, an APU 130, an SPPU 140 and an MCU 150. The DPU 120 employs four parallel 6502-32 modules, and the APU 130 another 6502-32 module. The data bus DB' of this second level module has a path width of 128 bits, and the address bus AB' has a path width of 64 bits. Third, fourth, and nth level systems could be constructed.

Of course, the presentation above of a preferred embodiment with some discussion of modification and variations does not limit the scope of the invention, for many further modifications and variations would present themselves to those of skill in the art without departure from the scope and spirit of the invention, as defined in the ensuing claims.

TABLE 1

| | \multicolumn{16}{c}{OP Code Mapping (PR1)} |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | EA | 01 | XX | XX | XX | 05 | 06 | XX | 08 | 09 | 0A | XX | XX | 0D | 0E | XX |
| 1 | 08 | 01 | XX | XX | XX | 15 | 16 | XX | 18 | 0D | XX | XX | XX | 0D | 1E | XX |
| 2 | EA | 21 | XX | XX | 24 | 25 | 26 | XX | 28 | 29 | 2A | XX | 2C | 2D | 2E | XX |
| 3 | 08 | 21 | XX | XX | XX | 35 | 36 | XX | EA | 2D | XX | XX | XX | 2D | 3E | XX |
| 4 | 40 | 41 | XX | XX | XX | 45 | 46 | XX | 48 | 49 | 4A | XX | 4C | 4D | 4E | XX |
| 5 | 08 | 41 | XX | XX | XX | 55 | 56 | XX | 58 | 4D | XX | XX | XX | 4D | 5E | XX |
| 6 | 60 | 61 | XX | XX | XX | 65 | 08 | XX | 68 | 69 | 08 | XX | 6C | 6D | 08 | XX |
| 7 | 08 | 61 | XX | XX | XX | 75 | 08 | XX | 78 | 6D | XX | XX | XX | 6D | 08 | XX |
| 8 | XX | 81 | XX | XX | 84 | 85 | 86 | XX | 88 | XX | 8A | XX | 8C | 8D | 8E | XX |
| 9 | 08 | 91 | XX | XX | 94 | 95 | 96 | XX | 98 | 99 | 86 | XX | XX | 9D | XX | XX |
| A | A0 | A1 | A2 | XX | A4 | A5 | A6 | XX | 85 | A9 | 85 | XX | AC | AD | AE | XX |
| B | 08 | A1 | XX | XX | B4 | B5 | B6 | XX | B8 | AD | A2 | XX | AC | AD | AE | XX |
| C | C0 | C1 | XX | XX | C4 | C5 | C6 | XX | C8 | C9 | CA | XX | CC | CD | CE | XX |
| D | 08 | C1 | XX | XX | XX | D5 | D6 | XX | D8 | CD | XX | XX | XX | CD | DE | XX |
| E | E0 | E1 | XX | XX | E4 | E5 | E6 | XX | E8 | E9 | EA | XX | EC | ED | EE | XX |

TABLE 1-continued

| | \multicolumn{16}{c}{OP Code Mapping (PR1)} | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| F | 08 | E1 | XX | XX | XX | F5 | F6 | XX | F8 | ED | XX | XX | XX | ED | FE | XX |

XX = Don't care

TABLE 2

| | \multicolumn{16}{c}{OP Code Mapping (PR2)} | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | 00 | 01 | XX | XX | XX | 05 | 06 | XX | 08 | 90 | EA | XX | XX | 0D | 0E | XX |
| 1 | 90 | 11 | XX | XX | XX | 15 | 16 | XX | 18 | 19 | XX | XX | XX | 1D | 1E | XX |
| 2 | 20 | 21 | XX | XX | 24 | 25 | 26 | XX | 28 | 90 | EA | XX | 2C | 2D | 2E | XX |
| 3 | 90 | 31 | XX | XX | XX | 35 | 36 | XX | EA | 39 | XX | XX | XX | 3D | 3E | XX |
| 4 | 40 | 41 | XX | XX | XX | 45 | 46 | XX | 48 | 90 | EA | XX | 4C | 4D | 4E | XX |
| 5 | 90 | 51 | XX | XX | XX | 55 | 56 | XX | 58 | 59 | XX | XX | XX | 5D | 5E | XX |
| 6 | 60 | 61 | XX | XX | XX | 65 | 66 | XX | 68 | 90 | 6A | XX | 6C | 6D | 6E | XX |
| 7 | 90 | 71 | XX | XX | XX | 75 | 76 | XX | 78 | 79 | XX | XX | XX | 7D | 7E | XX |
| 8 | XX | 81 | XX | XX | 84 | 85 | 86 | XX | 88 | XX | EA | XX | 8C | 8D | 8E | XX |
| 9 | 90 | 91 | XX | XX | 94 | 95 | 96 | XX | EA | 99 | 9A | XX | XX | 9D | XX | XX |
| A | A0 | A1 | A2 | XX | A4 | A5 | A6 | XX | A4 | 90 | A6 | XX | AC | AD | AE | XX |
| B | 90 | B1 | XX | XX | B4 | B5 | B6 | XX | B8 | B9 | A2 | XX | BC | BD | BE | XX |
| C | C0 | C1 | XX | XX | C4 | C5 | C6 | XX | C8 | 90 | CA | XX | CC | CD | CE | XX |
| D | 90 | D1 | XX | XX | XX | D5 | D6 | XX | D8 | D9 | XX | XX | XX | DD | DE | XX |
| E | E0 | E1 | XX | XX | E4 | E5 | E6 | XX | E8 | 90 | EA | XX | EC | ED | EE | XX |
| F | 90 | F1 | XX | XX | XX | F5 | F6 | XX | F8 | F9 | XX | XX | XX | FD | FE | XX |

XX = Don't care

TABLE 3

Operation Selection

| 0S2 | 0S3 | 0S4, 0S5, 0S6, 0S7 | Operation |
|---|---|---|---|
| 0 | 0 | 0 | NOP |
| 0 | 0 | 1 | DE1 |
| 0 | 1 | 0 | NOP |
| 0 | 1 | 1 | IN1 |
| 1 | 0 | 0 | NOP |
| 1 | 0 | 1 | SEL |
| 1 | 1 | 0 | NOP |
| 1 | 1 | 1 | SEM |

TABLE 4

Operations for FIG. 8

| PH4 | PH1 | PL4 | PL1 |
|---|---|---|---|
| LAB = S − 4; Write; S = LAB | LAB = S − 1; Write; S = LAB | LAB = S; Read; S = LAB + 4 | LAB = S; Read; S = LAB + 1 |

TABLE 5

Operations for FIG. 9

| PH4 | PH1 | PL4 | PL1 |
|---|---|---|---|
| LAB = S − 3; Write; S = LAB − 1 | LAB = S; Write; S | LAB = S + 1; Read; S = LAB + 3 | LAB = S + 1; Read; S = LAB |

TABLE 5-continued

Operations for FIG. 9

| PH4 | PH1 | PL4 | PL1 |
|---|---|---|---|
| | LAB − 1 | | |

TABLE 6

SPPU Operations

| Command | | Operations | |
|---|---|---|---|
| LSP | LAB = DI; | no stack operation; | S = LAB + 1 |
| SSP | LAB = S − 1; | no stack operation; | S = LAB + 1 |
| PH4 | LAB = S − 4; | write; | S = LAB |
| PH1 | LAB = S − 1; | write; | S = LAB |
| PL4 | LAB = S; | read; | S = LAB + 4 |
| PL1 | LAB = S; | read; | S = LAB + 1 |
| PL* | LAB = S + 3; | read; | S = LAB + 1 |
| AD4 | LAB = S + 3; | no stack operation; | S = LAB |
| NOP | LAB = S; | no stack operation; | S = LAB |

TABLE 7

Multiple Way Branch

| PL | VECT | PL8(2) | PL8(3) | PL8(4) | D(10-4) | D(3) | D(2) | D(1) | D(0) |
|---|---|---|---|---|---|---|---|---|---|
| 1 | 0 | | | | L4(7-1) | L4(0) | 0 | 0 | 0 |
| 0 | 1 | 0 | 0 | 0 | PL9(7-1) | PL9(0) | N2 | N1 | N0 |
| 0 | 1 | 0 | 0 | 1 | PL9(7-1) | PL9(0) | PL8(7) | PL8(6) | N3 |
| 0 | 1 | 0 | 1 | 0 | PL9(7-1) | PL9(0) | PL8(7) | PL8(6) | N0 |
| 0 | 1 | 0 | 1 | 1 | PL9(7-1) | PL9(0) | PL8(7) | PL8(6) | PL8(5) |
| 0 | 1 | 1 | 0 | 0 | | | UNUSED | | |
| 0 | 1 | 0 | 0 | 1 | PL9(7-1) | C3 | C2 | C1 | C0 |
| 0 | 1 | 1 | 1 | 0 | PL9(7-1) | PL9(0) | C3 | C2 | C1 |
| 0 | 1 | 1 | 1 | 1 | PL9(7-1) | PL9(0) | PL8(5) | $\overline{NMI}$ | $\overline{IRQ}$ |

TABLE 8

The Adjust Sequence for ADC

| C3 | C2 | C1 | C0 | MP 3 | MP 2 | MP 1 | MP 0 |
|---|---|---|---|---|---|---|---|
| 0 | 0 | 0 | 0 | — | — | — | — |
| 0 | 0 | 0 | 1 | EA(NOP) | 69(ADC) +1* | 69(ADC) +1 | 18(CLC) |
| 0 | 0 | 1 | 0 | EA(NOP) | 69(ADC) +1 | 18(CLC) | EA (NOP) |
| 0 | 0 | 1 | 1 | EA(NOP) | 69(ADC) +1 | 69(ADC) | 18(CLC) |

TABLE 8-continued

The Adjust Sequence for ADC

| C3 | C2 | C1 | C0 | MP 3 | MP 2 | MP 1 | MP 0 |
|---|---|---|---|---|---|---|---|
| 0 | 1 | 0 | 0 | 69(ADC)+1 | 18(CLC) | EA(NOP) | EA(NOP)+0 |
| 0 | 1 | 0 | 1 | 69(ADC)+1 | 18(CLC) | 69(ADC)+1 | 18(CLC) |
| 0 | 1 | 1 | 0 | 69(ADC)+1 | 69(ADC)+0 | 18(CLC) | EA(NOP) |
| 0 | 1 | 1 | 1 | 69(ADC)+1 | 69(ADC)+0 | 69(ADC)+0 | 18(CLC) |
| 1 | 0 | 0 | 0 | 18(CLC) | EA(NOP) | EA(NOP) | 38(SEC) |
| 1 | 0 | 0 | 1 | 18(CLC) | 69(ADC)+1* | 69(ADC)+1 | EA(NOP) |
| 1 | 0 | 1 | 0 | 18(CLC) | 69(ADC)+1 | 18(CLC) | 38(SEC) |
| 1 | 0 | 1 | 1 | 18(CLC) | 69(ADC)+1 | 69(ADC)+0 | EA(NOP) |
| 1 | 1 | 0 | 0 | 69(ADC)+0 | 18(CLC) | EA(NOP) | 38(SEC) |
| 1 | 1 | 0 | 1 | 69(ADC)+0 | 18(CLC) | 69(ADC)+1 | EA(NOP) |
| 1 | 1 | 1 | 0 | 69(ADC)+0 | 69(ADC)+0 | 18(CLC) | 38(SEC) |
| 1 | 1 | 1 | 1 | 69(ADC)+0 | 69(ADC0+0 | 69(ADC)+0 | EA(NOP) |

*add 1 in advance

TABLE 9

List of IC Chips

| Device | Description | Qty. |
|---|---|---|
| 6502 | 8-bit microprocessor | 5 |
| Am27S29A | PROM 512 × 8 | 3 |
| Am27S33A | PROM 1024 × 4 | 1 |
| Am27S185A | PROM 2048 × 4 | 1 |
| Am27S191A | PROM 2048 × 8 | 6 |
| Am27S47A | PROM 2048 × 8 | 10 |
| Am2930 | Program Control Unit | 2 |
| Am2910 | Microprogram Controller | 1 |
| Am2923 | Eight-Input Multiplexer | 1 |
| Am2949 | Bus Transceiver | 4 |
| AmPAL16R8A | Programmable Array Logic | 1 |
| AmPAL16H8A | Programmable Array Logic | 1 |
| 74LS373 | Transparent Latch | 4 |
| 74LS374 | D Flip-Flop | 2 |

TABLE 10

Clock Cycle Requirement

| OP Code | Mnemonic | Number of bytes 6502 | Number of bytes 6502-32 | Clock Cycles 6502 | Clock Cycles 6502-32 |
|---|---|---|---|---|---|
| 00 | BRK | 1 | 1 | 7 | 8 |
| 01 | ORA-(Indirect, X) | 2 | 2 | 6 | 6 |
| 05 | ORA-Zero Page | 2 | 2 | 3 | 3 |
| 06 | ASL-Zero Page | 2 | 2 | 5 | 11.5 |
| 08 | PHP | 1 | 1 | 3 | 3 |
| 09 | ORA-Immediate | 2 | 5 | 2 | 4 |
| 0A | ASL-Accumulator | 1 | 1 | 2 | 7 |
| 0D | ORA-Absolute | 3 | 3 | 4 | 4 |
| 0E | ASL-Absolute | 3 | 3 | 6 | 12.5 |
| 10 | BPL | 2 | 2 | 3** | 5.5 |
| 11 | ORA-(Indirect), Y | 2 | 2 | 5* | 6 |
| 15 | ORA-Zero Page, X | 2 | 2 | 4 | 4 |
| 16 | ASL-Zero Page, X | 2 | 2 | 6 | 12.5 |
| 18 | CLC | 1 | 1 | 2 | 2 |
| 19 | ORA-Absolute, Y | 3 | 3 | 4* | 5 |
| 1D | ORA-Absolute, X | 3 | 3 | 4* | 5 |
| 1E | ASL-Absolute, X | 3 | 3 | 7 | 13.5 |
| 20 | JSR | 3 | 3 | 6 | 6 |
| 21 | AND-(Indirect, X) | 2 | 2 | 6 | 6 |
| 24 | BIT-Zero Page | 2 | 2 | 3 | 3 |
| 25 | AND-Zero Page | 2 | 2 | 3 | 3 |
| 26 | ROL-Zero Page | 2 | 2 | 5 | 11.5 |
| 28 | PLP | 1 | 1 | 4 | 5 |
| 29 | AND-Immediate | 2 | 5 | 2 | 4 |
| 2A | ROL-Accumulator | 1 | 1 | 2 | 7 |
| 2C | BIT-Absolute | 3 | 3 | 4 | 4 |
| 2D | AND-Absolute | 3 | 3 | 4 | 4 |
| 2E | ROL-Absolute | 3 | 3 | 6 | 12.5 |
| 30 | BMI | 2 | 2 | 3** | 5.5 |
| 31 | AND-(Indirect), Y | 2 | 2 | 5* | 6 |
| 35 | AND-Zero Page, X | 2 | 2 | 4 | 4 |
| 36 | ROL-Zero Page, X | 2 | 2 | 6 | 12.5 |
| 38 | SEC | 1 | 1 | 2 | 4 |
| 39 | AND-Absolute, Y | 3 | 3 | 4* | 5 |
| 3D | AND-Absolute, X | 3 | 3 | 4* | 5 |
| 3E | ROL-Absolute, X | 3 | 3 | 7 | 13.5 |
| 40 | RTI | 1 | 1 | 6 | 6 |
| 41 | EOR-(Indirect, X) | 2 | 2 | 6 | 6 |
| 45 | EOR-Zero Page | 2 | 2 | 3 | 3 |
| 46 | LSR-Zero Page | 2 | 2 | 5 | 13 |
| 48 | PHA | 1 | 1 | 3 | 3 |
| 49 | EOR-Immediate | 2 | 5 | 2 | 4 |
| 4A | LSR-Accumulator | 1 | 1 | 2 | 7 |
| 4C | JMP-Absolute | 3 | 3 | 3 | 3 |
| 4D | EOR-Absolute | 3 | 3 | 4 | 4 |
| 4E | LSR-Absolute | 3 | 3 | 6 | 14 |
| 50 | BVC | 2 | 2 | 3** | 5.5 |
| 51 | EOR-(Indirect), Y | 2 | 2 | 5* | 6 |
| 55 | EOR-Zero Page, X | 2 | 2 | 4 | 4 |
| 56 | LSR-Zero Page, X | 2 | 2 | 6 | 14 |
| 58 | CLI | 1 | 1 | 2 | 2 |
| 59 | EOR-Absolute, Y | 3 | 3 | 4* | 5 |
| 5D | EOR-Absolute, X | 3 | 3 | 4* | 5 |
| 5E | LSR-Absolute, X | 3 | 3 | 7 | 15 |
| 60 | RTS | 1 | 1 | 6 | 6 |
| 61 | ADC-(Indirect, X) | 2 | 2 | 6 | 15 |
| 65 | ADC-Zero Page | 2 | 2 | 3 | 12 |
| 66 | ROR-Zero Page | 2 | 2 | 5 | 16 |
| 68 | PLA | 1 | 1 | 4 | 5 |
| 69 | ADC-Immediate | 2 | 5 | 2 | 11 |
| 6A | ROR-Accumulator | 1 | 1 | 2 | 10 |
| 6C | JMP-Indirect | 3 | 3 | 5 | 5 |
| 6D | ADC-Absolute | 3 | 3 | 4 | 13 |
| 6E | ROR-Absolute | 3 | 3 | 6 | 17 |
| 70 | BVS | 2 | 2 | 3** | 5.5 |
| 71 | ADC-(Indirect), Y | 2 | 2 | 5* | 15 |
| 75 | ADC-Zero Page, X | 2 | 2 | 4 | 13 |
| 76 | ROR-Zero Page, X | 2 | 2 | 6 | 17 |
| 78 | SEI | 1 | 1 | 2 | 2 |
| 79 | ADC-Absolute, Y | 3 | 3 | 4* | 14 |
| 7D | ADC-Absolute, X | 3 | 3 | 4* | 14 |
| 7E | ROR-Absolute, X | 3 | 3 | 7 | 18 |
| 81 | STA-(Indirect, X) | 2 | 2 | 6 | 6 |
| 84 | STY-Zero Page | 2 | 2 | 3 | 3 |
| 85 | STA-Zero Page | 2 | 2 | 3 | 3 |
| 86 | STX-Zero Page | 2 | 2 | 3 | 3 |
| 88 | DEY | 1 | 1 | 2 | 7 |
| 8A | TXA | 1 | 1 | 2 | 2 |
| 8C | STY-Absolute | 3 | 3 | 4 | 4 |
| 8D | STA-Absolute | 3 | 3 | 4 | 4 |
| 8E | STX-Absolute | 3 | 3 | 4 | 4 |
| 90 | BCC | 2 | 2 | 3** | 5.5 |
| 91 | STA-(Indirect), Y | 2 | 2 | 6 | 6 |
| 94 | STY-Zero Page, X | 2 | 2 | 4 | 4 |
| 95 | STA-Zero Page, X | 2 | 2 | 4 | 4 |
| 96 | STX-Zero Page, Y | 2 | 2 | 4 | 4 |
| 98 | TYA | 1 | 1 | 2 | 2 |
| 99 | STA-Absolute, Y | 3 | 3 | 5 | 5 |
| 9A | TXS | 1 | 1 | 2 | 3 |
| 9D | STA-Absolute, X | 3 | 3 | 5 | 5 |
| A0 | LDY-Immediate | 2 | 5 | 2 | 6 |
| A1 | LDA-(Indirect, X) | 2 | 2 | 6 | 6 |
| A2 | LDX-Immediate | 2 | 5 | 2 | 6 |
| A4 | LDY-Zero Page | 2 | 2 | 3 | 3 |
| A5 | LDA-Zero Page | 2 | 2 | 3 | 3 |
| A6 | LDX-Zero Page | 2 | 2 | 3 | 3 |
| A8 | TAY | 1 | 1 | 2 | 7 |
| A9 | LDA-Immediate | 2 | 5 | 2 | 4 |
| AA | TAX | 1 | 1 | 2 | 7 |
| AC | LDY-Absolute | 3 | 3 | 4 | 4 |
| AD | LDA-Absolute | 3 | 3 | 4 | 4 |
| AE | LDX-Absolute | 3 | 3 | 4 | 4 |
| B0 | BCS | 2 | 2 | 3** | 5.5 |
| B1 | LDA-(Indirect), Y | 2 | 2 | 5* | 6 |
| B4 | LDY-Zero Page, X | 2 | 2 | 4 | 4 |

TABLE 10-continued

| OP Code | Mnemonic | Number of bytes 6502 | Number of bytes 6502-32 | Clock Cycles 6502 | Clock Cycles 6502-32 |
|---|---|---|---|---|---|
| B5 | LDA-Zero Page, X | 2 | 2 | 4 | 4 |
| B6 | LDX-Zero Page, Y | 2 | 2 | 4 | 4 |
| B8 | CLV | 1 | 1 | 2 | 2 |
| B9 | LDA-Absolute, Y | 3 | 3 | 4* | 5 |
| BA | TSX | 1 | 1 | 2 | 6 |
| BC | LDY-Absolute, X | 3 | 3 | 4* | 5 |
| BD | LDA-Absolute, X | 3 | 3 | 4* | 5 |
| BE | LDX-Absolute, Y | 3 | 3 | 4* | 5 |
| C0 | CPY-Immediate | 2 | 2 | 2 | 7 |
| C1 | CMP-(Indirect, X) | 2 | 2 | 6 | 12.5 |
| C4 | CPY-Zero Page | 2 | 2 | 3 | 8 |
| C5 | CMP-Zero Page | 2 | 2 | 3 | 9.5 |
| C6 | DEC-Zero Page | 2 | 2 | 5 | 10 |
| C8 | INY | 1 | 1 | 2 | 7 |
| C9 | CMP-Immediate | 2 | 5 | 2 | 8.5 |
| CA | DEX | 1 | 1 | 2 | 7 |
| CC | CPY-Absolute | 3 | 3 | 4 | 9 |
| CD | CMP-Absolute | 3 | 3 | 4 | 10.5 |
| CE | DEC-Absolute | 3 | 3 | 6 | 11 |
| D0 | BNE | 2 | 2 | 3** | 5.5 |
| D1 | CMP-(Indirect), Y | 2 | 2 | 5* | 12.5 |
| D5 | CMP-Zero Page, X | 2 | 2 | 4 | 10.5 |
| D6 | DEC-Zero Page, X | 2 | 2 | 6 | 11 |
| D8 | CLD | 1 | 1 | 2 | 2 |
| D9 | CMP-Absolute, Y | 3 | 3 | 4* | 11.5 |
| DD | CMP-Absolute, X | 3 | 3 | 4* | 11.5 |
| DE | DEC-Absolute, X | 3 | 3 | 7 | 12 |
| E0 | CPX-Immediate | 2 | 2 | 2 | 7 |
| E1 | SBC-(Indirect, X) | 2 | 2 | 6 | 15 |
| E4 | CPX-Zero Page | 2 | 2 | 3 | 8 |
| E5 | SBC-Zero Page | 2 | 2 | 3 | 12 |
| E6 | INC-Zero Page | 2 | 2 | 5 | 10 |
| E8 | INX | 1 | 1 | 2 | 7 |
| E9 | SBC-Immediate | 2 | 5 | 2 | 11 |
| EA | NOP | 1 | 1 | 2 | 2 |
| EC | CPX-Absolute | 3 | 3 | 4 | 9 |
| ED | SBC-Absolute | 3 | 3 | 4 | 13 |
| EE | INC-Absolute | 3 | 3 | 6 | 11 |
| F0 | BEQ | 2 | 2 | 3** | 5.5 |
| F1 | SBC-(Indirect), Y | 2 | 2 | 5* | 15 |
| F5 | SBC-Zero Page, X | 2 | 2 | 4 | 13 |
| F6 | INC-Zero Page, X | 2 | 2 | 6 | 11 |
| F8 | SED | 1 | 1 | 2 | 2 |
| F9 | SBC-Absolute, Y | 3 | 3 | 4* | 14 |
| FD | SBC-Absolute, X | 3 | 3 | 4* | 14 |
| FE | INC-Absolute, X | 3 | 3 | 7 | 12 |

*Add 1 if page boundary is crossed.
**Add 1 if branch occurs to different page.

Appendix

This Appendix is a listing of the microprogram subroutines used in 6502-32.

The execution cycle of the microprogram always begins with the microinstruction FETCH (see Fig. 17). This microinstruction fethces OP code and branches the microprogram to the microsubroutine which corresponds to the fetched OP code. This microsubroutine manipulates the multiple-microprocessor to perform the operations specified by the OP code. The next execution of the microinstruction FETCH will always follow the completion of each microsubroutine.

There altogether are 151 microsubroutines in this listing. Each corresponds uniquely to one of the instructions.

Each microinstruction contains 96 bits. It consists of 5 fields: DBS; DBC; SPU; MPA; and SIG.

(1). DBS: Date Bus Sources

The data on the data bus IDB0, IDB1, IDB2, IDB3, and SDB (see Fig.4, and Fig.5) could be provided with this field of the microprogram memory so long as the corresponding outputs of the microprogram memory are enabled by the control signals $\overline{MTOSDB}$, $\overline{MTOIDB}$ (Fig. 12). There are 40 bits in this field.

The format of this field in each microinstruction is:

DBS : section 1; section 2; section 3; section 4; section 5.

The section 1 is for IDB0, the section 2 is for IDB1, the section 3 is for IDB3, the section 4 is for IDB2, and the section 5 is for SDB. Each section might consist of two portions which are separated by a comma ",", i.e., "number, explanation".

The number is of two hexadecimal digits. The portion of explanation points out the meaning of the number. The portion of explanation could be ignored. If it does not matter that what value is assumed by the number then the symbol "XX" will be used. For example,

DBS : XX; 18, CLC; FE,-2; 03; XX.

That means that the IDB1 is provided with the number 18 which is the OP code of the instruction CLC, the IDB2 is provided with the number FE which in fact is "-2" (minus two), the IDB3 is provided with "03", and it does not matter to IDB0, SDB.

(2). DBC: path control of data bus

There are 14 bits in this field. 8 of them are enable signals:

DLTOIDB : Enable the contents of L0-L3 to transfer to IDB0-IDB3 respectively (Fig. 4).

IDBTOSDB : Enable the contents of IDB0 to transfer to SDB (Fig. 5)

MTOIDB : Enable the contents of microprogram memory PL0-PL3 to transfer to IDB0-IDB3 respectively (Fig. 12).

MTOSDB : Enable the contents of microprogram memory PL4 to transfer to SDB (Fig. 12)

SDBTOIDB : Enable the contents of SDB to transfer to IDB0 (Fig. 5).

IDBTODB : Enable the data processed by PR4-PR7 to transfer to DB0-DB3 respectively (Fig. 4)

OCM : Enable the contents of PR1, PR2, to transfer to IDB, SDB respectively (Fig. 4).

CPA : Enable the contents of PR3 to transfer to IDB3 (Fig. 4).

Any one of these signals could be used indepentently so long as the rule "more than one sources must not be simultaneously transferred to one bus" is not violated. If none of these signals is issued then the notation is "NOP".

The other six bits OS2, OS3, OS4, OS5, OS6, OS7 (Fig. 4) are complemental to the signal $\overline{\text{IDBTODB}}$. The functions of these six bits are given in Table 3. For example, the notation of the field DBC in a microinstruction is

DBC : MTOSDB; SDBTODB, IN1, NOP, IN1, NOP.

That means that the contents of the microprogram memory PL4 are put onto SDB, and the contents of IDB are put onto the bus DB after the operations,

```
FETCH :  OP CODE FETCHING.
    DBS : XX; XX; XX; XX; XX.
    DBC : OCM.
    SPU : NOP.
    MPA : BRANCH ON (RDY AND OP CODE).
    SIG : R.
000 :   BRK.
    DBS : XX; XX; XX; XX; XX.
    DBC : DLTOIDB; IDBTOSDB.
    SPU : NOP.
    MPA : CONTINUE.
    SIG : R; NRDY4.
001 :   FROM 000.
    DBS : 08, PHP; 08, PHP; 08, PHP; 08, PHP; XX.
    DBC : MTOSDB; MTOIDB.
    SPU : NOP.
    MPA : CONTINUE.
    SIG : R.
002 :   FROM 001.
    DBS : XX; XX; XX; XX; XX.
    DBC : SDBTOIDB; IDBTODB.
    SPU : PH1.
    MPA : CONTINUE.
    SIG : W1; NRDY3-0.
003 :   FROM 002.
    DBS : XX; XX; XX; XX; XX.
    DBC : SDBTOIDB; IDBTODB.
    SPU : PH1.
    MPA : CONTINUE.
    SIG : W1.
004 :   FROM 003.
    DBS : XX; XX; XX; XX; XX.
    DBC : IDBTODB.
    SPU : PH4.
    MPA : CONTINUE.
    SIG : W4.
005 :   FROM 004.
    DBS : XX; XX; XX; XX; XX.
    DBC: DLTOIDB; IDBTOSDB.
    SPU : NOP.
    MPA : IF RDY TO 006.
    SIG : R; NRDY3-0.
006 :   FROM 005.
    DBS : XX; XX; XX; XX; XX.
    DBC : DLTOIDB; IDBTOSDB.
    SPU : NOP.
    MPA : IF RDY TO FETCH.
    SIG : R; NRDY3-0.
008 :   ORA - (INDIRECT, X).
    DBS : XX; XX; XX; XX; XX.
    DBC : DLTOIDB; IDBTOSDB.
    SPU : NOP.
    MPA : IF RDY TO 009.
    SIG : R.
009 :   FROM 008.
    DBS : XX; XX; XX; XX; XX.
    DBC : DLTOIDB; IDBTOSDB.
    SPU : NOP.
    MPA : CONTINUE.
    SIG : R.
00A :   FROM 009.
    DBS : XX; XX; XX; XX; XX.
    DBC : DLTOIDB; IDBTOSDB.
    SPU : NOP.
    MPA : IF RDY TO 00B.
    SIG : R.
00B :   FROM 00A.
    DBS : XX; XX; XX; XX; XX.
    DBC : DLTOIDB; IDBTOSDB.
    SPU : NOP.
    MPA : IF RDY TO 029.
    SIG : R.
028 :   ORA - ZERO PAGE.
    DBS : XX; XX; XX; XX; XX.
    DBC : DLTOIDB; IDBTOSDB.
    SPU : NOP.
    MPA : IF RDY TO 029.
    SIG : R.
```

029 :    FROM 028.
    DBS : XX; XX; XX; XX; 00.
    DBC : DLTOIDB; MTOSDB.
    SPU : NOP.
    MPA : IF RDY TO FETCH.
    SIG : R.

030 :    ASL - ZERO PAGE.
    DBS : XX; XX; XX; XX; XX.
    DBC : DLTOIDB; IDBTOSDB.
    SPU : NOP.
    MPA : IF RDY TO 031.
    SIG : R.

031 :    FROM 030.
    DBS : XX; XX; XX; XX; 00.
    DBC : DLTOIDB; MTOSDB.
    SPU : NOP.
    MPA : TO 038-03F ON (RDY AND N2.N1.N0).
    SIG : R.

032 :    FROM 0B8.
    DBS : XX; XX; XX; XX; XX.
    DBC : MTOSDB; DLTOIDB.
    SPU : NOP.
    MPA : TO 035 ON N3.
    SIG : R; NRDY4; NRDY3-0; KPDB.

033 :    FROM 035.
    DBS : XX; XX; XX; XX; XX.
    DBC : MTOSDB; MTOIDB.
    SPU : NOP.
    MPA : TO FETCH.
    SIG : R; NRDY4.

034 :    FROM 032.
    DBS : XX; XX; XX; XX; XX.
    DBC : MTOSDB; MTOIDB.
    SPU : NOP.
    MPA : TO FETCH.
    SIG : R; NRDY4; NRDY3-0.

035 :    FROM 032.
    DBS : 38. SEC; EA. NOP; EA. NOP; 18. CLC; XX.
    DBC : MTOSDB; MTOIDB.
    SPU : NOP.
    MPA : TO 033.
    SIG : R; NRDY4.

036 :    FROM 0B9-0BF.
    DBS : C6. DEC; C6. DEC; C6. DEC; EA. NOP; XX.
    DBC : MTOSDB; MTOIDB.
    SPU : NOP.
    MPA : CONTINUE.
    SIG : R; KPDB; NRDY4.

037 :    FROM 036.
    DBS : XX; XX; XX; XX; XX.
    DBC : MTOSDB; MTOIDB.
    SPU : NOP.
    MPA : TO 0B3.
    SIG : R; KPDB; NRDY4.

038 :    N2.N1.N0=000.
    DBS : XX; XX; XX; XX; XX.
    DBC : NOP.
    SPU : NOP.
    MPA : TO 0B8.
    SIG : V4; KPDB.

039 :    N2.N1.N0 = 001.
    DBS : XX; XX; XX; XX; XX.
    DBC : NOP.
    SPU : NOP.
    MPA : TO 0B9.
    SIG : V4; KPDB.

03A :    N2.N1.N0 = 010.
    DBS : XX; XX; XX; XX; XX.
    DBC : NOP.
    SPU : NOP.
    MPA : TO 0BA.
    SIG : V4; KPDB.

03B :    N2.N1.N0 = 011.
    DBS : XX; XX; XX; XX; XX.
    DBC : NOP.
    SPU : NOP.
    MPA : TO 0BB.
    SIG : V4; KPDB.

03C :    N2.N1.N0 = 100.
    DBS : XX; XX; XX; XX; XX.
    DBC : NOP.
    SPU : NOP.
    MPA : TO 0BC.
    SIG : V4; KPDB.

03D :    N2.N1.N0 = 101.
    DBS : XX; XX; XX; XX; XX.
    DBC : NOP.
    SPU : NOP.
    MPA : TO 0BD.
    SIG : V4; KPDB.

03E :    N2.N1.N0 = 110.
    DBS : XX; XX; XX; XX; XX.
    DBC : NOP.
    SPU : NOP.
    MPA : TO 0BE.
    SIG : V4; KPDB.

```
03F :    N2,N1,N0=111:
    DBS : XX; XX; XX; XX; XX.
    DBC : NOP.
    SPU : NOP.
    MPA : TO OBF.
    SIG : V4; KPDB.
040 :    PHP.
    DBS : XX; XX; XX; XX; XX.
    DBC : DLTOIDB; IDBTOSDB.
    SPU : NOP.
    MPA : CONTINUE.
    SIG : R.
041 :    FROM 040.
    DBS : XX; XX; XX; XX; XX.
    DBC : IDBTODB.
    SPU : PH4.
    MPA : TO FETCH.
    SIG : V4.
048 :    ORA - IMMEDIATE.
    DBS : XX; XX; XX; XX; 03, +3.
    DBC : DLTOIDB; MTOSDB.
    SPU : NOP.
    MPA : IF RDY TO 049.
    SIG : R.
049 :    FROM 048.
    DBS : EA, NOP; EA, NOP; EA, NOP; EA, NOP; XX.
    DBC : MTOIDB; MTOSDB.
    SPU : NOP.
    MPA : CONTINUE.
    SIG : R.
04A :    FROM 049.
    DBS : XX; XX; XX; XX; XX.
    DBC : MTOIDB; MTOSDB.
    SPU : NOP.
    MPA : TO FETCH.
    SIG : R; NRDY4 IF SYNC4.
050 :    ASL - ACCUMULATOR.
    DBS : XX; XX; XX; XX; XX.
    DBC : MTOIDB; MTOSDB.
    SPU : NOP.
    MPA : CONTINUE.
    SIG : R.
051 :    FROM 050.
    DBS: 08, PHP; 08, PHP; 08, PHP; 08, PHP; XX.
    DBC : MTOIDB; MTOSDB.
    SPU : NOP.
    MPA : CONTINUE.
    SIG : R; NRDY4.
052 :    FROM 051.
    DBS : XX; XX; XX; XX; XX.
    DBC : MTOIDB; MTOSDB.
    SPU : NOP.
    MPA : CONTINUE.
    SIG : R; NRDY4.
053 :    FROM 052.
    DBS : XX; XX; XX; XX; XX.
    DBC : MTOSDB.
    SPU : NOP.
    MPA : TO OD0-ODF ON C3, C2, C1, C0.
    SIG : R; NRDY4.
054 :    FROM ODF.
    DBS : XX; 00; 00; 00; XX.
    DBC : MTOSDB; MTOIDB.
    SPU : NOP.
    MPA : TO FETCH.
    SIG : R; NRDY4.
055 :    FROM ODD.
    DBS : XX; 01; 01; 00; XX.
    DBC : MTOSDB; MTOIDB.
    SPU : NOP.
    MPA : TO FETCH.
    SIG : R; NRDY4.
056 :    FROM OD7.
    DBS : XX; 00; 00; 01; XX.
    DBC : MTOSDB; MTOIDB.
    SPU : NOP.
    MPA : TO FETCH.
    SIG : R; NRDY4.
057 :    FROM ODB.
    DBS : XX; 00; 01; 01; XX.
    DBC : MTOSDB; MTOIDB.
    SPU : NOP.
    MPA : TO FETCH.
    SIG : R; NRDY4.
068 :    ORA - ABSOLUTE.
    DBS : XX; XX; XX; XX; XX.
    DBC : DLTOIDB; IDBTOSDB.
    SPU : NOP.
    MPA : IF RDY TO 028.
    SIG : R.
070 :    ASL - ABSOLUTE.
    DBS : XX; XX; XX; XX; XX.
    DBC : DLTOIDB; IDBTOSDB.
    SPU : NOP.
    MPA : IF RDY TO 030.
    SIG : R.
```

071 :    FROM 085.
    DBS : XX: XX: XX: XX: XX.
    DBC : NOP.
    SPU : NOP.
    MPA : CONTINUE.
    SIG : R: KPDB: NRDY4: NRDY3.
072 :    FROM 071.
    DBS : 38. SEC: 18. CLC: 18. CLC: 18. CLC: XX.
    DBC : MTOSDB: MTOIDB.
    SPU : NOP.
    MPA : TO 087.
    SIG : R: NRDY4.
077 :    FROM 0DA.
    DBS : XX: 01: 01: 01: XX.
    DBC : MTOSDB: MTOIDB.
    SPU : NOP.
    MPA : TO FETCH.
    SIG : R: NRDY4.
080 :    BPL.
    DBS : XX: XX: XX: XX: XX.
    DBC : MTOSDB: MTOIDB.
    SPU : NOP.
    MPA : CONTINUE.
    SIG : R: NRDY4.
081 :    FROM 080.
    DBS : XX: XX: XX: XX: XX.
    DBC : NOP.
    SPU : NOP.
    MPA : TO 083 ON N3.
    SIG : R: NRDY4.
082 :    FROM 081.
    DBS : XX: XX: XX: XX: XX.
    DBC : DLTOIDB: IDBTOSDB.
    SPU : NOP.
    MPA : IF RDY TO 483.
    SIG : R: NRDY3-0.
083 :    FROM 081.
    DBS : XX: XX: XX: XX: 00.
    DBC : MTOSDB: MTOIDB.
    SPU : NOP.
    MPA : TO 485.
    SIG : R: NRDY3-0.
088 :    ORA - (INDIRECT). Y.
    DBS : XX: XX: XX: XX: XX.
    DBC : DLTOIDB: IDBTOSDB.
    SPU : NOP.
    MPA : IF RDY TO 089.
    SIG : R.

069 :    FROM 088.
    DBS : XX: XX: XX: XX: XX.
    DBC : DLTOIDB: IDBTOSDB.
    SPU : NOP.
    MPA : IF RDY TO 08A.
    SIG : R.
08A :    FROM 089.
    DBS : XX: XX: XX: XX: XX.
    DBC : DLTOIDB: IDBTOSDB.
    SPU : NOP.
    MPA : IF RDY TO 0CA.
    SIG : R: NRDY3-0.
0A8 :    ORA - ZERO PAGE. X.
    DBS : XX: XX: XX: XX: XX.
    DBC : DLTOIDB: IDBTOSDB.
    SPU : NOP.
    MPA : IF RDY TO 0A9.
    SIG : R.
0A9 :    FROM 0A8.
    DBS : XX: XX: XX: XX: XX.
    DBC : DLTOIDB: IDBTOSDB.
    SPU : NOP.
    MPA : TO 029.
    SIG : R.
0B0 :    ASL - ZERO PAGE. X.
    DBS : XX: XX: XX: XX: XX.
    DBC : DLTOIDB: IDBTOSDB.
    SPU : NOP.
    MPA : IF RDY TO 0B1.
    SIG : R.
0B1 :    FROM 0B0.
    DBS : XX: XX: XX: XX: XX.
    DBC : MTOSDB: MTOIDB.
    SPU : NOP.
    MPA : TO 031.
    SIG : R.
0B2 :    FROM 0B4.
    DBS : XX: XX: XX: XX: XX.
    DBC : NOP.
    SPU : NOP.
    MPA : TO 0B6.
    SIG : R: KPDB: NRDY4: NRDY3.
0B3 :    FROM 037.
    DBS : XX: XX: XX: XX: XX.
    DBC : DLTOIDB: MTOSDB.
    SPU : NOP.
    MPA : TO 0B5 ON N3.
    SIG : R: KPDB: NRDY4: NRDY3.

```
OB4 :    FROM OB3.
    DBS : XX; XX; XX; XX; XX.
    DBC : NOP.
    SPU : NOP.
    MPA : TO OB2.
    SIG : R; KPDB; NRDY4; NRDY3.
OB5 :    FROM OB3.
    DBS : XX; XX; XX; XX; XX.
    DBC : NOP.
    SPU : NOP.
    MPA : TO O71.
    SIG : R; KPDB; NRDY4; NRDY3.
B6 :    FROM OB2.
    DBS : 18. CLC; 18. CLC; 18. CLC; 18. CLC; XX.
    DBC : MTOIDB; MTOSDB.
    SPU : NOP.
    MPA : CONTINUE.
    SIG : R; NRDY4.
OB7 :    FROM OB6.
    DBS : XX; XX; XX; XX; XX.
    DBC : MTOSDB; MTOIDB.
    SPU : NOP.
    MPA : TO FETCH.
    SIG : R; NRDY4.
OB8 :    FROM O38.
    DBS : XX; XX; XX; XX; XX.
    DBC : IDBTODB. NOP. NOP. NOP. NOP.
    SPU : NOP.
    MPA : TO O32.
    SIG : V4; KPDB.
OB9 :    FROM O39.
    DBS : XX; XX; XX; XX; XX.
    DBC : IDBTODB. NOP. SEL. NOP. NOP.
    SPU : NOP.
    MPA : TO O36.
    SIG : V4; KPDB.
OBA :    FROM O3A.
    DBS : XX; XX; XX; XX; XX.
    DBC : IDBTODB. NOP. NOP. SEL. NOP.
    SPU : NOP.
    MPA : TO O36.
    SIG : V4; KPDB.
OBB :    FROM O3B.
    DBS : XX; XX; XX; XX; XX.
    DBC : IDBTODB. NOP. SEL. SEL. NOP.
    SPU : NOP.
    MPA : TO O36.
    SIG : V4; KPDB.

OBC :    FROM O3C.
    DBS : XX; XX; XX; XX; XX.
    DBC : IDBTODB. NOP. NOP. NOP. SEL.
    SPU : NOP.
    MPA : TO O36.
    SIG : V4; KPDB.
OBD :    FROM O3D.
    DBS : XX; XX; XX; XX; XX.
    DBC : IDBTODB. NOP. SEL. NOP. SEL.
    SPU : NOP.
    MPA : TO O36.
    SIG : V4; KPDB.
OBE :    FROM O3E.
    DBS : XX; XX; XX; XX; XX.
    DBC : IDBTODB. NOP. NOP. SEL. SEL.
    SPU : NOP.
    MPA : TO O36.
    SIG : V4; KPDB.
OBF :    FROM O3F.
    DBS : XX; XX; XX; XX; XX.
    DBC : IDBTODB. NOP. SEL. SEL. SEL.
    SPU : NOP.
    MPA : TO O36.
    SIG : V4; KPDB.
OCO :    CLC.
    DBS : XX; XX; XX; XX; XX.
    DBC : DLTOIDB; IDBTOSDB.
    SPU : NOP.
    MPA : TO FETCH.
    SIG : R.
OC8 :    ORA - ABSOLUTE. Y.
    DBS : XX; XX; XX; XX; XX.
    DBC : DLTOIDB; IDBTOSDB.
    SPU : NOP.
    MPA : IF RDY TO OC9.
    SIG : R.
OC9 :    FROM OC8.
    DBS : XX; XX; XX; XX; XX.
    DBC : DLTOIDB; IDBTOSDB.
    SPU : NOP.
    MPA : IF RDY TO OCA.
    SIG : R.
OCA :    FROM OC9.
    DBS : XX; XX; XX; XX; 00.
    DBC : DLTOIDB; MTOSDB.
    SPU : NOP.
    MPA : IF RDY TO OCB.
    SIG : R; NRDY3-0.
```

```
OCB :    FROM OCA.
    DBS : XX; XX; XX; XX; OO.
    DBC : DLTOIDB; MTOSDB.
    SPU : NOP.
    MPA : IF RDY TO FETCH.
    SIG : R; NRDY4 IF SYNC4; KPDB IF SYNC4.
OD0 :    C3. C2. C1. C0 = 0000.
    DBS : XX; XX; XX; XX; XX.
    DBC : MTOSDB; MTOIDB.
    SPU : NOP.
    MPA : TO FETCH.
    SIG : R; NRDY4; NRDY3-0.
OD1 :    C3. C2. C1. C0 = 0001.
    DBS : 18. CLC; 69. ADC; EA. NOP; EA. NOP; XX.
    DBC : MTOSDB; MTOIDB.
    SPU : NOP.
    MPA : TO 077.
    SIG : R; NRDY4.
OD2 :    C3. C2. C1. C0 = 0010.
    DBS : EA. NOP; 18. CLC; 69. ADC; EA. NOP; XX.
    DBC : MTOSDB; MTOIDB.
    SPU : NOP.
    MPA : TO 077.
    SIG : R; NRDY4.
OD3 :    C3. C2. C1. C0 = 0011.
    DBS : 18. CLC; 69. ADC; 69. ADC; EA. NOP; XX.
    DBC : MTOSDB; MTOIDB.
    SPU : NOP.
    MPA : TO 057.
    SIG : R; NRDY4.
OD4 :    C3. C2. C1. C0 = 0100.
    DBS : EA. NOP; EA. NOP; 18. CLC; 69. ADC; XX.
    DBC : MTOSDB; MTOIDB.
    SPU : NOP.
    MPA : TO 056.
    SIG : R; NRDY4.
OD5 :    C3. C2. C1. C0 = 0101.
    DBS : 18. CLC; 69. ADC; 18. CLC; 69. ADC; XX.
    DBC : MTOSDB; MTOIDB.
    SPU : NOP.
    MPA : TO 077.
    SIG : R; NRDY4.
OD6 :    C3. C2. C1. C0 = 0110.
    DBS : EA. NOP; 18. CLC; 69. ADC; 69. ADC; XX.
    DBC : MTOSDB; MTOIDB.
    SPU : NOP.
    MPA : TO 056.
    SIG : R; NRDY4.
OD7 :    C3. C2. C1. C0 = 0111.
    DBS : 18. CLC; 69. ADC; 69. ADC; 69. ADC; XX.
    DBC : MTOSDB; MTOIDB.
    SPU : NOP.
    MPA : TO 056.
    SIG : R; NRDY4.
OD8 :    C3. C2. C1. C0 = 1000.
    DBS : 38. SEC; EA. NOP; EA. NOP; 18. CLC; XX.
    DBC : MTOSDB; MTOIDB.
    SPU : NOP.
    MPA : TO 054.
    SIG : R; NRDY4.
OD9 :    C3. C2. C1. C0 = 1001.
    DBS : EA. NOP; 69. ADC; EA. NOP; 18. CLC; XX.
    DBC : MTOSDB; MTOIDB.
    SPU : NOP.
    MPA : TO 077.
    SIG : R; NRDY4.
ODA :    C3. C2. C1. C0 = 1010.
    DBS : 38. SEC; 18. CLC; 69. ADC; 18. CLC; XX.
    DBC : MTOSDB; MTOIDB.
    SPU : NOP.
    MPA : TO 077.
    SIG : R; NRDY4.
ODB :    C3. C2. C1. C0 = 1011.
    DBS : EA. NOP; 69. ADC; 69. ADC; 18. CLC; XX.
    DBC : MTOSDB; MTOIDB.
    SPU : NOP.
    MPA : TO 057.
    SIG : R; NRDY4.
ODC :    C3. C2. C1. C0 = 1100.
    DBS : 38. SEC; EA. NOP; 18. CLC; 69. ADC; XX.
    DBC : MTOSDB; MTOIDB.
    SPU : NOP.
    MPA : TO 054.
    SIG : R; NRDY4.
ODD :    C3. C2. C1. C0 = 1101.
    DBS : EA. NOP; 69. ADC; 18. CLC; 69. ADC; XX.
    DBC : MTOSDB; MTOIDB.
    SPU : NOP.
    MPA : TO 055.
    SIG : R; NRDY4.
ODE :    C3. C2. C1. C0 = 1110.
    DBS : 38. SEC; 18. CLC; 69. ADC; 69. ADC; XX.
    DBC : MTOSDB; MTOIDB.
    SPU : NOP.
    MPA : TO 054.
    SIG : R; NRDY4.
```

```
ODF :    C3, C2, C1, C0 = 1111.
    DBS : EA, NOP; 69, ADC; 69, ADC; 69, ADC; XX.
    DBC : MTOSDB; MTOIDB.
    SPU : NOP.
    MPA : TO 054.
    SIG : R; NRDY4.
OE8 :    ORA - ABSOLUTE, X.
    DBS : XX; XX; XX; XX; XX.
    DBC : DLTOIDB; IDBTOSDB.
    SPU : NOP.
    MPA : IF RDY TO OC9.
    SIG : R.
OF0 :    ASL - ABSOLUTE, X.
    DBS : XX; XX; XX; XX; XX.
    DBC : DLTOIDB; IDBTOSDB.
    SPU : NOP.
    MPA : IF RDY TO OB0.
    SIG : R.
100 :    JSR.
    DBS : XX; XX; XX; XX; XX.
    DBC : DLTOIDB; IDBTOSDB.
    SPU : NOP.
    MPA : CONTINUE.
    SIG : R.
101 :    FROM 100.
    DBS : XX; XX; XX; XX; XX.
    DBC : NOP.
    SPU : NOP.
    MPA : CONTINUE.
    SIG : R; NRDY3-0.
102 :    FROM 101.
    DBS : XX; XX; XX; XX; XX.
    DBC : SDBTOIDB; IDBTODB.
    SPU : PH1.
    MPA : CONTINUE.
    SIG : V1; NRDY3-0.
103 :    FROM 102.
    DBS : XX; XX; XX; XX; XX.
    DBC : SDBTOIDB; IDBTODB.
    SPU : PH1.
    MPA : CONTINUE.
    SIG : V1; NRDY3-0.
104 :    FROM 103.
    DBS : XX; XX; XX; XX; XX.
    DBC : DLTOIDB; IDBTOSDB.
    SPU : NOP.
    MPA : IF RDY TO FETCH.
    SIG : R; NRDY3-0.
108 :    AND -(INDIRECT, X).
    DBS : XX; XX; XX; XX; XX.
    DBC : DLTOIDB; IDBTOSDB.
    SPU : NOP.
    MPA : IF RDY TO 009.
    SIG : R.
120 :    BIT - ZERO PAGE.
    DBS : XX; XX; XX; XX; XX.
    DBC : DLTOIDB; IDBTOSDB.
    SPU : NOP.
    MPA : IF RDY TO 121.
    SIG : R.
121 :    FROM 120.
    DBS : XX; XX; XX; XX; 00.
    DBC : DLTOIDB; MTOSDB.
    SPU : NOP.
    MPA : IF RDY TO FETCH.
    SIG : R.
128 :    AND - ZERO PAGE.
    DBS : XX; XX; XX; XX; XX.
    DBC : DLTOIDB; IDBTOSDB.
    SPU : NOP.
    MPA : IF RDY TO 029.
    SIG : R.
130 :    ROL - ZERO PAGE.
    DBS : XX; XX; XX; XX; XX.
    DBC : DLTOIDB; IDBTOSDB.
    SPU : NOP.
    MPA : IF RDY TO 031.
    SIG : R.
140 :    PLP.
    DBS : XX; XX; XX; XX; XX.
    DBC : DLTOIDB; IDBTOSDB.
    SPU : NOP.
    MPA : CONTINUE.
    SIG : R.
141 :    FROM 140.
    DBS : XX; XX; XX; XX; XX.
    DBC : DLTOIDB; IDBTOSDB.
    SPU : NOP.
    MPA : CONTINUE.
    SIG : R.
142 :    FROM 141.
    DBS : XX; XX; XX; XX; 00.
    DBC : DLTOIDB; MTOSDB.
    SPU : PL4.
    MPA : IF RDY TO 243.
    SIG : R.
```

```
143 :    FROM 142.
         DBS : XX; XX; XX; XX; XX.
         DBC : DLTOIDB; IDBTOSDB.
         SPU : AD4.
         MPA : TO FETCH.
         SIG : R; NRDY4; NRDY3-0.

148 :    AND - IMMEDIATE.
         DBS : XX; XX; XX; XX; 03. +3.
         DBC : DLTOIDB; MTOSDB.
         SPU : NOP.
         MPA : IF RDY TO 049.
         SIG : R.

150 :    ROL - ACCUMULATOR.
         DBS : XX; XX; XX; XX; XX.
         DBC : MTOIDB; MTOSDB.
         SPU : NOP.
         MPA : TO 051.
         SIG : R.

160 :    BIT - ABSOLUTE.
         DBS : XX; XX; XX; XX; XX.
         DBC : DLTOIDB; IDBTOSDB.
         SPU : NOP.
         MPA : IF RDY TO 120.
         SIG : R.

168 :    AND - ABSOLUTE.
         DBS : XX; XX; XX; XX; XX.
         DBC : DLTOIDB; IDBTOSDB.
         SPU : NOP.
         MPA : IF RDY TO 028.
         SIG : R.

170 :    ROL - ABSOLUTE.
         DBS : XX; XX; XX; XX; XX.
         DBC : DLTOIDB; IDBTOSDB.
         SPU : NOP.
         MPA : IF RDY TO 030.
         SIG : R.

180 :    BMI.
         DBS : XX; XX; XX; XX; XX.
         DBC : MTOSDB; MTOIDB.
         SPU : NOP.
         MPA : CONTINUE.
         SIG : R; NRDY4.

181 :    FROM 180.
         DBS : XX; XX; XX; XX; XX.
         DBC : NOP.
         SPU : NOP.
         MPA : TO 183 ON N3.
         SIG : R; NRDY4.

182 :    FROM 181.
         DBS : XX; XX; XX; XX; 00.
         DBC : MTOSDB; MTOIDB.
         SPU : NOP.
         MPA : TO 486.
         SIG : R; NRDY3-0.

183 :    FROM 181.
         DBS : XX; XX; XX; XX; XX.
         DBC : DLTOIDB; IDBTOSDB.
         SPU : NOP.
         MPA : IF RDY TO 483.
         SIG : R; NRDY3-0.

188 :    AND - (INDIRECT). Y.
         DBS : XX; XX; XX; XX; XX.
         DBC : DLTOIDB; IDBTOSDB.
         SPU : NOP.
         MPA : IF RDY TO 069.
         SIG : R.

1A8 :    AND - ZERO PAGE. X.
         DBS : XX; XX; XX; XX; XX.
         DBC : DLTOIDB; IDBTOSDB.
         SPU : NOP.
         MPA : IF RDY TO 0A9.
         SIG : R.

1B0 :    ROL - ZERO PAGE. X.
         DBS : XX; XX; XX; XX; XX.
         DBC : DLTOIDB; IDBTOSDB.
         SPU : NOP.
         MPA : IF RDY TO 0B1.
         SIG : R.

1C0 :    SEC.
         DBS : XX; XX; XX; XX; XX.
         DBC : DLTOIDB; IDBTOSDB.
         SPU : NOP.
         MPA : CONTINUE.
         SIG : R.

1C1 :    FROM 1C0.
         DBS : 38. SEC; EA. NOP; EA. NOP; EA. NOP; XX.
         DBC : MTOSDB; MTOIDB.
         SPU : NOP.
         MPA : CONTINUE.
         SIG : R; NRDY4.

1C2 :    FROM 1C1.
         DBS : XX; XX; XX; XX; XX.
         DBC : MTOSDB; MTOIDB.
         SPU : NOP.
         MPA : TO FETCH.
         SIG : R; NRDY4.
```

```
1C8 :    AND - ABSOLUTE, Y.
    DBS : XX; XX; XX; XX; XX.
    DBC : DLTOIDB; IDBTOSDB.
    SPU : NOP.
    MPA : IF RDY TO 0C9.
    SIG : R.
1E8 :    AND - ABSOLUTE, X.
    DBS : XX; XX; XX; XX; XX.
    DBC : DLTOIDB; IDBTOSDB.
    SPU : NOP.
    MPA : IF RDY TO 0C9.
    SIG : R.
1F0 :    ROL - ABSOLUTE, X.
    DBS : XX; XX; XX; XX; XX.
    DBC : DLTOIDB; IDBTOSDB.
    SPU : NOP.
    MPA : IF RDY TO 0B0.
    SIG : R.
200 :    RTI.
    DBS : XX; XX; XX; XX; XX.
    DBC : DLTOIDB; IDBTOSDB.
    SPU : NOP.
    MPA : CONTINUE.
    SIG : R.
201 :    FROM 200.
    DBS : XX; XX; XX; XX; XX.
    DBC : DLTOIDB; IDBTOSDB.
    SPU : NOP.
    MPA : CONTINUE.
    SIG : R.
202 :    FROM 201.
    DBS : XX; XX; XX; XX; 00.
    DBC : DLTOIDB; MTOSDB.
    SPU : PL4.
    MPA : IF RDY TO 203.
    SIG : R.
203 :    FROM 202
    DBS : XX; XX; XX; XX; XX.
    DBC : DLTOIDB; IDBTOSDB.
    SPU : PL*.
    MPA : IF RDY TO 204.
    SIG : R.
204 :    FROM 203.
    DBS : XX; XX; XX; XX; XX.
    DBC : DLTOIDB; IDBTOSDB.
    SPU : PL1.
    MPA : IF RDY TO FETCH.
    SIG : R.

208 :    EOR - (INDIRECT, X).
    DBC : XX; XX; XX; XX; XX.
    DBS : DLTOIDB; IDBTOSDB.
    SPU : NOP.
    MPA : IF RDY TO 009.
    SIG : R.
228 :    EOR - ZERO PAGE.
    DBS : XX; XX; XX; XX; XX.
    DBC : DLTOIDB; IDBTOSDB.
    SPU : NOP.
    MPA : IF RDY TO 029.
    SIG : R.
230 :    LSR - ZERO PAGE.
    DBS : XX; XX; XX; XX; XX.
    DBC : DLTOIDB; IDBTOSDB.
    SPU : NOP.
    MPA : IF RDY TO 231.
    SIG : R.
231 :    FROM 230.
    DBS : XX; XX; XX; XX; 00.
    DBC : DLTOIDB; MTOSDB.
    SPU : NOP.
    MPA : TO 236-23F ON (RDY AND C3,C2,C1).
    SIG : R.
232 :    FROM 2B9-2BF.
    DBS : 38, SEC; 18, CLC; 18, CLC; 18, CLC; XX.
    DBC : MTOSDB; MTOIDB.
    SPU : NOP.
    MPA : CONTINUE.
    SIG : R; NRDY4; KPDB.
233 :    FROM 232.
    DBS : XX; XX; XX; XX; XX.
    DBC : MTOSDB; MTOIDB.
    SPU : NOP.
    MPA : CONTINUE.
    SIG : R; NRDY4; KPDB.
234 :    FROM 233.
    DBS : 66, ROR; 66, ROR; 66, ROR; 66, ROR; XX.
    DBC : MTOSDB; MTOIDB.
    SPU : NOP.
    MPA : CONTINUE.
    SIG : R; NRDY4; KPDB.
235 :    FROM 234.
    DBS : XX; XX; XX; XX; XX.
    DBC : MTOSDB; MTOIDB.
    SPU : NOP.
    MPA : CONTINUE.
    SIG : R; NRDY4; KPDB.
```

```
236 :     FROM 235.
    DBC : XX; XX; XX; XX; XX.
    DBS : HTOSDB; DLTOIDB.
    SPU : NOP.
    MPA : CONTINUE.
    SIG : R; NRDY4; KPDB.
237 :     FROM 236.
    DBS : XX; XX; XX; XX; XX.
    DBC : HTOSDB.
    SPU : NOP.
    MPA : TO 271.
    SIG : R; NRDY4; KPDB.
238 :     C3. C2. C1 = 000.
    DBS : XX; XX; XX; XX; XX.
    DBC : NOP.
    SIG : V4; KPDB.
239 :     C3. C2. C1 = 001.
    DBS : XX; XX; XX; XX; XX.
    DBC : NOP.
    SPU : NOP.
    MPA : TO 289.
    SIG : V4; KPDB.
23A :     C3. C2. C1 = 010.
    DBS : XX; XX; XX; XX; XX.
    DBC : NOP.
    SPU : NOP.
    MPA : TO 28A.
    SIG : V4; KPDB.
23B :     C3. C2. C1 = 011.
    DBS : XX; XX; XX; XX; XX.
    DBC : NOP.
    SPU : NOP.
    MPA : TO 28B.
    SIG : V4; KPDB.
23C :     C3. C2. C1 = 100.
    DBS : XX; XX; XX; XX; XX.
    DBC : NOP.
    SPU : NOP.
    MPA : TO 28C.
    SIG : V4; KPDB.
23D :     C3. C2. C1 = 101.
    DBS : XX; XX; XX; XX; XX.
    DBC : NOP.
    SPU : NOP.
    MPA : TO 28D.
    SIG : V4; KPDB.
23E :     C3. C2. C1 = 110.
    DBS : XX; XX; XX; XX; XX.
    DBC : NOP.
    SPU : NOP.
    MPA : TO 28E.
    SIG : V4; KPDB.
23F :     C3. C2. C1 = 111.
    DBS : XX; XX; XX; XX; XX.
    DBC : NOP.
    SPU : NOP.
    MPA : TO 28F.
    SIG : V4; KPDB.
240 :     PHA.
    DBS : XX; XX; XX; XX; XX.
    DBC : HTOSDB; HTOIDB.
    SPU : NOP.
    MPA : CONTINUE.
    SIG : R.
241 :     FROM 240.
    DBS : XX; XX; XX; XX; XX.
    DBC : IDBTODB.
    SPU : PH4.
    MPA : TO FETCH.
    SIG : V4.
248 :     EOR - IMMEDIATE.
    DBS : XX; XX; XX; XX; 03. +3.
    DBC : DLTOIDB; HTOSDB.
    SPU : NOP.
    MPA : IF RDY TO 049.
    SIG : R.
250 :     LSR - ACCUMULATOR.
    DBS : XX; XX; XX; XX; XX.
    DBC : HTOIDB; HTOSDB.
    SPU : NOP.
    MPA : CONTINUE.
    SIG : R.
251 :     FROM 250.
    DBS : 08. PHP; 08. PHP; 08. PHP; 08. PHP; XX.
    DBC : HTOIDB; HTOSDB.
    SPU : NOP.
    MPA : CONTINUE.
    SIG : R; NRDY4.
252 :     FROM 251.
    DBS : XX; XX; XX; XX; XX.
    DBC : HTOIDB; HTOSDB.
    SPU : NOP.
    MPA : CONTINUE.
    SIG : R; NRDY4.
253 :     FROM 252.
    DBS : XX; XX; XX; XX; XX.
```

```
         DBC : MTOSDB.
         SPU : NOP.
         MPA : TO 2E0 - 2E7 ON C3, C2, C1.
         SIG : R: NRDY4.
254 :    FROM 2E1.
         DBS : 80; 80; 7F; XX; XX.
         DBC : MTOSDB; MTOIDB.
         SPU : NOP.
         MPA : TO FETCH.
         SIG : R: NRDY4.
255 :    FROM 2E3.
         DBS : 80; 7F; 7F; XX; XX.
         DBC : MTOSDB; MTOIDB.
         SPU : NOP.
         MPA : TO FETCH.
         SIG : R: NRDY4.
256 :    FROM 2E4.
         DBS : 80; XX; 80; XX; XX.
         DBC : MTOSDB; MTOIDB.
         SPU : NOP.
         MPA : TO FETCH.
         SIG : R: NRDY4.
260 :    JMP - ABSOLUTE.
         DBS : XX; XX; XX; XX; XX.
         DBC : DLTOIDB; IDBTOSDB.
         SPU : NOP.
         MPA : IF RDY TO 261.
         SIG : R.
261 :    FROM 260.
         DBS : XX; XX; XX; XX; XX.
         DBC : DLTOIDB; IDBTOSDB.
         SPU : NOP.
         MPA : IF RDY TO FETCH.
         SIG : R.
268 :    EOR - ABSOLUTE.
         DBS : XX; XX; XX; XX; XX.
         DBC : DLTOIDB; IDBTOSDB.
         SPU : NOP.
         MPA : IF RDY TO 028.
         SIG : R.
270 :    LSR - ABSOLUTE.
         DBS : XX; XX; XX; XX; XX.
         DBC : DLTOIDB; IDBTOSDB.
         SPU : NOP.
         MPA : IF RDY TO 230.
         SIG : R.
271 :    FROM 237.
         DBS : XX; XX; XX; XX; XX.
         DBC : MTOSDB.
         SPU : NOP.
         MPA : CONTINUE.
         SIG : R: NRDY4; KPDB.
272 :    FROM 271.
         DBS : EA, NOP; 18, CLC; 18, CLC; 18, CLC; XX.
         DBC : MTOSDB; MTOIDB.
         SPU : NOP.
         MPA : CONTINUE.
         SIG : R: NRDY4; KPDB.
273 :    FROM 272.
         DBS : XX; XX; XX; XX; XX.
         DBC : MTOSDB; MTOIDB.
         SPU : NOP.
         MPA : TO FETCH.
         SIG : R: NRDY4.
280 :    BVC.
         DBS : XX; XX; XX; XX; XX.
         DBC : MTOSDB; MTOIDB.
         SPU : NOP.
         MPA : CONTINUE.
         SIG : R: NRDY4.
281 :    FROM 280.
         DBS : XX; XX; XX; XX; XX.
         DBC : NOP.
         SPU : NOP.
         MPA : IF V3 TO 485.
         SIG : R: NRDY4.
282 :    FROM 281.
         DBS : XX; XX; XX; XX; XX.
         DBC : DLTOIDB; IDBTOSDB.
         SPU : NOP.
         MPA : IF RDY TO 483.
         SIG : R: NRDY3-0.
288 :    EOR - (INDIRECT), Y.
         DBS : XX; XX; XX; XX; XX.
         DBC : DLTOIDB; IDBTOSDB.
         SPU : NOP.
         MPA : IF RDY TO 089.
         SIG : R.
2A8 :    EOR - ZERO PAGE, X.
         DBS : XX; XX; XX; XX; XX.
         DBC : DLTOIDB; IDBTOSDB.
         SPU : NOP.
         MPA : IF RDY TO 0A9.
         SIG : R.
2B0 :    LSR - ZERO PAGE, X.
         DBS : XX; XX; XX; XX; XX.
```

```
     DBC : DLTOIDB; IDBTOSDB.
     SPU : NOP.
     MPA : IF RDY TO 2B1.
     SIG : R.
2B1 :     FROM 2B0.
     DBS : XX; XX; XX; XX; XX.
     DBC : MTOSDB; MTOIDB.
     SPU : NOP.
     MPA : TO 2B1.
     SIG : R.
2B8 :     FROM 238.
     DBS : XX; XX; XX; XX; XX.
     DBC : IDBTODB. NOP. NOP. NOP.
     SPU : NOP.
     MPA : TO FETCH.
     SIG : V4; KPDB.
2B9 :     FROM 239.
     DBS : XX; XX; XX; XX; XX.
     DBC : IDBTODB. SEM. NOP. NOP. NOP.
     SPU : NOP.
     MPA : TO 232.
     SIG : V4; KPDB.
2BA :     FROM 23A.
     DBS : XX; XX; XX; XX; XX.
     DBC : IDBTODB. NOP. SEM. NOP. NOP.
     SPU : NOP.
     MPA : TO 232.
     SIG : V4; KPDB.
2BB :     FROM 23B.
     DBS : XX; XX; XX; XX; XX.
     DBC : IDBTODB. SEM. SEM. NOP. NOP.
     SPU : NOP.
     MPA : TO 232.
     SIG : V4; KPDB.
2BC :     FROM 23C.
     DBS : XX; XX; XX; XX; XX.
     DBC : IDBTODB. NOP. NOP. SEM. NOP.
     SPU : NOP.
     MPA : TO 232.
     SIG : V4; KPDB.
2BD :     FROM 23D.
     DBS : XX; XX; XX; XX; XX.
     DBC : IDBTODB. SEM. NOP. SEM. NOP.
     SPU : NOP.
     MPA : TO 232.
     SIG : V4; KPDB.
2BE :     FROM 23D.
     DBS : XX; XX; XX; XX; XX.
     DBC : IDBTODB. NOP. SEM. SEM. NOP.
     SPU : NOP.
     MPA : TO 232.
     SIG : V4; KPDB.
2BF :     FROM 23F.
     DBS : XX; XX; XX; XX; XX.
     DBC : IDBTODB. SEM. SEM. SEM. NOP.
     SPU : NOP.
     MPA : TO 232.
     SIG : V4; KPDB.
2C0 :     CLI.
     DBS : XX; XX; XX; XX; XX.
     DBC : DLTOIDB; IDBTOSDB.
     SPU : NOP.
     MPA : TO FETCH.
     SIG : R.
2C8 :     EOR - ABSOLUTE. Y.
     DBS : XX; XX; XX; XX; XX.
     SPU : NOP.
     MPA : IF RDY TO 0C9.
     SIG : R.
2E0 :     C3. C2. C1 = 000.
     DBS : XX; XX; XX; XX; XX.
     DBC : MTOSDB; MTOIDB.
     SPU : NOP.
     MPA : TO FETCH.
     SIG : R; NRDY4; NRDY3-0.
2E1 :     C3. C2. C1 = 001.
     DBS : 09. ORA; 18. CLC; EA. NOP; EA. NOP; XX.
     DBC : MTOSDB; MTOIDB.
     SPU : NOP.
     MPA : TO 254.
     SIG : R; NRDY4.
2E2 :     C3. C2. C1 = 010.
     DBS : EA. NOP; 09. ORA; 18. CLC; EA. NOP; XX.
     DBC : MTOSDB; MTOIDB.
     SPU : NOP.
     MPA : TO 254.
     SIG : R; NRDY4.
2E3 :     C3. C2. C1 = 011.
     DBS : 09. ORA; 69. ADC; 18. CLC; EA. NOP; XX.
     DBC : MTOSDB; MTOIDB.
     SPU : NOP.
     MPA : TO 255.
     SIG : R; NRDY4.
2E4 :     C3. C2. C1 = 100.
     DBS : EA. NOP; EA. NOP; 09. ORA; 18. CLC; XX.
     DBC : MTOSDB; MTOIDB.
```

```
        SPU : NOP.                                    SPU : PL1.
        MPA : TO 256.                                 MPA : IF RDY TO 303.
        SIG : R; NRDY4.                               SIG : R.
2E5 :   C3, C2, C1 = 101.                    303 :   FROM 302.
        DBS : 09, ORA; 18, CLC; 09, ORA; 18, CLC; XX.     DBS : XX; XX; XX; XX; XX.
        DBC : MTOSDB; MTOIDB.                         DBC : DLTOIDB; IDBTOSDB.
        SPU : NOP.                                    SPU : PL1.
        MPA : TO 256.                                 MPA : IF RDY TO 304.
        SIG : R; NRDY4.                               SIG : R.
2E6 :   C3, C2, C1 = 110.                    304 :   FROM 303.
        DBS : EA, NOP; 09, ORA; 69, ADC; 18, CLC; XX.     DBS : XX; XX; XX; XX; XX.
        DBC : MTOSDB; MTOIDB.                         DBC : DLTOIDB; IDBTOSDB.
        SPU : NOP.                                    SPU : NOP.
        MPA : TO 254.                                 MPA : TO FETCH.
        SIG : R; NRDY4.                               SIG : R.
2E7 :   C3, C2, C1 = 111.                    308 :   ADC - (INDIRECT, X).
        DBS : 09, ORA; 69, ADC; 69, ADC; 18, CLC; XX.     DBS : XX; XX; XX; XX; XX.
        DBC : MTOSDB; MTOIDB.                         DBC : DLTOIDB; IDBTOSDB.
        SPU : NOP.                                    SPU : NOP.
        MPA : TO 255.                                 MPA : IF RDY TO 309.
        SIG : R; NRDY4.                               SIG : R.
2E8 :   EOR - ABSOLUTE, X.                   309 :   FROM 308.
        DBS : XX; XX; XX; XX; XX.                     DBS : XX; XX; XX; XX; XX.
        DBC : DLTOIDB; IDBTOSDB.                      DBC : DLTOIDB; IDBTOSDB.
        SPU : NOP.                                    SPU : NOP.
        MPA : IF RDY TO OC9.                          MPA : CONTINUE.
        SIG : R.                                      SIG : R.
2F0 :   LSR - ABSOLUTE, X.                   30A :   FROM 309.
        DBS : XX; XX; XX; XX; XX.                     DBS : XX; XX; XY; XX; XX.
        DBC : DLTOIDB; IDBTOSDB.                      DBC : DLTOIDB; IDBTOSDB.
        SPU : NOP.                                    SPU : NOP.
        MPA : IF RDY TO 280.                          MPA : IF RDY TO 30B.
        SIG : R.                                      SIG : R.
300 :   RTS.                                 30B :   FROM 30A.
        DBS : XX; XX; XX; XX; XX.                     DBS : XX; XX; XX; XX; XX.
        DBC : DLTOIDB; IDBTOSDB.                      DBC : DLTOIDB; IDBTOSDB.
        SPU : NOP.                                    SPU : NOP.
        MPA : CONTINUE.                               MPA : IF RDY TO 30C.
        SIG : R.                                      SIG : R.
301 :   FROM 300.                            30C :   FROM 30B.
        DBS : XX; XX; XX; XX; XX.                     DBS : XX; XX; XX; XX; 00.
        DBC : DLTOIDB; IDBTOSDB.                      DBC : DLTOIDB; MTOSDB.
        SPU : NOP.                                    SPU : NOP.
        MPA : CONTINUE.                               MPA : IF RDY TO 30D.
        SIG : R.                                      SIG : R.
302 :   FROM 301                             30D :   FROM 30C.
        DBS : XX; XX; XX; XX; XX.                     DBS : 08, PHP; 08, PHP; 08, PHP; 08, PHP; XX.
        DBC : DLTOIDB; IDBTOSDB.                      DBC : MTOSDB; MTOIDB.
```

```
        SPU : NOP.
        MPA : CONTINUE.
        SIG : R: NRDY4.
30E :   FROM 30D.
        DBS : XX: XX: XX: XX: XX.
        DBC : MTOSDB: MTOIDB.
        SPU : NOP.
        MPA : TO 34B.
        SIG : R: NRDY4.
310 :   C3. C2. C1. CO = 0000.
        DBS : XX: XX: XX: XX: XX.
        DBC : MTOSDB: MTOIDB.
        SPU : NOP.
        MPA : TO FETCH.
        SIG : R: NRDY4: NRDY3-0.
311 :   C3. C2. C1. CO = 0001.
        DBS : 1B. CLC: 69. ADC: 69. ADC: EA. NOP: XX.
        DBC : MTOSDB: MTOIDB.
        SPU : NOP.
        MPA : TO 3CC.
        SIG : R: NRDY4.
312 :   C3. C2. C1. CO = 0010.
        DBS : EA. NOP: 1B. CLC: 69. ADC: EA. NOP: XX.
        DBC : MTOSDB: MTOIDB.
        SPU : NOP.
        MPA : TO 34D.
        SIG : R: NRDY4.
313 :   C3. C2. C1. CO = 0011.
        DBS : 1B. CLC: 69. ADC: 69. ADC: EA. NOP: XX.
        DBC : MTOSDB: MTOIDB.
        SPU : NOP.
        MPA : TO 32C.
        SIG : R: NRDY4.
314 :   C3. C2. C1. CO = 0100.
        DBS : EA. NOP: EA. NOP: 1B. CLC: 69. ADC: XX.
        DBC : MTOSDB: MTOIDB.
        SPU : NOP.
        MPA : TO 32C.
        SIG : R: NRDY4.
315 :   C3. C2. C1. CO = 0101.
        DBS : 1B. CLC: 69. ADC: 1B. CLC: 69. ADC: XX.
        DBC : MTOSDB: MTOIDB.
        SPU : NOP.
        MPA : TO 34F.
        SIG : R: NRDY4.
316 :   C3. C2. C1. CO = 0110.
        DBS : EA. NOP: 1B. CLC: 69. ADC: 69. ADC: XX.
        DBC : MTOSDB: MTOIDB.
        SPU : NOP.
        MPA : TO 34E.
        SIG : R: NRDY4.
317 :   C3. C2. C1. CO = 0111.
        DBS : 1B. CLC: 69. ADC: 69. ADC: 69. ADC: XX.
        DBC : MTOSDB: MTOIDB.
        SPU : NOP.
        MPA : TO 34E.
        SIG : R: NRDY4.
318 :   C3. C2. C1. CO = 1000.
        DBS : 3B. SEC: EA. NOP: EA. NOP: 1B. CLC: XX.
        DBC : MTOSDB: MTOIDB.
        SPU : NOP.
        MPA : TO 34C.
        SIG : R: NRDY4.
319 :   C3. C2. C1. CO = 1001.
        DBS : EA. NOP: 69. ADC: 69. ADC: 1B. CLC: XX.
        DBC : MTOSDB: MTOIDB.
        SPU : NOP.
        MPA : TO 3CC.
        SIG : R: NRDY4.
31A :   C3. C2. C1. CO = 1010.
        DBS : 3B. SEC: 1B. CLC: 69. ADC: 1B. CLC: XX.
        DBC : MTOSDB: MTOIDB.
        SPU : NOP.
        MPA : TO 34D.
        SIG : R: NRDY4.
31B :   C3. C2. C1. CO = 1011.
        DBS : EA. NOP: 69. ADC: 69. ADC: 1B. CLC: XX.
        DBC : MTOSDB: MTOIDB.
        SPU : NOP.
        MPA : TO 32C.
        SIG : R: NRDY4.
31C :   C3. C2. C1. CO = 1100.
        DBS : 3B. SEC: EA. NOP: 1B. CLC: 69. ADC: XX.
        DBC : MTOSDB: MTOIDB.
        SPU : NOP.
        MPA : TO 34C.
        SIG : R: NRDY4.
31D :   C3. C2. C1. CO = 1101.
        DBS : EA. NOP: 69. ADC: 1B. CLC: 69. ADC: XX.
        DBC : MTOSDB: MTOIDB.
        SPU : NOP.
        MPA : TO 34D.
        SIG : R: NRDY4.
31E :   C3. C2. C1. CO = 1110.
        DBS : 3B. SEC: 1B. CLC: 69. ADC: 69. ADC: XX.
        DBC : MTOSDB: MTOIDB.
```

```
        SPU : NOP.
        MPA : TO 34C.
        SIG : R: NRDY4.
31F :   C3, C2, C1, C0 = 1111.
        DBS : EA, NOP; 69, ADC; 69, ADC; 69, ADC; XX.
        DBC : MTOSDB; MTOIDB.
        SPU : NOP.
        MPA : TO 34C.
        SIG : R: NRDY4.
320 :   C3, C2, C1 = 000.
        DBS : XX; XX; XX; XX; XX.
        DBC : MTOSDB; MTOIDB.
        SPU : NOP.
        MPA : TO FETCH.
        SIG : R: NRDY4; NRDY3-0.
321 :   C3, C2, C1 = 001.
        DBS : EA, NOP; 18, CLC; 69, ADC; EA, NOP; XX.
        DBC : MTOIDB; MTOSDB.
        SPU : NOP.
        MPA : TO 323.
        SIG : R: NRDY4.
322 :   C3, C2, C1 = 010.
        DBS : EA, NOP; EA, NOP; 18, CLC; 69, ADC; XX.
        DBC : MTOIDB; MTOSDB.
        SPU : NOP.
        MPA : TO 326.
        SIG : R: NRDY4.
323 :   FROM 321.
        DBS : XX; XX; 01; XX; XX.
        DBC : MTOIDB; MTOSDB.
        SPU : NOP.
        MPA : TO FETCH.
        SIG : R: NRDY4.
324 :   C3, C2, C1 = 100.
        DBS : 38, SEC; EA, NOP; EA, NOP; 18, CLC; XX.
        DBC : MTOIDB; MTOSDB.
        SPU : NOP.
        MPA : TO 323.
        SIG : R: NRDY4.
325 :   C3, C2, C1 = 101.
        DBS : 38, SEC; 18, CLC; 69, ADC; 18, CLC; XX.
        DBC : MTOIDB; MTOSDB.
        SPU : NOP.
        MPA : TO 323.
        SIG : R: NRDY4.
326 :   FROM 322.
        DBS : XX; XX; XX; 01; XX.
        DBC : MTOIDB; MTOSDB.
        SPU : NOP.
        MPA : CONTINUE.
        SIG : R: NRDY4.
327 :   FROM 326.
        DBS : 08, PHP; 08, PHP; 08, PHP; 08, PHP; XX.
        DBC : MTOIDB; MTOSDB.
        SPU : NOP.
        MPA : TO 3AB.
        SIG : R: NRDY4.
328 :   ADC - ZERO PAGE.
        DBS : XX; XX; XX; XX; XX.
        DBC : DLTOIDB; IDBTOSDB.
        SPU : NOP.
        MPA : IF RDY TO 30C.
        SIG : R.
32C :   FROM 314.
        DBS : XX; 00; 01; 01; XX.
        DBC : MTOIDB; MTOSDB.
        SPU : NOP.
        MPA : TO 32D.
        SIG : R: NRDY4.
32D :   FROM 32C.
        DBS : 08, PHP; 08, PHP; 08, PHP; 08, PHP; XX.
        DBC : MTOIDB; MTOSDB.
        SPU : NOP.
        MPA : CONTINUE.
        SIG : R: NRDY4.
32E :   FROM 32D.
        DBS : XX; XX; XX; XX; XX.
        DBC : MTOIDB; MTOSDB.
        SPU : NOP.
        MPA : CONTINUE.
        SIG : R: NRDY4.
32F :   FROM 32E.
        DBS : XX; XX; XX; XX; XX.
        DBC : MTOSDB.
        SPU : NOP.
        MPA : TO 320-327 ON C3, C2, C1.
        SIG : R: NRDY4.
330 :   ROR - ZERO PAGE.
        DBS : XX; XX; XX; XX; XX.
        DBC : MTOIDB; MTOSDB.
        SPU : NOP.
        MPA : CONTINUE.
        SIG : R: NRDY4.
331 :   FROM 330.
        DBS : XX; XX; XX; XX; XX.
        DBC : MTOSDB.
```

```
        SPU : NOP.
        MPA : IF CO TO 333.
        SIG : R: NRDY4.
332 :   FROM 331, 334.
        DBS : 66. ROR; 66. ROR; 66. ROR; 66. ROR; XX.
        DBC : MTOIDB; MTOSDB.
        SPU : NOP.
        MPA : TO 230.
        SIG : R: NRDY4.
333 :   FROM 331.
        DBS : 18. CLC; EA. NOP; EA. NOP; 38. SEC; XX.
        DBC : MTOIDB; MTOSDB.
        SPU : NOP.
        MPA : CONTINUE.
        SIG : R: NRDY4.
334 :   FROM 333.
        DBS : XX; XX; XX; XX; XX.
        DBC : MTOSDB; MTOIDB.
        SPU : NOP.
        MPA : TO 332.
        SIG : R: NRDY4.
338 :   C3. C2. C1 = 000.
        DBS : EA. NOP; EA. NOP; E9. SBC; EA. NOP; XX.
        DBC : MTOIDB; MTOSDB.
        SPU : NOP.
        MPA : TO 33C.
        SIG : R: NRDY4.
339 :   C3. C2. C1 = 001.
        DBS : EA. NOP; 18. CLC; EA. NOP; EA. NOP; XX.
        DBC : MTOIDB; MTOSDB.
        SPU : NOP.
        MPA : TO 33E.
        SIG : R: NRDY4.
33A :   C3. C2. C1 = 010.
        DBS : EA. NOP; EA. NOP; E9. SBC; EA. NOP; XX.
        DBC : MTOIDB; MTOSDB.
        SPU : NOP.
        MPA : TO 33F.
        SIG : R: NRDY4.
33B :   C3. C2. C1 = 011.
        DBS : EA. NOP; 18. CLC; 18. CLC; 69. ADC; XX.
        DBC : MTOIDB; MTOSDB.
        SPU : NOP.
        MPA : TO 326.
        SIG : R: NRDY4.
33C :   FROM 338.
        DBS : XX; XX; 00; XX; XX.
        DBC : MTOIDB; MTOSDB.

SPU : NOP.
        MPA : CONTINUE.
        SIG : R: NRDY4.
33D :   FROM 33C.
        DBS : EA. NOP; EA. NOP; 18. CLC; EA. NOP; XX.
        DBC : MTOIDB; MTOSDB.
        SPU : NOP.
        MPA : CONTINUE.
        SIG : R: NRDY4.
33E :   FROM 33D.
        DBS : XX; XX; XX; XX; XX.
        DBC : MTOIDB; MTOSDB.
        SPU : NOP.
        MPA : TO FETCH.
        SIG : R: NRDY4.
33F :   FROM 33A.
        DBS : XX; XX; 01; XX; XX.
        DBC : MTOIDB; MTOSDB.
        SPU : NOP.
        MPA : TO 33D.
        SIG : R: NRDY4.
340 :   PLA.
        DBS : XX; XX; XX; XX; XX.
        DBC : DLTOIDB; IDBTOSDB.
        SPU : NOP.
        MPA : CONTINUE.
        SIG : R.
341 :   FROM 340.
        DBS : XX; XX; XX; XX; XX.
        DBC : DLTOIDB; IDBTOSDB.
        SPU : NOP.
        MPA : CONTINUE.
        SIG : R.
342 :   FROM 341.
        DBS : XX; XX; XX; XX; 00.
        DBC : DLTOIDB; MTOSDB.
        SPU : PLA.
        MPA : IF RDY TO 343.
        SIG : R.
343 :   FROM 342.
        DBS : XX; XX; XX; XX; XX.
        DBC : DLTOIDB; MTOSDB.
        SPU : AD4.
        MPA : TO FETCH.
        SIG : R; NRDY4; NRDY3-0.
348 :   ADC - IMMEDIATE.
        DBS : XX; XX; XX; XX; 03. +3.
        DBC : DLTOIDB; MTOSDB.
```

```
        SPU : NOP.
        MPA : IF RDY TO 349.
        SIG : R.
349 :   FROM 348.
        DBS : 08. PHP; 08. PHP; 08. PHP; 08. PHP; XX.
        DBC : MTOSDB; MTOIDB.
        SPU : NOP.
        MPA : CONTINUE.
        SIG : R.
34A :   FROM 349.
        DBS : XX; XX; XX; XX; XX.
        DBC : MTOSDB; MTOIDB.
        SPU : NOP.
        MPA : CONTINUE.
        SIG : R; NRDY4 IF SYNC4.
34B :   FROM 34A.
        DBS : XX; XX; XX; XX; XX.
        DBC : MTOSDB.
        SPU : NOP.
        MPA : TO 310-31F ON C3. C2. C1. C0.
        SIG : R; NRDY4.
34C :   FROM 31F.
        DBS : XX; 00; 00; 00; XX.
        DBC : MTOIDB; BTOSDB.
        SPU : NOP.
        MPA : TO FETCH.
        SIG : R; NRDY4.
34D :   FROM 31D.
        DBS : XX; 01; 01; 00; XX.
        DBC : MTOIDB; MTOSDB.
        SPU : NOP.
        MPA : TO 32D.
        SIG : R; NRDY4.
34E :   FROM 317.
        DBS : XX; 00; 00; 01; XX.
        DBC : MTOIDB; MTOSDB.
        SPU : NOP.
        MPA : TO 32D.
        SIG : R; NRDY4.
34F :   FROM 315.
        DBS : XX; 01; XX; 01; XX.
        DBC : MTOIDB; MTOSDB.
        SPU : NOP.
        MPA : TO 32D.
        SIG : R; NRDY4.
350 :   ROR - ACCUMULATOR.
        DBS : XX; XX; XX; XX; XX.
        DBC : MTOIDB; MTOSDB.
        SPU : NOP.
        MPA : CONTINUE.
        SIG : R.
351 :   FROM 350.
        DBS : XX; XX; XX; XX; XX.
        DBC : MTOSDB.
        SPU : NOP.
        MPA : IF CO TO 353.
        SIG : R; NRDY4.
352 :   FROM 351, 354.
        DBS : 6A. ROR; 6A. ROR; 6A. ROR; 6A. ROR; XX.
        DBC : MTOSDB; MTOIDB.
        SPU : NOP.
        MPA : TO 355.
        SIG : R; NRDY4.
353 :   FROM 351.
        DBS : 18. CLC; EA. NOP; EA. NOP; 38. SEC; XX.
        DBC : MTOSDB; MTOIDB.
        SPU : NOP.
        MPA : CONTINUE.
        SIG : R; NRDY4.
354 :   FROM 353.
        DBS : XX; XX; XX; XX; XX.
        DBC : MTOSDB; MTOIDB.
        SPU : NOP.
        MPA : TO 352.
        SIG : R; NRDY4.
355 :   FROM 352.
        DBS : XX; XX; XX; XX; XX.
        DBC : MTOSDB; MTOIDB.
        SPU : NOP.
        MPA : TO 251.
        SIG : R; NRDY4.
360 :   JMP - INDIRECT.
        DBS : XX; XX; XX; XX; XX.
        DBC : DLTOIDB; IDBTOSDB.
        SPU : NOP.
        MPA : IF RDY TO 361.
        SIG : R.
361 :   FROM 360.
        DBS : XX; XX; XX; XX; XX.
        DBC : DLTOIDB; IDBTOSDB.
        SPU : NOP.
        MPA : IF RDY TO 362.
        SIG : R.
362 :   FROM 361.
        DBS : XX; XX; XX; XX; XX.
        DBC : DLTOIDB; IDBTOSDB.
```

```
            SPU : NOP.
            MPA : IF RDY TO 363.
            SIG : R.
363 :       FROM 362.
            DBS : XX; XX; XX; XX; XX.
            DBC : DLTOIDB; IDBTOSDB.
            SPU : NOP.
            MPA : IF RDY TO FETCH.
            SIG : R.
368 :       ADC - ABSOLUTE.
            DBS : XX; XX; XX; XX; XX.
            DBC : DLTOIDB; IDBTOSDB.
            SPU : NOP.
            MPA : IF RDY TO 308.
            SIG : R.
370 :       ROR - ABSOLUTE.
            DBS : XX; XX; XX; XX; XX.
            DBC : MTOSDB; MTOIDB.
            SPU : NOP.
            MPA : CONTINUE.
            SIG : R; NRDY4.
371 :       FROM 370.
            DBS : XX; XX; XX; XX; XX.
            DBC : MTOSDB.
            SPU : NOP.
            MPA : IF CO TO 373.
            SIG : R; NRDY4.
372 :       FROM 371, 374.
            DBS : 6E. ROR; 6E. ROR; 6E. ROR; 6E. ROR; XX.
            DBC : MTOSDB; MTOIDB.
            SPU : NOP.
            MPA : TO 270.
            SIG : R; NRDY4.
373 :       FROM 372.
            DBS : 18. CLC; EA. NOP; EA. NOP; 38. SEC; XX.
            DBC : MTOSDB; MTOIDB.
            SPU : NOP.
            MPA : CONTINUE.
            SIG : R; NRDY4.
374 :       FROM 373.
            DBS : XX; XX; XX; XX; XX.
            DBC : MTOSDB; MTOIDB.
            SPU : NOP.
            MPA : TO 372.
            SIG : R; NRDY4.
380 :       BVS.
            DBS : XX; XX; XX; XX; XX.
            DBC : MTOSDB; MTOIDB.
            SPU : NOP.
            MPA : CONTINUE.
            SIG : R; NRDY4.
381 :       FROM 380.
            DBS : XX; XX; XX; XX; XX.
            DBC : NOP.
            SPU : NOP.
            MPA : IF V3 TO 482.
            SIG : R; NRDY4.
382 :       FROM 381.
            DBS : XX; XX; XX; XX; 00.
            DBC : MTOSDB; MTOIDB.
            SPU : NOP.
            MPA : TO 486.
            SIG : R; NRDY3-0.
388 :       ADC - (INDIRECT), Y.
            DBS : XX; XX; XX; XX; XX.
            DBC : DLTOIDB; IDBTOSDB.
            SPU : NOP.
            MPA : IF RDY TO 389.
            SIG : R.
389 :       FROM 388.
            DBS : XX; XX; XX; XX; XX.
            DBC : DLTOIDB; IDBTOSDB.
            SPU : NOP.
            MPA : IF RDY TO 38A.
            SIG : R.
38A :       FROM 389.
            DBS : XX; XX; XX; XX; XX.
            DBC : DLTOIDB; IDBTOSDB.
            SPU : NOP.
            MPA : IF RDY TO 38B.
            SIG : R; NRDY3-0.
38B :       FROM 38A.
            DBS : XX; XX; XX; XX; 00.
            DBC : DLTOIDB; MTOSDB.
            SPU : NOP.
            MPA : IF RDY TO 38C.
            SIG : R; NRDY3-0.
38C :       FROM 38B.
            DBS : XX; XX; XX; XX; 00.
            DBC : DLTOIDB; MTOSDB.
            SPU : NOP.
            MPA : IF RDY TO 30D.
            SIG : R; NRDY4 IF SYNC4; KPDB IF SYNC4.
3A8 :       ADC - ZERO PAGE, X.
            DBS : XX; XX; XX; XX; XX.
            DBC : DLTOIDB; IDBTOSDB.
```

```
         SPU : NOP.
         MPA : IF RDY TO 3A9.
         SIG : R.
3A9 :    FROM 3A8.
         DBS : XX; XX; XX; XX; XX.
         DBC : DLTOIDB; IDBTOSDB.
         SPU : NOP.
         MPA : TO 30C.
         SIG : R.
3AB :    FROM 327.
         DBS : XX; XX; XX; XX; XX.
         DBC : MTOIDB; MTOSDB.
         SPU : NOP.
         MPA : CONTINUE.
         SIG : R; NRDY4.
3AC :    FROM 3A8.
         DBS : XX; XX; XX; XX; XX.
         DBC : MTOSDB.
         SPU : NOP.
         MPA : TO 3AE ON C3.
         SIG : R; NRDY4.
3AD :    FROM 3AC.
         DBS : 18, CLC; 18, CLC; 18, CLC; XX.
         DBC : MTOIDB; MTOSDB.
         SPU : NOP.
         MPA : TO 3AF.
         SIG : R; NRDY4.
3AE :    FROM 3AC.
         DBS : 38, SEC; 18, CLC; 18, CLC; 18, CLC; XX.
         DBC : MTOIDB; MTOSDB.
         SPU : NOP.
         MPA : CONTINUE.
         SIG : R; NRDY4.
3AF :    FROM 3AD, 3AE.
         DBS : XX; XX; XX; XX; XX.
         DBC : MTOIDB; MTOSDB.
         SPU : NOP.
         MPA : TO FETCH.
         SIG : R; NRDY4.
3B0 :    ROR - ZERO PAGE, X.
         DBS : XX; XX; XX; XX; XX.
         DBC : MTOSDB; MTOIDB.
         SPU : NOP.
         MPA : CONTINUE.
         SIG : R; NRDY4.
3B1 :    FROM 3B0.
         DBS : XX; XX; XX; XX; XX.
         DBC : MTOSDB; MTOIDB.
         SPU : NOP.
         MPA : IF CO TO 3B3.
         SIG : R; NRDY4.
3B2 :    FROM 3B1, 3B4.
         DBS : 7E, ROR; 7E, ROR; 7E, ROR; 7E, ROR; XX.
         DBC : MTOSDB; MTOIDB.
         SPU : NOP.
         MPA : TO 2B0.
         SIG : R; NRDY4.
3B3 :    FROM 3B1.
         DBS : 18, CLC; EA, NOP; EA, NOP; 38, SEC; XX.
         DBC : MTOSDB; MTOIDB.
         SPU : NOP.
         MPA : CONTINUE.
         SIG : R; NRDY4.
3B4 :    FROM 3B3.
         DBS : XX; XX; XX; XX; XX.
         DBC : MTOSDB; MTOIDB.
         SPU : NOP.
         MPA : TO 3B2.
         SIG : R; NRDY4.
3C0 :    SEI.
         DBS : XX; XX; XX; XX; XX.
         DBC : DLTOIDB; IDBTOSDB.
         SPU : NOP.
         MPA : TO FETCH.
         SIG : R.
3C8 :    ADC - ABSOLUTE, Y.
         DBS : XX; XX; XX; XX; XX.
         DBC : DLTOIDB; IDBTOSDB.
         SPU : NOP.
         MPA : IF RDY TO 3C9.
         SIG : R.
3C9 :    FROM 3C8.
         DBS : XX; XX; XX; XX; XX.
         DBC : DLTOIDB; IDBTOSDB.
         SPU : NOP.
         MPA : IF RDA TO 3BB.
         SIG : R.
3CC :    FROM 311.
         DBS : XX; 01; 01; XX; XX.
         DBC : MTOIDB; MTOSDB.
         SPU : NOP.
         MPA : CONTINUE.
         SIG : R; NRDY4.
3CD :    FROM 3CC.
         DBS : 08, PHP; 08, PHP; 08, PHP; 08, PHP; XX.
         DBC : MTOSDB; MTOIDB.
```

```
           SPU : NOP.                                SPU : NOP.
           MPA : CONTINUE.                           MPA : TO 3F2.
           SIG : R; NRDY4.                           SIG : R; NRDY4.
    3CE :    FROM 3CD.                        408 :    STA - (INDIRECT, X).
           DBS : XX; XX; XX; XX; XX.                 DBS : XX; XX; XX; XX; XX.
           DBC : DLTOIDB; IDBTOSDB.                  DBC : DLTOIDB; IDBTOSDB.
           SPU : NOP.                                SPU : NOP.
           MPA : CONTINUE.                           MPA : IF RDY TO 409.
           SIG : R; NRDY4.                           SIG : R.
    3CF :    FROM 3CE.                        409 :    FROM 408.
           DBS : XX; XX; XX; XX; XX.                 DBS : XX; XX; XX; XX; XX.
           DBC : MTOSDB.                             DBC : DLTOIDB; IDBTOSDB.
           SPU : NOP.                                SPU : NOP.
           MPA : TO 338-33F ON C3, C2, C1.           MPA : CONTINUE.
           SIG : R; NRDY4.                           SIG : R.
    3E8 :    ADC - ABSOLUTE, X.               40A :    FROM 409.
           DBS : XX; XX; XX; XX; XX.                 DBS : XX; XX; XX; XX; XX.
           DBC : DLTOIDB; IDBTOSDB.                  DBC : DLTOIDB; IDBTOSDB.
           SPU : NOP.                                SPU : NOP.
           MPA : IF RDY TO 3C9.                      MPA : IF RDY TO 40B.
           SIG : R.                                  SIG : R.
    3F0 :    ROR - ABSOLUTE, X.               40B :    FROM 40A.
           DBS : XX; XX; XX; XX; XX.                 DBS : XX; XX; XX; XX; XX.
           DBC : MTOSDB; MTOIDB.                     DBC : DLTOIDB; IDBTOSDB.
           SPU : NOP.                                SPU : NOP.
           MPA : CONTINUE.                           MPA : IF RDY TO 40C.
           SIG : R; NRDY4.                           SIG : R.
    3F1 :    FROM 3F0.                        40C :    FROM 40B.
           DBS : XX; XX; XX; XX; XX.                 DBS : XX; XX; XX; XX; XX.
           DBC : MTOSDB; MTOIDB.                     DBC : IDBTODB.
           SPU : NOP.                                SPU : NOP.
           MPA : IF CO TO 3F3.                       MPA : TO FETCH.
           SIG : R; NRDY4.                           SIG : V4.
    3F2 :    FROM 3F1, 3F4.                   420 :    STY - ZERO PAGE.
           DBS : 7E, ROR; 7E, ROR; 7E, ROR; 7E, ROR; XX.
                                                     DBS : XX; XX; XX; XX; XX.
           DBC : MTOIDB; MTOSDB.                     DBC : DLTOIDB; IDBTOSDB.
           SPU : NOP.                                SPU : NOP.
           MPA : TO 2F0.                             MPA : IF RDY TO 421.
           SIG : R; NRDY4.                           SIG : R.
    3F3 :    FROM 3F1.                        421 :    FROM 420.
           DBS : 18, CLC; EA, NOP; EA, NOP; 38, SEC; XX.
                                                     DBS : XX; XX; XX; XX; XX.
           DBC : MTOSDB; MTOIDB.                     DBC : IDBTODB.
           SPU : NOP.                                SPU : NOP.
           MPA : CONTINUE.                           MPA : TO FETCH.
           SIG : R; NRDY4.                           SIG : V4.
    3F4 :    FROM 3F3.                        428 :    STA - ZERO PAGE.
           DBS : XX; XX; XX; XX; XX.                 DBS : XX; XX; XX; XX; XX.
           DBC : MTOSDB; MTOIDB.                     DBC : DLTOIDB; IDBTOSDB.
```

```
            SPU : NOP.
            MPA : IF RDY TO 40C.
            SIG : R.
430 :       STX - ZERO PAGE.
            DBS : XX; XX; XX; XX; XX.
            DBC : DLTOIDB; IDBTOSDB.
            SPU : NOP.
            MPA : IF RDY TO 431.
            SIG : R.
431 :       FROM 430.
            DBS : XX; XX; XX; XX; XX.
            DBC : IDBTODB.
            SPU : NOP.
            MPA : TO FETCH.
            SIG : V4.
440 :       DEY.
            DBS : XX; XX; XX; XX; XX.
            DBC : MTOSDB; MTOIDB.
            SPU : NOP.
            MPA : CONTINUE.
            SIG : R.
441 :       FROM 440.
            DBS : 0B, PHP; C8, INY; C8, INY; C8, INY; XX.
            DBC : MTOSDB; MTOIDB.
            SPU : NOP.
            MPA : CONTINUE.
            SIG : R; NRDY4.
442 :       FROM 441.
            DBS : XX; XX; XX; XX; XX.
            DBC : MTOSDB; MTOIDB.
            SPU : NOP.
            MPA : CONTINUE.
            SIG : R; NRDY4.
443 :       FROM 442.
            DBS : XX; XX; XX; XX; XX.
            DBC : NOP.
            SPU : NOP.
            MPA : TO 445 ON NO.
            SIG : R; NRDY4; NRDY3-0.
444 :       FROM 443.
            DBS : XX; XX; XX; C0, CPY; XX.
            DBC : MTOSDB; MTOIDB.
            SPU : NOP.
            MPA : TO 446.
            SIG : R; NRDY4; NRDY2-0.
445 :       FROM 443.
            DBS : XX; XX; XX; C0, CPY; XX.
            DBC : MTOSDB; MTOIDB.
            SPU : NOP.
            MPA : TO 447.
            SIG : R; NRDY4; NRDY2-0.
446 :       FROM 444.
            DBS : XX; XX; XX; 00; XX.
            DBC : MTOSDB; MTOIDB.
            SPU : NOP.
            MPA : TO FETCH.
            SIG : R; NRDY4; NRDY2-0.
447 :       FROM 445.
            DBS : XX; XX; XX; 01; XX.
            DBC : MTOSDB; MTOIDB.
            SPU : NOP.
            MPA : TO FETCH.
            SIG : R; NRDY4; NRDY2-0.
450 :       TXA.
            DBS : XX; XX; XX; XX; XX.
            DBC : DLTOIDB; IDBTOSDB.
            SPU : NOP.
            MPA : TO FETCH.
            SIG : R.
460 :       STY-ABSOLUTE.
            DBS : XX; XX; XX; XX; XX.
            DBC : DLTOIDB; IDBTOSDB.
            SPU : NOP.
            MPA : IF RDY TO 461.
            SIG : R.
461 :       FROM 460.
            DBS : XX; XX; XX; XX; XX.
            DBC : DLTOIDB; IDBTOSDB.
            SPU : NOP.
            MPA : IF RDY TO 462.
            SIG : R.
462 :       FROM 461.
            DBS : XX; XX; XX; XX; XX.
            DBC : IDBTODB.
            SPU : NOP.
            MPA : TO FETCH.
            SIG : V4.
468 :       STA - ABSOLUTE.
            DBS : XX; XX; XX; XX; XX.
            DBC : DLTOIDB; IDBTOSDB.
            SPU : NOP.
            MPA : IF RDY TO 428.
            SIG : R.
470 :       STX - ABSOLUTE.
            DBS : XX; XX; XX; XX; XX.
            DBC : DLTOIDB; IDBTOSDB.
```

```
            SPU : NOP.                              SPU : NOP.
            NPA : IF RDY TO 471.                    NPA : TO 486.
            SIG : R.                                SIG : R; NRDY3-0.
    471 :     FROM 470.                   486 :      FROM 485.
            DBS : XX; XX; XX; XX; XX.               DBS : XX; XX; XX; XX; XX.
            DBC : DLTOIDB; IDBTOSDB.                DBC : DLTOIDB; IDBTOSDB.
            SPU : NOP.                              SPU : NOP.
            NPA : IF RDY TO 472.                    NPA : TO FETCH.
            SIG : R.                                SIG : R; NRDY3-0.
    472 :     FROM 471.                   488 :     STA - (INDIRECT), Y.
            DBS : XX; XX; XX; XX; XX.               DBS : XX; XX; XX; XX; XX.
            DBC : IDBTODB.                          DBC : DLTOIDB; IDBTOSDB.
            SPU : NOP.                              SPU : NOP.
            NPA : TO FETCH.                         NPA : IF RDY TO 489.
            SIG : V4.                               SIG : R.
    480 :   BCC.                          489 :      FROM 488.
            DBS : XX; XX; XX; XX; XX.               DBS : XX; XX; XX; XX; XX.
            DBC : NTODB; NTOIDB.                    DBC : DLTOIDB; IDBTOSDB.
            SPU : NOP.                              SPU : NOP.
            NPA : CONTINUE.                         NPA : IF RDY TO 48A.
            SIG : R; NRDY4.                         SIG : R.
    481 :     FROM 480.                   48A :     FROM 489.
            DBS : XX; XX; XX; XX; XX.               DBS : XX; XX; XX; XX; XX.
            DBC : NOP.                              DBC : DLTOIDB; IDBTOSDB.
            SPU : NOP.                              SPU : NOP.
            NPA : IF CO-TO 485.                     NPA : IF RDY TO 48B.
            SIG : R; NRDY4.                         SIG : R.
    482 :     FROM 481.                   48B :     FROM 48A.
            DBS : XX; XX; XX; XX; XX.               DBS : XX; XX; XX; XX; XX.
            DBC : DLTOIDB; IDBTOSDB.                DBC : DLTOIDB; IDBTOSDB.
            SPU : NOP.                              SPU : NOP.
            NPA : IF RDY TO 483.                    NPA : TO 40C.
            SIG : R; NRDY3-0.                       SIG : R.
    483 :     FROM 482.                   4A0 :     STY - ZERO PAGE, X.
            DBS : XX; XX; XX; XX; XX.               DBS : XX; XX; XX; XX; XX.
            DBC : NTOSDB; NTOIDB.                   DBC : DLTOIDB; IDBTOSDB.
            SPU : NOP.                              SPU : NOP.
            NPA : TO 484.                           NPA : IF RDY TO 4A1.
            SIG : R; NRDY3-0.                       SIG : R.
    484 :     FROM 483.                   4A1 :     FROM 4A0.
            DBS : XX; XX; XX; XX; XX.               DBS : XX; XX; XX; XX; XX.
            DBC : NTOSDB; NTOIDB.                   DBC : DLTOIDB; IDBTOSDB.
            SPU : NOP.                              SPU : NOP.
            NPA : TO FETCH.                         NPA : CONTINUE.
            SIG : R; NRDY3-0; NRDY4 IF SYNC4.       SIG : R.
    485 :     FROM 481.                   4A2 :     FROM 4A1.
            DBS : XX; XX; XX; XX; 00.               DBS : XX; XX; XX; XX; XX.
            DBC : NTOSDB; NTOIDB.                   DBC : IDBTODB.
```

```
            SPU : NOP.
            MPA : TO FETCH.
            SIG : V4.
4A8 :       STA = ZERO PAGE, X.
            DBS : XX; XX; XX; XX; XX.
            DBC : DLTOIDB; IDBTOSDB.
            SPU : NOP.
            MPA : IF RDY TO 4A1.
            SIG : R.
4B0 :       STX - ZERO PAGE, X.
            DBS : XX; XX; XX; XX; XX.
            DBC : DLTOIDB; IDBTOSDB.
            SPU : NOP.
            MPA : IF RDY TO 4A1.
            SIG : R.
4C0 :       TYA.
            DBS : XX; XX; XX; XX; XX.
            DBC : DLTOIDB; IDBTOSDB.
            SPU : NOP.
            MPA : TO FETCH.
            SIG : R.
4C8 :       STA - ABSOLUTE, Y.
            DBS : XX; XX; XX; XX; XX.
            DBC : DLTOIDB; IDBTOSDB.
            SPU : NOP.
            MPA : IF RDY TO 4A8.
            SIG : R.
4D0 :       TXS.
            DBS : XX; XX; XX; XX; XX.
            DBC : MTOSDB; MTOIDB.
            SPU : NOP.
            MPA : CONTINUE.
            SIG : R.
4D1 :       FROM 4D0.
            DBS : XX; XX; XX; XX; XX.
            DBC : IDBTOSDB; SDBTOSPU.
            SPU : LSP.
            MPA : TO FETCH.
            SIG : R; NRDY4.
4E8 :       STA - ABSOLUTE, X.
            DBS : XX; XX; XX; XX; XX.
            DBC : DLTOIDB; IDBTOSDB.
            SPU : NOP.
            MPA : IF RDY TO 4A8.
            SIG : R.
500 :       LDY - IMMEDIATE.
            DBS : XX; XX; XX; XX; XX.
            DBC : DLTOIDB; IDBTOSDB.
            SPU : NOP.
            MPA : IF RDY TO 501.
            SIG : R.
501 :       FROM 500.
            DBS : XX; XX; XX; XX; 90, BCC.
            DBC : DLTOIDB; MTOSDB.
            SPU : NOP.
            MPA : CONTINUE.
            SIG : R; NRDY3-0.
502 :       FROM 501.
            DBS : XX; XX; XX; XX; 01.
            DBC : DLTOIDB; MTOSDB.
            SPU : NOP.
            MPA : CONTINUE.
            SIG : R; NRDY3-0.
503 :       FROM 502.
            DBS : XX; XX; XX; XX; XX.
            DBC : DLTOIDB; IDBTOSDB.
            SPU : NOP.
            MPA : CONTINUE.
            SIG : R; NRDY3-0.
504 :       FROM 503.
            DBS : XX; XX; XX; XX; XX.
            DBC : DLTOIDB; IDBTOSDB.
            SPU : NOP.
            MPA : TO FETCH.
            SIG : R; NRDY3-0; NRDY4 IF SYNC4.
508 :       LDA - (INDIRECT, X).
            DBS : XX; XX; XX; XX; XX.
            DBC : DLTOIDB; IDBTOSDB.
            SPU : NOP.
            MPA : IF RDY TO 009.
            SIG : R.
510 :       LDX - IMMEDIATE.
            DBS : XX; XX; XX; XX; XX.
            DBC : DLTOIDB; IDBTOSDB.
            SPU : NOP.
            MPA : IF RDY TO 501.
            SIG : R.
520 :       LDY - ZERO PAGE.
            DBS : XX; XX; XX; XX; XX.
            DBC : DLTOIDB; IDBTOSDB.
            SPU : NOP.
            MPA : IF RDY TO 521.
            SIG : R.
521 :       FROM 520.
            DBS : XX; XX; XX; XX; XX.
            DBC : DLTOIDB; IDBTOSDB.
```

```
        SPU : NOP.
        MPA : IF RDY TO FETCH.
        SIG : R.
528 :   LDA - ZERO PAGE.
        DBS : XX; XX; XX; XX; XX.
        DBC : DLTOIDB; IDBTOSDB.
        SPU : NOP.
        MPA : IF RDY TO 029.
        SIG : R.
530 :   LDX - ZERO PAGE.
        DBS : XX; XX; XX; XX; XX.
        DBC : DLTOIDB; IDBTOSDB.
        SPU : NOP.
        MPA : IF RDY TO 521.
        SIG : R.
540 :   TAY.
        DBS : XX; XX; XX; XX; XX.
        DBC : DLTOIDB; IDBTOSDB.
        SPU : NOP.
        MPA : CONTINUE.
        SIG : R.
541 :   FROM 540.
        DBS : XX; XX; XX; XX; XX.
        DBC : IDBTOSDB.
        SPU : NOP.
        MPA : CONTINUE.
        SIG : R.
542 :   FROM 541.
        DBS : A8, TAY; A8, TAY; A8, TAY; A8, TAY; 90, BCC.
        DBC : MTOIDB; MTOSDB.
        SPU : NOP.
        MPA : CONTINUE.
        SIG : R.
543 :   FROM 542.
        DBS : XX; XX; XX; XX; FD, -3.
        DBC : MTOIDB; MTOSDB.
        SPU : NOP.
        MPA : CONTINUE.
        SIG : R.
544 :   FROM 543.
        DBS : EA, NOP; EA, NOP; EA, NOP; EA, NOP; XX.
        DBC : MTOSDB; MTOIDB.
        SPU : NOP.
        MPA : CONTINUE.
        SIG : R.
545 :   FROM 544.
        DBS : XX; XX; XX; XX; XX.
        DBC : MTOSDB; MTOIDB.
        SPU : NOP.
        MPA : TO FETCH.
        SIG : R; NRDY4 IF SYNC4.
548 :   LDA - IMMEDIATE.
        DBS : XX; XX; XX; XX; 03, +3.
        DBC : DLTOIDB; MTOSDB.
        SPU : NOP.
        MPA : IF RDY TO 049.
        SIG : R.
550 :   TAX.
        DBS : XX; XX; XX; XX; XX.
        DBC : DLTOIDB; IDBTOSDB.
        SPU : NOP.
        MPA : CONTINUE.
        SIG : R.
551 :   FROM 550.
        DBS : XX; XX; XX; XX; XX.
        DBC : IDBTOSDB.
        SPU : NOP.
        MPA : CONTINUE.
        SIG : R.
552 :   FROM 551.
        DBS : AA, TAX; AA, TAX; AA, TAX; AA, TAX; 90, BCC.
        DBC : MTOIDB; MTOSDB.
        SPU : NOP.
        MPA : TO 543.
        SIG : R.
560 :   LDY - ABSOLUTE.
        DBS : XX; XX; XX; XX; XX.
        DBC : DLTOIDB; IDBTOSDB.
        SPU : NOP.
        MPA : IF RDY TO 520.
        SIG : R.
568 :   LDA - ABSOLUTE.
        DBS : XX; XX; XX; XX; XX.
        DBC : DLTOIDB; IDBTOSDB.
        SPU : NOP.
        MPA : IF RDY TO 028.
        SIG : R.
570 :   LDX - ABSOLUTE.
        DBS : XX; XX; XX; XX; XX.
        DBC : DLTOIDB; IDBTOSDB.
        SPU : NOP.
        MPA : IF RDY TO 530.
        SIG : R.
580 :   BCS.
        DBS : XX; XX; XX; XX; XX.
        DBC : MTOSDB; MTOIDB.
```

```
            SPU : NOP.                              SPU : NOP.
            MPA : CONTINUE.                         MPA : TO FETCH.
            SIG : R; NRDY4.                         SIG : R.
    581 :   FROM 580.                       5 5C8 : LDA - ABSOLUTE, Y.
            DBS : XX; XX; XX; XX; XX.               DBS : XX; XX; XX; XX; XX.
            DBC : NOP.                              DBC : DLTOIDB; IDBTOSDB.
            SPU : NOP.                       10     SPU : NOP.
            MPA : IF CO TO 482.                     MPA : IF RDY TO OC9.
            SIG : R; NRDY4.                         SIG : R.
    582 :   FROM 581.                          5D0 : TSX.
            DBS : XX; XX; XX; XX; 00.       15      DBS : XX; XX; XX; XX; XX.
            DBC : MTOSDB; MTOIDB.                   DBC : LABTOIDB; IDBTOSDB.
            SPU : NOP.                              SPU : SSP.
            MPA : TO 486.                    20     MPA : CONTINUE.
            SIG : R; NRDY3-0.                       SIG : R.
    588 :   LDA - (INDIRECT), Y.                5D1 : FROM 5D0.
            DBS : XX; XX; XX; XX; XX.               DBS : 08, PHP; A2, LDX; A2, LDX; A2, LDX; 90, BCC.
            DBC : DLTOIDB; IDBTOSDB.        25      DBC : MTOIDB; MTOSDB.
            SPU : NOP.                              SPU : NOP.
            MPA : IF RDY TO 089.                    MPA : CONTINUE.
            SIG : R.                         30     SIG : R.
    5A0 :   LDY - ZERO PAGE, X.                 5D2 : FROM 5D1.
            DBS : XX; XX; XX; XX; XX.               DBS : XX; 00; 00; 00; FD, -3.
            DBC : DLTOIDB; IDBTOSDB.                DBC : DLTOIDB; IDBTOSDB.
            SPU : NOP.                       35     SPU : NOP.
            MPA : IF RDY TO 5A1.                    MPA : CONTINUE.
            SIG : R.                                SIG : R.
    5A1 :   FROM 5A0.                       40 5D3 : FROM 5D2.
            DBS : XX; XX; XX; XX; XX.               DBS : XX; XX; XX; XX; XX.
            DBC : DLTOIDB; IDBTOSDB.                DBC : NOP.
            SPU : NOP.                              SPU : NOP.
            MPA : TO 521.                    45     MPA : TO 5D5 ON NO.
            SIG : R.                                SIG : R; NRDY4; NRDY3-0.
    5A8 :   LDA - ZERO PAGE, X.                 5D4 : FROM 5D3.
            DBS : XX; XX; XX; XX; XX.       50      DBS : XX; XX; XX; XX; XX.
            DBC : DLTOIDB; IDBTOSDB.                DBC : MTOIDB; MTOSDB.
            SPU : NOP.                              SPU : NOP.
            MPA : IF RDY TO OA9.                    MPA : TO FETCH.
            SIG : R.                         55     SIG : R; NRDY3-0; NRDY4 IF SYNC4.
    5B0 :   LDX - ZERO PAGE, Y.                 5D5 : FROM 5D3.
            DBS : XX; XX; XX; XX; XX.               DBS : EA, NOP; EA, NOP; EA, NOP; E0, CPX; XX.
            DBC : DLTOIDB; IDBTOSDB.         60     DBC : MTOSDB; MTOIDB.
            SPU : NOP.                              SPU : NOP.
            MPA : IF RDY TO 5A1.                    MPA : CONTINUE.
            SIG : R.                                SIG : R; NRDY4 IF SYNC4.
    5C0 :   CLV.                            65 5D6 : FROM 5D5.
            DBS : XX; XX; XX; XX; XX.               DBS : XX; XX; XX; 01; XX.
            DBC : DLTOIDB; IDBTOSDB.                DBC : MTOSDB; MTOIDB.
```

```
        SPU : NOP.                                    SPU : NOP.
        MPA : TO FETCH.                               MPA : CONTINUE.
        SIG : R: NRDY4.                               SIG : R: NRDY4.
5E0 :   LDY - ABSOLUTE. X.                    602 :   FROM 601.
        DBS : XX; XX; XX; XX; XX.                     DBS : XX; 00; 00; 00; XX.
        DBC : DLTOIDB; IDBTOSDB.                      DBC : MTOIDB; MTOSDB.
        SPU : NOP.                                    SPU : NOP.
        MPA : IF RDY TO 5E1.                          MPA : CONTINUE.
        SIG : R.                                      SIG : R: NRDY4.
5E1 :   FROM 5E0.                             603 :   FROM 602.
        DBS : XX; XX; XX; XX; XX.                     DBS : XX; XX; XX; XX; XX.
        DBC : DLTOIDB; IDBTOSDB.                      DBC : NOP.
        SPU : NOP.                                    SPU : NOP.
        MPA : IF RDY TO 5E2.                          MPA : TO 605 ON NO.
        SIG : R.                                      SIG : R: NRDY3-0; NRDY4.
5E2 :   FROM 5E1.                             604 :   FROM 603.
        DBS : XX; XX; XX; XX; XX.                     DBS : EA. NOP; 18. CLC; 18. CLC; 18. CLC; XX.
        DBC : DLTOIDB; MTOSDB.                        DBC : MTOIDB; MTOSDB.
        SPU : NOP.                                    SPU : NOP.
        MPA : IF RDY TO 5E3.                          MPA : TO 606.
        SIG : R: NRDY3-0.                             SIG : R: NRDY4.
5E3 :   FROM 5E2.                             605 :   FROM 603.
        DBS : XX; XX; XX; XX; XX.                     DBS : EA. NOP; 18. CLC; 18. CLC; C0. CPY; XX.
        DBC : DLTOIDB; MTOSDB.                        DBC : MTOSDB; MTOIDB.
        SPU : NOP.                                    SPU : NOP.
        MPA : IF RDY TO FETCH.                        MPA : CONTINUE.
        SIG : R: NRDY4 IF SYNC4; KPDB IF SYNC4.       SIG : R: NRDY4.
5E8 :   LDA - ABSOLUTE. X.                    606 :   FROM 605.
        DBS : XX; XX; XX; XX; XX.                     DBS : XX; XX; XX; 80; XX.
        DBC : DLTOIDB; IDBTOSDB.                      DBC : MTOSDB; MTOIDB.
        SPU : NOP.                                    SPU : NOP.
        MPA : IF RDY TO 0C9.                          MPA : TO FETCH.
        SIG : R.                                      SIG : R: NRDY4.
5F0 :   LDX - ABSOLUTE. Y.                    608 :   CMP - (INDIRECT. X).
        DBS : XX; XX; XX; XX; XX.                     DBS : XX; XX; XX; XX; XX.
        DBC : DLTOIDB; IDBTOSDB.                      DBC : DLTOIDB; IDBTOSDB.
        SPU : NOP.                                    SPU : NOP.
        MPA : IF RDY TO 5E1.                          MPA : IF RDY TO 609.
        SIG : R.                                      SIG : R.
600 :   CPY - IMMEDIATE.                      609 :   FROM 608.
        DBS : XX; XX; XX; XX; 00.                     DBS : XX; XX; XX; XX; XX.
        DBC : MTOSDB; DLTOIDB.                        DBC : DLTOIDB; IDBTOSDB.
        SPU : NOP.                                    SPU : NOP.
        MPA : IF RDY TO 601.                          MPA : CONTINUE.
        SIG : R.                                      SIG : R.
601 :   FROM 600.                             60A :   FROM 609.
        DBS : 0B. PHP; C0. CPY; C0. CPY; C0. CPY; XX. DBS : XX; XX; XX; XX; XX.
        DBC : MTOIDB; MTOSDB.                         DBC : DLTOIDB; IDBTOSDB.
```

```
        SPU : NOP.
        MPA : IF RDY TO 60B.
        SIG : R.
60B :   FROM 60A.
        DBS : XX; XX; XX; XX; XX.
        DBC : DLTOIDB; IDBTOSDB.
        SPU : NOP.
        MPA : IF RDY TO 629.
        SIG : R.
610 :   N2. N1. NO = 000.
        DBS : XX; XX; XX; XX; XX.
        DBC : DLTOIDB; IDBTODB. DE1. NOP. NOP. NOP.
        SPU : NOP.
        MPA : TO 61D.
        SIG : V4; NRDY4; KPDB.
611 :   N2. N1. NO = 001.
        DBS : XX; XX; XX; XX; XX.
        DBC : DLTOIDB; IDBTODB. DE1. DE1. NOP. NOP.
        SPU : NOP.
        MPA : TO 61D.
        SIG : V4; NRDY4; KPDB.
612 :   N2. N1. NO = 010.
        DBS : XX; XX; XX; XX; XX.
        DBC : DLTOIDB; IDBTODB. DE1. NOP. NOP. NOP.
        SPU : NOP.
        MPA : TO 61D.
        SIG : V4; NRDY4; KPDB.
613 :   N2. N1. NO = 011.
        DBS : XX; XX; XX; XX; XX.
        DBC : DLTOIDB; IDBTODB. DE1. DE1. DE1. NOP.
        SPU : NOP.
        MPA : TO 61D.
        SIG : V4; NRDY4; KPDB.
614 :   N2. N1. NO = 100.
        DBS : XX; XX; XX; XX; XX.
        DBC : DLTOIDB; IDBTODB. DE1. NOP. NOP. NOP.
        SPU : NOP.
        MPA : TO 61D.
        SIG : V4; NRDY4; KPDB.
615 :   N2. N1. NO = 101.
        DBS : XX; XX; XX; XX; XX.
        DBC : DLTOIDB; IDBTODB. DE1. DE1. NOP. NOP.
        SPU : NOP.
        MPA : TO 61D.
        SIG : V4; NRDY4; KPDB.
616 :   N2. N1. NO = 110.
        DBS : XX; XX; XX; XX; XX.
        DBC : DLTOIDB; IDBTODB. DE1. NOP. NOP. NOP.
        SPU : NOP.
        MPA : TO 61D.
        SIG : V4; NRDY4; KPDB.
617 :   N2. N1. NO = 111.
        DBS : XX; XX; XX; XX; XX.
        DBC : DLTOIDB; IDBTODB. DE1. DE1. DE1. DE1.
        SPU : NOP.
        MPA : TO 61D.
        SIG : V4; NRDY4; KPDB.
618 :   FROM 635.
        DBS : E6. INC; E6. INC; E6. INC; E6. INC; XX.
        DBC : MTOSDB; MTOIDB.
        SPU : NOP.
        MPA : TO 678-67F ON N2. N1. NO.
        SIG : R; NRDY4; KPDB.
61C :   FROM 634.
        DBS : E6. INC; E6. INC; E6. INC; E6. INC; XX.
        DBC : MTOIDB; MTOSDB.
        SPU : NOP.
        MPA : TO 611 ON NO.
        SIG : R; NRDY4; KPDB.
61D :   FROM 610-617.
        DBS : XX; XX; XX; XX; XX.
        DBC : DLTOIDB; IDBTOSDB.
        SPU : NOP.
        MPA : IF RDY TO 61E.
        SIG : R.
61E :   FROM 61D.
        DBS : XX; XX; XX; XX; XX.
        DBC : NOP.
        SPU : NOP.
        MPA : CONTINUE.
        SIG : R.
61F :   FROM 61E.
        DBS : XX; XX; XX; XX; XX.
        DBC : IDBTODB.
        SPU : NOP.
        MPA : TO FETCH.
        SIG : V4.
620 :   CPY - ZERO PAGE.
        DBS : XX; XX; XX; XX; XX.
        DBC : DLTOIDB; IDBTOSDB.
        SPU : NOP.
        MPA : IF RDY TO 60C.
        SIG : R.
628 :   CMP - ZERO PAGE.
        DBS : XX; XX; XX; XX; XX.
        DBC : DLTOIDB; IDBTOSDB.
```

```
        SPU : NOP.                                        SPU : NOP.
        MPA : IF RDY TO 629.                              MPA : IF RDY TO 631.
        SIG : R.                                          SIG : R.
629 :      FROM 628.                            631 :      FROM 630.
        DBS : XX; XX; XX; XX; 00.                         DBS : XX; XX; XX; XX; XX.
        DBC : MTOSDB; DLTOIDB.                            DBC : DLTOIDB; IDBTOSDB.
        SPU : NOP.                                        SPU : NOP.
        MPA : IF RDY TO 62A.                              MPA : TO 638-63F ON N2, N1, N0.
        SIG : R; NRDY4.                                   SIG : R; NRDY4.
62A :      FROM 629.                            632 :      FROM 636.
        DBS : 08, PHP; 08, PHP; 08, PHP; 08, PHP; XX.     DBS : XX; XX; XX; XX; XX.
        DBC : MTOSDB; MTOIDB.                             DBC : NOP.
        SPU : NOP.                                        SPU : NOP.
        MPA : CONTINUE.                                   MPA : TO 636.
        SIG : R; NRDY4.                                   SIG : R; NRDY4; KPDB.
62B :      FROM 62A.                            633 :      FROM 639.
        DBS : XX; XX; XX; XX; XX.                         DBS : XX; XX; XX; XX; XX.
        DBC : MTOSDB; MTOIDB.                             DBC : NOP.
        SPU : NOP.                                        SPU : NOP.
        MPA : CONTINUE.                                   MPA : TO 637.
        SIG : R; NRDY4.                                   SIG : R; NRDY4; KPDB.
62C :      FROM 62B.                            634 :      FROM 63A.
        DBS : XX; XX; XX; XX; XX.                         DBS : XX; XX; XX; XX; XX.
        DBC : MTOSDB.                                     DBC : NOP
        SPU : NOP.                                        SPU : NOP.
        MPA : IF BF2 TO 66A.                              MPA : TO 61C.
        SIG : R; NRDY4; KPAL.                             SIG : R; NRDY4; KPDB.
62D :      FROM 62C.                            635 :      FROM 63C.
        DBS : XX; XX; XX; XX; XX;XX.                      DBS : XX; XX; XX; XX; XX.
        DBC : MTOSDB; MTOIDB.                             DBC : NOP.
        SPU : NOP.                                        SPU : NOP.
        MPA : IF BF1 TO 669.                              MPA : TO 618.
        SIG : R; NRDY4; NRDY3-0; KPAL.                    SIG : R; NRDY4; KPDB.
62E :      FROM 62D.                            636 :      FROM 632.
        DBS : 18, CLC; 18, CLC; 18, CLC; 18, CLC; XX.     DBS : E6, INC; E6, INC; E6, INC; E6, INC; XX.
        DBC : MTOSDB; MTOIDB.                             DBC : MTOIDB; MTOSDB.
        SPU : NOP.                                        SPU : NOP.
        MPA : CONTINUE.                                   MPA : TO 610-617 ON N2, N1, N0.
        SIG : R; NRDY4.                                   SIG : R; NRDY4; KPDB.
62F :      FROM 62E.                            637 :      FROM 633.
        DBS : XX; XX; XX; XX; XX; XX.                     DBS : E6, INC; E6, INC; E6, INC; E6, INC; XX.
        DBC : MTOSDB; MTOIDB.                             DBC : MTOIDB; MTOSDB.
        SPU : NOP.                                        SPU : NOP.
        MPA : TO FETCH.                                   MPA : TO 610.
        SIG : R; NRDY4.                                   SIG : R; NRDY4; KPDB.
630 :      DEC - ZERO PAGE.                     638 :      N2, N1, N0 = 000.
        DBS : XX; XX; XX; XX; XX.                         DBS : XX; XX; XX; XX; XX.
        DBC : DLTOIDB; IDBTOSDB.                          DBC : NOP.
```

```
        SPU : NOP.
        MPA : TO 632.
        SIG : R; NRDY4; KPDB.
639 :       N2, N1, N0 = 001.
        DBS : XX; XX; XX; XX; XX.
        DBC : NOP.
        SPU : NOP.
        MPA : TO 633.
        SIG : R; NRDY4; KPDB.
63A :       N2, N1, N0 = 010.
        DBS : XX; XX; XX; XX; XX.
        DBC : NOP.
        SPU : NOP.
        MPA : TO 634.
        SIG : R; NRDY4; KPDB.
63B :       N2, N1, N0 = 011.
        DBS : XX; XX; XX; XX; XX.
        DBC : NOP.
        SPU : NOP.
        MPA : TO 633.
        SIG : R; NRDY4; KPDB.
63C :       N2, N1, N0 = 100.
        DBS : XX; XX; XX; XX; XX.
        DBC : NOP.
        SPU : NOP.
        MPA : TO 635.
        SIG : R; NRDY4; KPDB.
63D :       N2, N1, N0 = 101.
        DBS : XX; XX; XX; XX; XX.
        DBC : NOP.
        SPU : NOP.
        MPA : TO 633.
        SIG : R; NRDY4; KPDB.
63E :       N2, N1, N0 = 110.
        DBS : XX; XX; XX; XX; XX.
        DBC : NOP.
        SPU : NOP.
        MPA : TO 634.
        SIG : R; NRDY4; KPDB.
63F :       N2, N1, N0 = 111.
        DBS : XX; XX; XX; XX; XX.
        DBC : NOP.
        SPU : NOP.
        MPA : TO 633.
        SIG : R; NRDY4; KPDB.
640 :       INY.
        DBS : XX; XX; XX; XX; XX.
        DBC : DLTOIDB; IDBTOSDB.
        SPU : NOP.
        MPA : CONTINUE.
        SIG : R.
641 :       FROM 640.
        DBS : 08, PHP; 88, DEY; 88, DEY; 88, DEY; XX.
        DBC : MTOIDB; MTOSDB.
        SPU : NOP.
        MPA : TO 442.
        SIG : R; NRDY4.
648 :       CMP - IMMEDIATE.
        DBS : XX; XX; XX; XX; FF, -1.
        DBC : DLTOIDB; MTOSDB.
        SPU : NOP.
        MPA : CONTINUE.
        SIG : R.
649 :       FROM 648.
        DBS : 08, PHP; 08, PHP; 08, PHP; 08, PHP; XX.
        DBC : MTOSDB; MTOIDB.
        SPU : NOP.
        MPA : CONTINUE.
        SIG : R.
64A :       FROM 649.
        DBS : XX; XX; XX; XX; XX.
        DBC : MTOIDB; MTOSDB.
        SPU : NOP.
        MPA : CONTINUE.
        SIG : R; NRDY4 IF SYNC4.
64B :       FROM 64A.
        DBS : XX; XX; XX; XX; XX.
        DBC : MTOSDB.
        SPU : NOP.
        MPA : IF BF2 TO 64D.
        SIG : R; NRDY4; KPAL.
64C :       FROM 64B.
        DBS : XX; XX; XX; XX; 90, BCC.
        DBC : MTOSDB; MTOIDB.
        SPU : NOP.
        MPA : TO 658.
        SIG : R; NRDY3-0; KPAL.
64D :       FROM 64C.
        DBS : EA, NOP; EA, NOP; EA, NOP; C9, CMP; XX.
        DBC : MTOSDB; MTOIDB.
        SPU : NOP.
        MPA : CONTINUE.
        SIG : R; NRDY4; KPAL.
64E :       FROM 64D.
        DBS : XX; XX; XX; XX; 90, BCC.
        DBC : MTOSDB; CPA.
```

```
        SPU : NOP.
        MPA : IF RDY TO 658.
        SIG : R; KPAL.
650 :   DEX.
        DBS : XX; XX; XX; XX; XX.
        DBC : DLTOIDB; IDBTOSDB.
        SPU : NOP.
        MPA : CONTINUE.
        SIG : R.
651 :   FROM 650.
        DBS : 08. PHP; E8. INX; E8. INX; E8. INX; XX.
        DBC : MTOIDB; MTOSDB.
        SPU : NOP.
        MPA : TO 742.
        SIG : R; NRDY4.
658 :   FROM 64E. 64C.
        DBS : XX; XX; XX; XX; 02. +2.
        DBC : MTOSDB; MTOIDB.
        SPU : NOP.
        MPA : IF BF1 TO 65A.
        SIG : R; NRDY3-0; KPAL.
659 :   FROM 658.
        DBS : 18. CLC; 18. CLC; 18. CLC; 18. CLC; XX.
        DBC : MTOSDB; MTOIDB.
        SPU
        MPA : TO 65B.
        SIG : R.
65A :   FROM 658.
        DBS : 38. SEC; 18. CLC; 18. CLC; 18. CLC; XX.
        DBC : MTOSDB; MTOIDB.
        SPU : NOP.
        MPA : CONTINUE.
        SIG : R.
65B :   FROM 659. 65A.
        DBS : XX; XX; XX; XX; XX.
        DBC : MTOSDB; MTOIDB.
        SPU : NOP.
        MPA : TO FETCH.
        SIG : R; NRDY4 IF SYNC4.
660 :   CPY - ABSOLUTE.
        DBS : XX; XX; XX; XX; XX.
        DBC : DLTOIDB; IDBTOSDB.
        SPU : NOP.
        MPA : IF RDY TO 620.
        SIG : R.
668 :   CMP - ABSOLUTE.
        DBS : XX; XX; XX; XX; XX.
        DBC : DLTOIDB; IDBTOSDB.
        SPU : NOP.
        MPA : IF RDY TO 628.
        SIG : R.
669 :   FROM 62D.
        DBS : 38. SEC; 18. CLC; 18. CLC; 18. CLC; XX. : NOP.
        DBC : MTOSDB; MTOIDB.
        SPU : NOP.
        MPA : TO 62F.
        SIG : R; NRDY4.
66A :   FROM 62C.
        DBS : EA. NOP; EA. NOP; EA. NOP; C9. CMP; XX.
        DBC : MTOSDB; MTOIDB.
        SPU : NOP.
        MPA : CONTINUE.
        SIG : R; NRDY4; KPAL.
66B :   FROM 66A.
        DBS : XX; XX; XX; XX; XX.
        DBC : CPA.
        SPU : NOP.
        MPA : IF RDY TO 62D.
        SIG : R; NRDY4; KPAL.
670 :   DEC - ABSOLUTE.
        DBS : XX; XX; XX; XX; XX.
        DBC : DLTOIDB; IDBTOSDB.
        SPU : NOP.
        MPA : IF RDY TO 630.
        SIG : R.
678 :   N2. N1. N0 = 000.
        DBS : XX; XX; XX; XX; XX.
        DBC : DLTOIDB; IDBTODB. DE1. NOP. NOP. NOP.
        SPU : NOP.
        MPA : TO 61D.
        SIG : V4; NRDY4; KPDB.
679 :   N2. N1. N0 = 001.
        DBS : XX; XX; XX; XX; XX.
        DBC : DLTOIDB; IDBTODB. DE1. DE1. NOP. NOP.
        SPU : NOP.
        MPA : TO 61D.
        SIG : V4; NRDY4; KPDB.
67A :   N2. N1. N0 = 010.
        DBS : XX; XX; XX; XX; XX.
        DBC : DLTOIDB; IDBTODB. DE1. NOP. NOP. NOP.
        SPU : NOP.
        MPA : TO 61D.
        SIG : V4; NRDY4; KPDB.
67B :   N2. N1. N0 = 011.
        DBS : XX; XX; XX; XX; XX.
```

```
            DBC : DLTOIDB; IDBTODB. DE1. DE1. DE1. NOP.
            SPU : NOP.
            MPA : TO 61D.
            SIG : V4; NRDY4; KPDB.
    67C :       N2. N1. NO = 100.
            DBS : XX; XX; XX; XX; XX.
            DBC : DLTOIDB; IDBTODB. DE1. NOP. NOP. NOP.
            SPU : NOP.
            MPA : TO 61D.
            SIG : V4; NRDY4; KPDB.
    67D :       N2. N1. NO = 101.
            DBS : XX; XX; XX; XX; XX.
            DBC : DLTOIDB; IDBTODB. DE1. DE1. NOP. NOP.
            SPU : NOP.
            MPA : TO 61D.
            SIG : V4; NRDY4; KPDB.
    67E :       N2. N1. NO = 110.
            DBS : XX; XX; XX; XX; XX.
            DBC : DLTOIDB; IDBTODB. DE1. NOP. NOP. NOP.
            SPU : NOP.
            MPA : TO 61D.
            SIG : V4; NRDY4; KPDB.
    67F :      -N2. N1. NO = 111.
            DBS : XX; XX; XX; XX; XX.
            DBC : DLTOIDB; IDBTODB. DE1. DE1. DE1. NOP.
            SPU : NOP.
            MPA : TO 61D.
            SIG : V4; NRDY4; KPDB.
    680 :       BNE.
            DBS : XX; XX; XX; XX; XX.
            DBC : MTOSDB; MTOIDB.
            SPU : NOP.
            MPA : CONTINUE.
            SIG : R; NRDY4.
    681 :       FROM 680.
            DBS : XX; XX; XX; XX; XX.
            DBC : NOP.
            SPU : NOP.
            MPA : IF Z TO 485.
            SIG : R; NRDY4.
    682 :       FROM 681.
            DBS : XX; XX; XX; XX; XX.
            DBC : DLTOIDB; IDBTOSDB.
            SPU : NOP.
            MPA : IF RDY TO 483.
            SIG : R; NRDY3-0.
    688 :       CMP - (INDIRECT), Y.
            DBS : XX; XX; XX; XX; XX.
            DBC : DLTOIDB; IDBTOSDB.
            SPU : NOP.
            MPA : IF RDY TO 689.
            SIG : R.
    689 :       FROM 688.
            DBS : XX; XX;-XX; XX; XX.
            DBC : DLTOIDB; IDBTOSDB.
            SPU : NOP.
            MPA : IF RDA TO 68A.
            SIG : R.
    68A :       FROM 689.
            DBS : XX; XX; XX; XX; XX.
            DBC : DLTOIDB; IDBTOSDB.
            SPU : NOP.
            MPA : IF RDY TO 68B.
            SIG : R; NRDY3-0.
    68B :       FROM 68A.
            DBS : XX; XX; XX; XX; 00.
            DBC : DLTOIDB; IDBTOSDB.
            SPU : NOP.
            MPA : IF RDY TO 629.
            SIG : R; NRDY3-0.
    6A8 :       CMP - ZERO PAGE, X.
            DBS : XX; XX; XX; XX; XX.
            DBC : DLTOIDB; IDBTOSDB.
            SPU : NOP.
            MPA : IF RDY TO 6A9.
            SIG : R.
    6A9 :      .FROM 6A8.
            DBS : XX; XX; XX; XX; XX.
            DBC : DLTOIDB; IDBTOSDB.
            SPU : NOP.
            MPA : TO 629.
            SIG : R.
    6B0 :       DEC - ZERO-PAGE, X.
            DBS : XX; XX; XX; XX; XX.
            DBC : DLTOIDB; IDBTOSDB.
            SPU : NOP.
            MPA : IF RDY TO 6B1.
            SIG : R.
    6B1 :       FROM 6B0.
            DBS : XX; XX; XX; XX; XX.
            DBC : DLTOIDB; IDBTOSDB.
            SPU : NOP.
            MPA : TO 631.
            SIG : R.
    6C0 :       CLD.
            DBS : XX; XX; XX; XX; XX.
```

```
        DBC : DLTOIDB; IDBTOSDB.
        SPU : NOP.
        MPA : TO FETCH.
        SIG : R.
6C8 :   CMP - ABSOLUTE. Y.
        DBS : XX; XX; XX; XX; XX.
        DBC : DLTOIDB; IDBTOSDB.
        SPU : NOP.
        MPA : IF RDY TO 6C9.
        SIG : R.
6C9 :   FROM 6C8.
        DBS : XX; XX; XX; XX; XX.
        DBC : DLTOIDB; IDBTOSDB.
        SPU : NOP.
        MPA : IF RDY TO 6CA.
        SIG : R.
6CA :   FROM 6C9.
        DBS : XX; XX; XX; XX; 00.
        DBC : DLTOIDB; MTOSDB.
        SPU : NOP.
        MPA : IF RDY TO 6CB.
        SIG : R; NRDY3-0.
6CB :   FROM 6CA.
        DBS : XX; XX; XX; XX; 00.
        DBC : DLTOIDB; IDBTOSDB.
        SPU : NOP.
        MPA : IF RDY TO 62A.
        SIG : R; NRDY4 IF SYNC4; KPDB IF SYNC4.
6E8 :   CMP - ABSOLUTE. X.
        DBS : XX; XX; XX; XX; XX.
        DBC : DLTOIDB; IDBTOSDB.
        SPU : NOP.
        MPA : IF RDY TO 6C9.
        SIG : R.
6F0 :   DEC - ABSOLUTE. X.
        DBS : XX; XX; XX; XX; XX.
        DBC : DLTOIDB; IDBTOSDB.
        SPU : NOP.
        MPA : IF RDY TO 6B0.
        SIG : R.
700 :   CPX - IMMEDIATE.
        DBS : XX; XX; XX; XX; 00.
        DBC : MTOSDB; DLTOIDB.
        SPU : NOP.
        MPA : IF RDY TO 701.
        SIG : R.
701 :   FROM 700.
        DBS : 08, PHP; EO, CPX; EO, CPX; EO, CPX; XX.
        DBC : MTOIDB; MTOSDB.
        SPU : NOP.
        MPA : CONTINUE.
        SIG : R; RNDY4.
702 :   FROM 701.
        DBS : XX; 00; 00; 00; XX.
        DBC : MTOIDB; MTOSDB.
        SPU : NOP.
        MPA : CONTINUE.
        SIG : R; NRDY4.
703 :   FROM 702.
        DBS : XX; XX; XX; XX; XX.
        DBC : NOP.
        SPU : NOP.
        MPA : TO 707 ON NO.
        SIG : R; NRDY3-0; NRDY4.
704 :   FROM 706.
        DBS : XX; XX; XX; XX; XX.
        DBC : MTOIDB; MTOSDB.
        SPU : NOP.
        MPA : TO FETCH.
        SIG : R; NRDY4.
705 :   FROM 707.
        DBS : XX; XX; XX; 80; XX.
        DBC : MTOIDB; MTOSDB.
        SPU : NOP.
        MPA : TO FETCH.
        SIG : R; NRDY4.
706 :   FROM 703.
        DBS : EA, NOP; 18, CLC; 18, CLC; 18, CLC; XX.
        DBC : MTOIDB; MTOSDB.
        SPU : NOP.
        MPA : TO 704.
        SIG : R; NRDY4.
707 :   FROM 703.
        DBS : EA, NOP; 18, CLC; 18, CLC; EO, CPX; XX.
        DBC : MTOIDB; MTOSDB.
        SPU : NOP.
        MPA : TO 705.
        SIG : R; NRDY4.
708 :   SBC - (INDIRECT, X).
        DBS : XX; XX; XX; XX; XX.
        DBC : DLTOIDB; IDBTOSDB.
        SPU : NOP.
        MPA : IF RDY TO 309.
        SIG : R.
710 :   N2, N1, N0 = 000.
        DBS : XX; XX; XX; XX; XX.
```

```
        DBC : DLTOIDB; IDBTODB, IN1, IN1, IN1, IN1.
        SPU : NOP.
        MPA : TO 71D.
        SIG : V4; NRDY4; KPDB.
711 :       N2, N1, NO = 001.
        DBS : XX; XX; XX; XX; XX.
        DBC : DLTOIDB; IDBTODB, IN1, NOP, NOP, NOP.
        SPU : NOP.
        MPA : TO 71D.
        SIG : V4; NRDY4; KPDB.
712 :       N2, N1, NO = 010.
        DBS : XX; XX; XX; XX; XX.
        DBC : DLTOIDB; IDBTODB, IN1, IN1, NOP, NOP.
        SPU : NOP.
        MPA : TO 71D.
        SIG : V4; NRDY4; KPDB.
713 :       N2, N1, NO = 011.
        DBS : XX; XX; XX; XX; XX.
        DBC : DLTOIDB; IDBTODB, IN1, NOP, NOP, NOP.
        SPU : NOP.
        MPA : TO 71D.
        SIG : V4; NRDY4; KPDB.
714 :       N2, N1, NO = 100.
        DBS : XX; XX; XX; XX; XX.
        DBC : DLTOIDB; IDBTODB, IN1, IN1, IN1, NOP.
        SPU : NOP.
        MPA : TO 71D.
        SIG : V4; NRDY4; KPDB.
715 :       N2, N1, NO = 101.
        DBS : XX; XX; XX; XX; XX.
        DBC : DLTOIDB; IDBTODB, IN1, NOP, NOP, NOP.
        SPU : NOP.
        MPA : TO 71D.
        SIG : V4; NRDY4; KPDB.
716 :       N2, N1, NO = 110.
        DBS : XX; XX; XX; XX; XX.
        DBC : DLTOIDB; IDBTODB, IN1, IN1, NOP, NOP.
        SPU : NOP.
        MPA : TO 71D.
        SIG : V4; NRDY4; KPDB.
717 :       N2, N1, NO = 111.
        DBS : XX; XX; XX; XX; XX.
        DBC : DLTOIDB; IDBTODB, IN1, NOP, NOP, NOP.
        SPU : NOP.
        MPA : TO 71D.
        SIG : R; NRDY4; KPDB.
718 :       FROM 735.
        DBS : C6, DEC; C6, DEC; C6, DEC; C6, DEC; XX.
        DBC : MTOSDB; MTOIDB.
        SPU : NOP.
        MPA : TO 778-77F ON N2, N1, NO.
        SIG : R; NRDY4; KPDB.
71C :       FROM 734.
        DBS : C6, DEC; C6, DEC; C6, DEC; C6, DEC; XX.
        DBC : MTOSDB; MTOIDB.
        SPU : NOP.
        MPA : TO 717 ON NO.
        SIG : R; NRDY4; KPDB.
71D :       FROM 710-717.
        DBS : XX; XX; XX; XX; XX.
        DBC : DBTOIDB; IDBTOSDB.
        SPU : NOP.
        MPA : IF RDY TO 71E.
        SIG : R.
71E :       FROM 71D.
        DBS : XX; XX; XX; XX; XX.
        DBC : NOP.
        SPU : NOP.
        MPA : CONTINUE.
        SIG : R
71F :       FROM 71E.
        DBS : XX; XX; XX; XX; XX.
        DBC : IDBTODB.
        SPU : NOP.
        MPA : TO FETCH.
        SIG : V4.
720 :       CPX - ZERO PAGE.
        DBS : XX; XX; XX; XX; XX.
        DBC : DLTOIDB; IDBTOSDB.
        SPU : NOP.
        MPA : IF RDY TO 700.
        SIG : R.
728 :       SBC - ZERO PAGE.
        DBS : XX; XX; XX; XX; XX.
        DBC : DLTOIDB; IDBTOSDB.
        SPU : NOP.
        MPA : IF RDY TO 30C.
        SIG : R.
730 :       INC - ZERO PAGE.
        DBS : XX; XX; XX; XX; XX.
        DBC : DLTOIDB; IDBTOSDB.
        SPU : NOP.
        MPA : IF RDY TO 731.
        SIG : R.
731 :       FROM 730.
        DBS : XX; XX; XX; XX; XX.
```

```
         DBC : DLTOIDB; IDBTOSDB.
         SPU : NOP.
         MPA : TO 738-73F ON N2,-N1, NO.
         SIG : R; NRDY4.
732 :    FROM 73F.
         DBS : XX; XX; XX; XX; XX.
         DBC : NOP.
         SPU : NOP.
         MPA : TO 736.
         SIG : R; NRDY4; KPDB.
733 :    FROM 738.
         DBS : XX; XX; XX; XX; XX.
         DBC : NOP.
         SPU : NOP.
         MPA : TO 737.
         SIG : R; NRDY4; KPDB.
734 :    FROM 739.
         DBS : XX; XX; XX; XX; XX.
         DBC : NOP.
         SPU : NOP.
         MPA : TO 71C.
         SIG : R; NRDY4; KPDB.
735 :    FROM 73B.
         DBS : XX; XX; XX; XX; XX.
         DBC : NOP.
         SPU : NOP.
         MPA : TO 718.
         SIG : R; NRDY4; KPDB.
736 :    FROM 732.
         DBS : C6. DEC; C6. DEC; C6. DEC; C6. DEC; XX.
         DBC : MTOIDB; MTOSDB.
         SPU : NOP.
         MPA : TO 710-717 ON N2, N1, NO.
         SIG : R; NRDY4; KPDB.
737 :    FROM 733.
         DBS : C6. DEC; C6. DEC; C6. DEC; C6. DEC; XX.
         DBC : MTOIDB; MTOSDB.
         SPU : NOP.
         MPA : TO 717.
         SIG : R; NRDY4; KPDB.
738 :    N2, N1, NO = 000.
         DBS : XX; XX; XX; XX; XX.
         DBC : NOP.
         SPU : NOP.
         MPA : TO 733.
         SIG : R; NRDY4; KPDB.
739 :    N2, N1, NO = 001.
         DBS : XX; XX; XX; XX; XX.
         DBC : NOP.
         SPU : NOP.
         MPA : TO 734.
         SIG : R; NRDY4; KPDB.
73A :    N2, N1, NO = 010.
         DBS : XX; XX; XX; XX; XX.
         DBC : NOP.
         SPU : NOP.
         MPA : TO 733.
         SIG : R; NRDY4; KPDB.
73B :    N2, N1, NO = 011.
         DBS : XX; XX; XX; XX; XX.
         DBC : NOP.
         SPU : NOP.
         MPA : TO 735.
         SIG : R; NRDY4; KPDB.
73C :    N2, N1, NO = 100.
         DBS : XX; XX; XX; XX; XX.
         DBC : NOP.
         SPU : NOP.
         MPA : TO 733.
         SIG : R; NRDY4; KPDB.
73D :    N2, N1, NO = 101.
         DBS : XX; XX; XX; XX; XX.
         DBC : NOP.
         SPU : NOP.
         MPA : TO 734.
         SIG : R; NRDY4; KPDB.
73E :    N2, N1, NO = 110.
         DBS : XX; XX; XX; XX; XX.
         DBC : NOP.
         SPU : NOP.
         MPA : TO 733.
         SIG : R; NRDY4; KPDB.
73F :    N2, N1, NO = 111.
         DBS : XX; XX; XX; XX; XX.
         DBC : NOP.
         SPU : NOP.
         MPA : TO 732.
         SIG : R; NRDY4; KPDB.
740 :    INX.
         DBS : XX; XX; XX; XX; XX.
         DBC : DLTOIDB; IDBTOSDB.
         SPU : NOP.
         MPA : CONTINUE.
         SIG : R.
741 :    FROM 740.
         DBS : O6. PHP; CA. DEX; CA. DEX; CA. DEX; XX.
```

```
            DBC : HTOIDB: HTOSDB.                          DBC : DLTOIDB: IDBTODB. IN1. IN1. IN1. NOP.
            SPU : NOP.                                     SPU : NOP.
            HPA : CONTINUE.                                HPA : TO 71D.
            SIG : R: NRDY4.                          5     SIG : V4: NRDY4: KPDB.
    742 :       FROM 741.                              779 :     N2. N1. N0 = 001.
            DBS : XX; XX; XX; XX; XX.                      DBS : XX; XX; XX; XX; XX.
            DBC : HTOIDB: HTOSDB.                    10     DBC : DLTOIDB: IDBTODB. IN1. NOP. NOP. NOP.
            SPU : NOP.                                     SPU : NOP.
            HPA : CONTINUE.                                HPA : TO 71D.
            SIG : R: NRDY4.                                SIG : V4: NRDY4: KPDB.
    743 :       FROM 742.                          15  77A :     N2. N1. N0 = 010.
            DBS : XX; XX; XX; XX; XX.                      DBS : XX; XX; XX; XX; XX.
            DBC : NOP.                                     DBC : DLTOIDB: IDBTODB. IN1. IN1. NOP. NOP.
            SPU : NOP.                               20    SPU : NOP.
            HPA : TO 707 ON N0.                            HPA : TO 71D.
            SIG : R: NRDY3-0: NRDY4.                       SIG : V4: NRDY4: KPDB.
    748 :       SBC - IMMEDIATE.                       77B :     N2. N1. N0 = 011.
            DBS : XX; XX; XX; XX; 03, +3.            25    DBS : XX; XX; XX; XX; XX.
            DBC : HTOSDB: DLTOIDB.                         DBC : DLTOIDB: IDBTODB. IN1. NOP. NOP. NOP.
            SPU : NOP.                                     SPU : NOP.
            HPA : IF RDY TO 349.                     30    HPA : TO 71D.
            SIG : R.                                       SIG : V4: NRDY4: KPDB.
    750 :       EA - NOP.                                77C :     N2. N1. N0 = 100.
            DBS : XX; XX; XX; XX; XX.                      DBS : XX; XX; XX; XX; XX.
            DBC : DLTOIDB: IDBTOSDB.                 35    DBC : DLTOIDB: IDBTODB. IN1. IN1. IN1. NOP.
            SPU : NOP.                                     SPU : NOP.
            HPA : TO FETCH.                                HPA : TO 71D.
            SIG : R.                                 40    SIG : V4: NRDY4: KPDB.
    760 :       CPX - ABSOLUTE.                       77D :     N2. N1. N0 = 101.
            DBS : XX; XX; XX; XX; XX.                      DBS : XX; XX; XX; XX; XX.
            DBC : DLTOIDB: IDBTOSDB.                       DBC : DLTOIDB: IDBTODB. IN1. NOP. NOP. NOP.
            SPU : NOP.                               45    SPU : NOP.
            HPA : IF RDY TO 720.                           HPA : TO 71D.
            SIG : R.                                       SIG : V4: NRDY4: KPDB.
    768 :       SBC - ABSOLUTE.                    50  77E :     N2. N1. N0 = 110.
            DBS : XX; XX; XX; XX; XX.                      DBS : XX; XX; XX; XX; XX.
            DBC : DLTOIDB: IDBTOSDB.                       DBC : DLTOIDB: IDBTODB. IN1. IN1. NOP. NOP.
            SPU : NOP.                                     SPU : NOP.
            HPA : IF RDY TO 308.                     55    HPA : TO 71D.
            SIG : R.                                       SIG : V4: NRDY4: KPDB.
    770 :       INC - ABSOLUTE.                       77F :     N2. N1. N0 = 111.
            DBS : XX; XX; XX; XX; XX.                60    DBS : XX; XX; XX; XX; XX.
            DBC : DLTOIDB: IDBTOSDB.                       DBC : DLTOIDB: IDBTODB. IN1. NOP. NOP. NOP.
            SPU : NOP.                                     SPU : NOP.
            HPA : IF RDY TO 730.                           HPA : TO 71D.
            SIG : R.                                 65    SIG : V4: NRDY4: KPDB.
    778 :       N2. N1. N0 = 000.                     780 :     BEQ.
            DBS : XX; XX; XX; XX; XX.                      DBS : XX; XX; XX; XX; XX.
```

```
             DBC : NTOSDB; NTOIDB.
             SPU : NOP.
             NPA : CONTINUE.
             SIG : R; NRDY4.
   7B1 :         FROM 7B0.
             DBS : XX; XX; XX; XX; XX.
             DBC : NOP.
             SPU : NOP.
             NPA : IF Z TO 4B2.
             SIG : R; NRDY4.
   7B2 :         FROM 7B1.
             DBS : XX; XX; XX; XX; 00.
             DBC : NTOSDB; NTOIDB.
             SPU : NOP.
             NPA : TO 4B5.
             SIG : R; NRDY3-0.
   7B8 :         SBC - (INDIRECT), Y.
             DBS : XX; XX; XX; XX; XX.
             DBC : DLTOIDB; IDBTOSDB.
             SPU : NOP.
             NPA : IF RDY TO 3B9.
             SIG : R.
   7A8 :         SBC - ZERO PAGE. X.
             DBS : XX; XX; XX; XX; XX.
             DBC : DLTOIDB; IDBTOSDB.
             SPU : NOP.
             NPA : IF RDY TO 3A9.
             SIG : R.
   7B0 :         INC - ZERO PAGE. X.
             DBS : XX; XX; XX; XX; XX.
             DBC : DLTOIDB; IDBTOSDB.
             SPU : NOP.
             NPA : IF RDY TO 7B1.
             SIG : R.
   7B1 :         FROM 7B0.
             DBS : XX; XX; XX; XX; XX.
             DBC : DLTOIDB; IDBTOSDB.
             SPU : NOP.
             NPA : TO 731.
             SIG : R.
   7C0 :         SED.
             DBS : XX; XX; XX; XX; XX.
             DBC : DLTOIDB; IDBTOSDB.
             SPU : NOP.
             NPA : TO FETCH.
             SIG : R.
   7C8 :         SBC - ABSOLUTE, Y.
             DBS : XX; XX; XX; XX; XX.

DBC : DLTOIDB; IDBTOSDB.
             SPU : NOP.
             NPA : IF RDY TO 3C9.
             SIG : R.
   7E8 :         SBC - ABSOLUTE. X.
             DBS : XX; XX; XX; XX; XX.
             DBC : DLTOIDB; IDBTOSDB.
             SPU : NOP.
             NPA : IF RDY TO 3C9.
             SIG : R.
   7F0 :         INC - ABSOLUTE. X.
             DBS : XX; XX; XX; XX; XX.
             DBC : DLTOIDB; IDBTOSDB.
             SPU : NOP.
             NPA : IF RDY TO 7B0.
             SIG : R.
```

BIBLIOGRAPHY

[1] David J. Kuck, "The Structure of Computers and Computations" Volume 1. pp. 7–18, John Wiley & Sons, 1978.

[2] Robert N. Noyce and Marcian E. Hoff Jr., "A History of Microprocessor Development at Intel" IEEE Micro Vol. 1 No 1, February 1981.

[3] S. H. Fuller, D. P. Siewiorek, and R. J. Swan, "Computer Modules: An Architecture for Large Digital Modules", Symposium on Computer Architecture, 1973.

[4] S. H. Fuller, and D. P. Siewiorek, "Some Observations on Semiconductor Technology and the Architecture of Large Digital Modules", IEEE Computer, Vol. 6, No. 10, October 1973.

[5] G. Adams and T. Rolander, "Design Motivations for Multiple Processor Microcomputer Systems", Computer Design, March 1978.

[6] Robert E. Childs, "Multiple Microprocessor Systems: Goals, Limitations and Alternatives", COMPCON, Spring 1979.

[7] Y. Paker, "Multi-Microprocessor Systems", pp. 24–79, Academic Press, 1983.

[8] B. A. Bowen and R. J. A. Buhr. "The Logical Design of Multiple-Microprocessor Systems", pp. 252–258, Prentice-Hall, Inc. 1980.

[9] Glenn Gibson and Yu-cheng Liu, "Microcomputers for Engineers and Scientists", pp. 159–164, Prentice-Hall, Inc, 1980.

[10] Glenford J. Myers, 1980, "Digitial System Design with LSI Bit-Slice Logic", John Wiley & Sons.

[11] Donnamaie E. White, 1981, "Bit-Slice Design: Controllers and ALUs", Garland STPM Press.

[12] D. A. Patterson and C. H. Sequin "A VLSI RISC", IEEE. Computer, Vol. 15, No. 9, September 1982.

[13] D. A. Patterson and C. H. Sequin, "Design Considerations for Single-Chip computers of the Future", IEEE. Trans. Computers, Joint Special Issue on Microprocessors and Microcomputers, Vol. C-29, No. 2, pp. 108–116.

[14] "R6502 Hardware Manual", Rockwell International, 1978.

[15] "R6502 Programming Manual", Rockwell International, 1979.
[16] John B. Peatman, "Microcomputer-Based Design", pp. 47-50, McGraw-Hill Book Company, 1977.
[17] Fred Ware, et al., "Fast 64-bit Chip Set Gangs up for Double-Precision Floating-Point Work", Electronics, July 12, 1984.
[18] Harold S. Stone, et al, 1980, "Introduction to Computer Architecture", pp. 136-140, pp. 442-461, SRA Inc.
[19] P. Kogge, "The Microprogramming of Pipelined Processors", Proc. 4th Annual Symposium on Computer Architecture, March 1977.
[20] Ben E. Cline, 1981, "Microprogramming Conceptes and Techniques", pp. 141-146, Petrcell Books Inc.
[21] A. K. Agrawala and T. G. Rauscher, "Foundations of Microprogramming", Academic Press, 1976.
[22] Samir Husson, 1970, "Micrprogramming Principles and Practices", Prentice-Hall.
[23] Guy F. Boulaye, 1975, "Microprogramming", pp. 96-110, John Wiley & Sons.
[24] H. Katzan, Jr., 1977, "Microprogramming Primer", Mcgraw-Hill.
[25] P. Chu and V. Coleman, "Expanding the Addressing Capability of your Microprogram Sequencer", EDN, 23(11), 137-143 (1978).
[26] S. R. Redfield, "A study in Microprogrammed Processors: A Medium Sized Microprogrammed Processor", IEEE Trans. on Computers, C-20(7), pp. 743-540, 1970.
[27] Kevin P. burkhart, et al., "An 18-MHz, 32-Bit VLSI Microprocessor", Hewlett-Pachard Journal Vol. 84, No. 8, pp. 7-11, August 1983.
[28] John Bond, "Architectural Advances Spur 32-Bit Micros", computer Design, Vol 23, No 6, pp. 125-136, June 1984.
[29] "The Am2900 Family Data Book", Advanced Micro Devices, 1979.
[30] "Bipolar Microprocessor Logic and Interface Data Book", Advanced Mirco Devices, 1983.
[31] "An Emulation of the Am9080A", Advanced Micro Devices, 1978.
[32] T. R. Blakeslee, "Digital Design with Standard MSI and LSI", John Wiley & Sons, 1974.

What is claimed is:

1. A microprogram-coupled multiple-microprocessor module comprising:

a data processing unit including a plurality of microprocessors each having an internal data bus and a program counter, a plurality of corresponding main data busses, the main data busses combining in parallel to form a module data bus, and a control circuit coupling said microprocessors to said main data busses;

an address processing unit for keeping track of memory addresses that correspond to the data processed in the microprocessors of the data processing unit, including at least one microprocessor having a microprocessor address bus and a microprocessor data bus; means coupling the microprocessor address bus to a module address bus; data transfer means coupling the microprocessor data bus of said at least one microprocessor to a stack pointer bus and to the internal data bus of at least one of the microprocessors of the data processing unit; and APU logic mapping means coupled to one of said main data busses of the data processing unit and to said at least one microprocessor of the address processing unit for op code mapping of said at least one microprocessor of the address processing unit according to a predetermined op code mapping scheme stored in said APU logic mapping means;

a stack pointer processing unit external to said at least one microprocessor of said address processing unit for keeping track of stack pointers for all microprocessors, including address processor control means and data transfer means coupling the address processor control means to the stack pointer bus of the address processing unit and to the internal data bus of said one of the microprocessors of said data processing unit; and a microprogram control and signalling unit including microprogram memory means storing microinstructions to be applied to said microprocessors of said data processing unit; microinstruction sequencing logic means providing address data to said microprogram memory means to determine the next successive address of a microprogram sequence, and flag and signal generating circuit means having inputs coupled to the internal data busses of the microprocessors of the data processing unit and outputs providing status flags and signals to said microinstruction sequencing logic means to control the synchronization of the microinstructions executed in the multiple microprocessors of said data processing unit and the at least one microprocessor of said address processing unit so that memory fetch and memory write operations are all synchronized; such that the microprogram control and signalling unit controls the data processing unit, the address processing unit, and the stack pointer processing unit by delaying the incrementation of one or more of the program counters of the microprocessors of the data processing unit as need be so that the several microprocessors of the data processing unit and the address processing unit complete corresponding operations at the same time, and so that carries are accounted for from one of the microprocessors of the data processing unit to another thereof.

2. A microprogram-coupled multiple-microprocessor module as in claim 1, wherein said data processing unit includes said plurality of microprocessors, a plurality of transparent latch circuit each coupled between an associated internal data bus and its respective main data bus, and a plurality of PROMs each having an input coupled to a respective one of the internal data busses, an output coupled to the associated main data bus, and PROM control inputs receiving operation selection signals from the microprogram memory means.

3. A microprogram-coupled multiple-microprocessor module as in claim 2, wherein said data processing unit further includes logic means for receiving an op code from one said main data bus and providing an op code mapped output to each of said internal data busses.

4. A microprogram-coupled multiple-microprocessor mode as in claim 2, wherein said data processing unit further includes logic means having an input and output respectively coupled to one said main data bus and the associated internal data bus, and arranged such that the output data equal the input data plus "1".

5. A microprogram-coupled multiple-microprocessor module as in claim 1, wherein the logic mapping means of said address processing unit includes a bidirectional bus transceiver coupled to a microprocessor data port of the at least one microprocessor of the address processing unit and to the internal data bus of at least one of the microprocessors of said data processing unit, a bus transceiver having an input coupled to said microprocessor data port and an output coupled to said stack pointer processing unit, and a programed logic device containing a stored op code mapping scheme and having an input coupled to one said main data bus and an output coupled to said microprocessor data port for providing an op code mapped output to said microprocessor data port.

6. A microprogram-coupled multiple-microprocessor module as in claim 1, wherein said address processor control means of said stack pointer processing unit includes program control unit means generating an address output to said microprocessor address bus, and said data transfer means includes bus transceiver means coupling the stack pointer bus of said address processing unit to an input of said address processor control means when an actuating signal applied to said bus transceiver means has one sense, and coupling an address bus of said address processing unit to said address processor control means when said actuating signal has another complementary sense.

7. A microprogram-coupled multiple-microprocessor module as in claim 1, wherein said address processor unit has output address bus means providing higher address bits over a first path to an upper portion of a module address bus, and providing lower address bits to the address processor control means of said stack pointer processing unit, said address processor control means including address generating means having data bus inputs coupled to receive said lower bits and an instruction input port coupled to receive multi-bit instruction codes from said microprogram control unit, and outputs coupled to supply processed lower address bits to said module address bus.

8. A microprocessor-coupled multi-microprocessor module as in claim 7, wherein the data transfer means of said stack pointer processing unit includes bus transfer means coupling said module address bus to the internal data bus of at least one of the microprocessors of said data processing unit.

9. A microprogram-coupled multiple-microprocessor module as in claim 1, wherein the microprogram memory means of said microprogram control and signalling unit includes means storing microprogram address data, and said sequencing logic means includes microprogram sequencing means having inputs coupled to said microprogram memory means and an output providing microprogram address data, and a plurality of data port sources having inputs coupled to the microprogram memory means output and outputs coupled respectively to the internal data busses of the microprocessors of said data processing unit.

10. A microprogram-coupled multiple-microprocessor module as in claim 1, wherein said microprogram control and signalling unit includes synchronizing means for synchronizing the operation of the microprocessors of the data processing unit and of the address processing unit such that said microprocessors of the data processing unit all perform a fetch from memory operation at one time while said at least one microprocessor of said address processing unit provides an associated memory address word, and said microprocessors of said data processing unit all performs a memory deposit operation at one time while said at least one microprocessor of said address processing unit provides an associated memory address word, notwithstanding that said microprocessors perform different respective processing operations requiring differing numbers of clock cycles.

* * * * *

UNITED STATES PATENT AND TRADEMARK OFFICE
CERTIFICATE OF CORRECTION

PATENT NO. : 4,736,317
DATED : April 5, 1988
INVENTOR(S) : Ming K. Hu, Yau G. Jia It is certified that error appears in the above-identified patent and that said Letters Patent is hereby corrected as shown below:

Claim 4, line 63, "mode" should read --module--.

Signed and Sealed this

Sixth Day of December, 1988

Attest:

DONALD J. QUIGG

*Attesting Officer*      *Commissioner of Patents and Trademarks*